United States Patent [19]

Katoh et al.

[11] Patent Number: 5,340,784
[45] Date of Patent: Aug. 23, 1994

[54] MICROWAVE DIELECTRIC CERAMIC COMPOSITION

[75] Inventors: Tokiomi Katoh; Hirofumi Ozeki, both of Nagoya, Japan

[73] Assignee: NGK Spark Plug Company, Ltd., Aichi, Japan

[21] Appl. No.: 101,252

[22] Filed: Aug. 2, 1993

[30] Foreign Application Priority Data

| Aug. 3, 1992 | [JP] | Japan | 4-226373 |
| Sep. 9, 1992 | [JP] | Japan | 4-266534 |
| Sep. 24, 1992 | [JP] | Japan | 4-279472 |
| Nov. 4, 1992 | [JP] | Japan | 4-319421 |
| Dec. 30, 1992 | [JP] | Japan | 4-360058 |
| Dec. 30, 1992 | [JP] | Japan | 4-360059 |

[51] Int. Cl.$^5$ .................................... C04B 35/46
[52] U.S. Cl. ................................................ 501/136
[58] Field of Search ........................................ 501/136

[56] References Cited

U.S. PATENT DOCUMENTS

| 2,631,941 | 3/1953 | Cole | 501/136 |
| 4,485,181 | 11/1984 | Sakabe | 501/136 |
| 4,506,026 | 3/1985 | Hodgkins et al. | 501/136 |
| 4,746,639 | 5/1988 | Sano et al. | 501/136 |
| 4,845,062 | 7/1989 | Burn | 501/136 |
| 4,937,213 | 6/1990 | Bernier | 501/136 |

FOREIGN PATENT DOCUMENTS 52-118599 10/1977 Japan.
2-129065 5/1990 Japan.

*Primary Examiner*—Mark L. Bell
*Assistant Examiner*—Deborah Jones
*Attorney, Agent, or Firm*—Finnegan, Henderson, Farabow, Garrett & Dunner

[57] ABSTRACT

Disclosed herein is a microwave dielectric ceramic composition which comprises as the main ingredient, a composition represented by $xMgTiO_3\cdot(1-x)CaTiO_3$ ($0.93 \leq x \leq 0.95$), to which 3–9 wt % of ZnO, 2–4 wt % of $Ta_2O_5$, 1–6 wt % of $Nb_2O_5$, 0.1–6 wt % of $MnO_2$, 3–12 wt % of $Al_2O_3$ or 3–12 wt % of $Co_2O_3$ to $xMgTiO_3\cdot(1-x)CaTiO_3$. And the microwave dielectric ceramic compositions have a Qu value in the range of 3000 to 4600 (at 6 GHz), a temperature coefficient of the resonance frequency ($\tau f$) in the range of $-10$ to $+10$ ppm/°C. and relative dielectric constant ($\epsilon_r$) in the range of 18 to 22. The dielectric ceramic compositions are capable of reducing $\tau f$ approximately to zero or optionally and stably controlling $\tau f$ to a desired value both to positive and negative sides around zero as the center while maintaining $\epsilon_r$ and Qu within practical characteristic ranges by controlling the addition (constitution) ratio of the specified oxides. Further, even if the sintering temperature is changed within a wide range, the sintering products of high density and high quality can be attained due to the addition of the specified oxides.

18 Claims, 59 Drawing Sheets

(1350°C 4 HOURS SINTERING)

×1000

(1350°C 4 HOURS SINTERING)

×1000

MICROWAVE DIELECTRIC CERAMIC COMPOSITION

BACKGROUND OF THE INVENTION

The present invention concerns a microwave dielectric ceramic composition and, more specifically, it relates to a microwave dielectric ceramic composition capable of reducing a temperature coefficient of a resonance frequency (hereinafter simply referred to as $\tau f$) while maintaining non-load Q (hereinafter simply referred to as Qu) and, further, capable of optionally controlling $\tau f$ to positive and negative sides around zero as the center by controlling the mixing ratio of $CaTiO_3$ or a specified oxide. The present invention also relates to a microwave dielectric ceramic composition and having high quality even if it is sintered at a low temperature due to the addition of a specified oxide or with less scattering in the quality even if it is sintered in a wide temperature range.

The present invention is applicable to impedance matching or the like of dielectric resonators, microwave integrated circuit boards and various kinds of microwave circuits in a microwave region.

Since the dielectric loss of a microwave dielectric ceramic composition (hereinafter simply referred to as a dielectric ceramic composition) tends to increase as the working frequency goes higher, a dielectric ceramic composition of high Qu in a microwave frequency region has been demanded.

As conventional dielectric ceramic materials, a dielectric ceramic composition of a crystal structure containing two phases, that is, a perovskite phase and an ilmenite phase (Japanese Patent Laid-Open Hei 2-129065) and a dielectric ceramic composition containing a predetermined amount of $CaTiO_3$ in $MgTiO_3$ and $TiO_2$ (Japanese Patent Laid-Open Sho 52-118599) have been known.

However, the former dielectric ceramic composition obtained other ingredients such as $Nd_2O_3$, $La_2O_3$, PbO, ZnO in a great amount and, in addition, the value Qu is not always high. The latter dielectric ceramic composition contains $TiO_2$ as the essential ingredient and $\tau f$ changes greatly as from $+87$ to $-100$ within a range for the mixing amount of $CaTiO_3$ from 3 to 10% by weight to bring about a problem such as a difficulty for the control to a small value around zero.

The present invention intends to solve the foregoing problem and it is an object of the present invention to provide a dielectric ceramic composition capable of reducing $\tau f$ approximately to zero or optionally and stably controlling $\tau f$ to a desired value both to positive and negative sides around zero as the center while maintaining $\epsilon_r$ (relative dielectric constant) and Qu within practical characteristic ranges by controlling the addition (constitution) ratio of specified oxides (ZnO, $Ta_2O_5$, $Nb_2O_5$, $MnO_2$, $Al_2O_3$ or $Co_2O_3$) and, further, having a high quality even if it is sintered at a low temperature or even if it is sintered in a wide temperature range due to the addition of a specified oxide.

SUMMARY OF THE INVENTION

The present inventor has made various studies on a composition of a dielectric ceramic composition capable of approaching $\tau f$ to zero while maintaining a high Qu value and having stable quality even if sintering temperature varies and, as a result, has accomplished the present invention based on the finding that the foregoing drawback can be overcome by adjusting the addition ratio of $CaTiO_3$ and specified oxide.

Namely, the dielectric ceramic composition according to the present invention comprises, as the main ingredient, a composition represented by $xMgTiO_3 \cdot (1-x)CaTiO_3$ ($0.925 \leq x \leq 0.950$), to which 3 to 9 parts by weight (hereinafter referred to as % by weight) of ZnO is added and incorporated based on 100 parts by weight of $xMgTiO_3 \cdot (1-x)CaTiO_3$.

If x is smaller than 0.925, $\tau f$ takes a large positive value and Qu is lowered, whereas $\tau f$ takes a large negative value if x exceeds 0.950, which are not preferred. In particular, it is preferred that x is from 0.935 to 0.945 and the addition amount of ZnO is 6% by weight, since Qu is from 3900 to 4100, $\tau f$ is $-5$ to $+5$ (ppm/°C.) and $\epsilon_r$ is about 21, high quality can be ensured even by sintering at a low temperature and stability to the sintering temperature is obtained.

As the mixing ratio of $CaTiO_3$ increases, $\tau f$ increases from negative to positive side (FIG. 3) and $\epsilon_r$ increases (FIG. 2), while Qu tends to decrease (FIG. 1). Further, as shown in FIG. 7, a sintering product of high density can be produced even by sintering at a low temperature (for example, at 1325° to 1350° C.) and, accordingly, stable quality can be attained even if the sintering temperature changes variously (or even if sintering is conducted at a low temperature) (FIGS. 4–11).

In view of the above, within an appropriate mixing range for $CaTiO_3$ and ZnO described above, a balance is attained for the characteristics and stable quality can be obtained.

The dielectric ceramic composition according to another aspect of the present invention comprises, as the main ingredient, a composition represented by $xMgTiO_3 \cdot (1-x)CaTiO_3$ (in which $0.923 \leq x \leq 0.940$), to which 2 to 4 parts by weight (hereinafter referred to as % by weight) of $Ta_2O_5$ is added and incorporated based on 100 parts by weight of $xMgTiO_3 \cdot (1-x)CaTiO_3$.

If x is smaller than 0.923, $\tau f$ takes a large positive value and Qu decreases, whereas if x exceeds 0.940, $\tau f$ takes a large negative value, which are not preferred. Particularly, it is preferred that x is from 0.927 to 0.935 and the addition amount of $Ta_2O_5$ is 3% by weight, since Qu is from 3920 to 4260, $\tau f$ is from $-8.5$ to $+2.3$ (ppm/°C.), $\epsilon_r$ is from 19.7 to 21.6 and the scattering in the characteristics is extremely small even if sintering temperature is varied.

As the mixing ratio of $CaTiO_3$ increases, $\tau f$ increases from negative to positive value (FIG. 16), $\epsilon_r$ increases (FIG. 15), while Qu tends to reduce (FIG. 14). Further, as shown in FIG. 23, sintering products at high density can be produced even if sintering is applied at a low temperature (for example, at 1300°–1325° C.) due to the addition of $Ta_2O_5$. Further, products of stable quality can be obtained if the sintering temperature is varied within a range of 1300° to 1400° C. (FIGS. 17–23).

In view of the above, within the appropriate mixing range of $CaTiO_3$ and $Ta_2O_5$ described above, the characteristics are well-balanced and products of stable quality can be obtained.

The dielectric ceramic composition according to other aspect of the present invention comprises, as the main ingredient, a composition represented by $xMgTiO_3 \cdot (1-x)CaTiO_3$ (in which $0.925 \leq x \leq 0.940$), to which 1 to 6 parts by weight (hereinafter referred to as % by weight) of $Nb_2O_5$ is added and incorporated based on 100 parts by weight of $xMgTiO_3 \cdot (1-x)CaTiO_3$.

If x is smaller than 0.925, τf takes a large positive value and Qu decreases, whereas τf takes a large negative value if x exceeds 0.940, which are not preferred. Particularly, it is preferred that x is 0.930 and the addition amount of $Nb_2O_5$ is 2% by weight, since Qu is from 3980 to 4320 τf is from −3.69 to +0.52 ppm/°C. and $ε_r$ is from 19.05 to 21.5 when sintering is applied at 1275°–1400° C., and products of high quality can be obtained stably even if sintering is applied within a wide temperature range.

As the mixing ratio of $CaTiO_3$ increases, τf increases from negative to positive value (FIG. 28), $ε_r$ increases (FIG. 27), while Qu tends to decrease (FIG. 26). Further, as shown in FIGS. 29-31 although Qu and τf do not vary so much but τf tend to decrease due to the addition of $Nb_2O_5$. Particularly, at the mixing ratio of $CaTiO_3$ of 0.07, the addition amount of $Nb_2O_5$ of about 2% by weight is extremely preferred since τf is about 0 ppm/°C. Further, as shown in FIGS. 32-36 and Tables 5 and 6, sintering products of stable performance and high sintering density can be produced even if sintering is applied within a wide temperature range. Accordingly, addition amount of $Nb_2O_5$, particularly, of 1 to 4% by weight, (more particularly, about 2% by weight) is excellent in view of further excellent balance of performance and stable sintering product.

In view of the above, within the appropriate mixing range of $CaTiO_3$ and $Nb_2O_5$ described above, products of excellent performances with excellent balance of stable quality can be obtained.

The dielectric ceramic composition according to other aspect of the present invention comprises, as the main ingredient, a composition represented by $xMgTiO_3 \cdot (1-x)CaTiO_3$ (in which $0.93 \leq x \leq 0.95$), to which 0.1 to 6 parts by weight (hereinafter referred to as % by weight) of $MnO_2$ is added and incorporated based on 100 parts by weight of $xMgTiO_3 \cdot (1-x)CaTiO_3$.

If x is smaller than 0.93, τf takes a large positive value and Qu decreases, whereas τf takes a large negative value if x exceeds 0.95, which are not preferred. Particularly, if x is 0.94 and the addition amount of $MnO_2$ is 3 to 6% by weight, Qu is from 3080 to 3890, τf is from −2.60 to +1.78 ppm/°C., and $ε_r$ is from 19.04 to 20.95 when sintering is applied at 1350°–1425° C. as shown in Table 8, and products of high quality can be obtained even if sintering is applied within a wide temperature range. As the mixing ratio of $CaTiO_3$ increases, τf increases from negative to positive value (Table 7, FIGS. 40, 44, 48), $ε_r$ increases (Table 7, FIGS. 39, 43, 47), while Qu tends to decrease (Table 7, FIGS. 38, 42 and 46). Further, in a case of adding $MnO_2$, Qu tends to decrease (FIG. 38), $ε_r$ (within a range of 1375° to 1425° C.) shows no substantial change (FIG. 39), τf tends to decrease (FIGS. 40, 48) and the sintering density tends to increase (FIGS. 41, 49). Particularly, at the mixing ratio of $CaTiO_3$ is 0.06, the addition amount of $MnO_2$ of about 3% by weight is extremely preferred since τf is about 0 ppm/°C. even if the sintering temperature is greatly varied as 1325° to 1425° C. as shown in FIG. 40. Further, as shown in FIGS. 38-49 and Tables 8-10, sintering products with stable performance and high sintering density can be produced even if sintering is applied within a wide temperature range (particularly from 1375° to 1425° C.).

Further, in a case where the mixing ratio of $CaTiO_3$ is 0.05, τf is as small as about −10 ppm/°C. even within the range for the addition amount of $MnO_2$ from 0.1 to 0.6. On the other hand, in a case where the mixing ratio of $CaTiO_3$ is 0.07, τf is as large as +10 ppm/°C. within the addition amount range of $MnO_2$ of 3 to 6% by weight. Accordingly, the mixing ratio of $CaTiO_3$ of about 0.06 and the addition amount of $MnO_2$, particularly, of 1 to 6% by weight (more particularly, about 3% by weight) are more excellent in view of further excellent balance of performance and stable sinterability.

In view of the above, within the appropriate mixing range of $CaTiO_3$ and $MnO_2$ described above, products of excellent performance with well-balancing thereof and of stable quality can be obtained.

The dielectric ceramic composition according to other aspect of the present invention comprises, as the main ingredient, a composition represented by $xMgTiO_3 \cdot (1-x)CaTiO_3$ (in which $0.93 \leq x \leq 0.95$), to which 3 to 12 parts by weight (hereinafter referred to as % by weight) of $Al_2O_3$ is added and incorporated based on 100 parts by weight of $xMgTiO_3 \cdot (1-x)CaTiO_3$.

If x is smaller than 0.93, τf takes a large positive value and Qu decreases, whereas τf takes a large negative value if x exceeds 0.95, which are not preferred.

As the addition amount of $Al_2O_3$ increases Qu tends to increase (FIG. 51), and $ε_r$, τf and the sintering density tend to decrease (FIGS. 52-54). Particularly, if the addition amount of $Al_2O_3$ is 3 to 9% by weight and the sintering temperature is from 1300° to 1375° C., Qu is 3360 to 3730, $ε_r$ is 18.4 to 20.6, τf is −2.2 to +2.6 ppm/°C., the sintering density is 3.57 to 3.82 g/cm³ as shown in Table 11 and FIGS. 51-54, and products of high quality can be obtained stably even if sintering is applied within a wide temperature range. Particularly, τf scarcely fractuates (namely, concentrating to −2-+3 ppm/°C.) and shows a value around 0 in each of the cases.

In view of the above, products of excellent performance described above and excellent balance thereof and of stable quality can be obtained by the addition amount of $Al_2O_3$ (3-9% by weight) and in a wide and appropriate sintering temperature range (1300°–1375° C.).

The dielectric ceramic composition according to other aspect of the present invention comprises, as the main ingredient, a composition represented by $xMgTiO_3 \cdot (1-x)CaTiO_3$ (in which $0.93 \leq x \leq 0.95$), to which 3 to 12 parts by weight (hereinafter referred to as % by weight) of $Co_2O_3$ is added and incorporated based on 100 parts by weight of $xMgTiO_3 \cdot (1-x)CaTiO_3$.

If x is smaller than 0.93, τf takes a large positive value and Qu decreases, whereas τf takes a large negative value if x exceeds 0.95, which are not preferred.

If the addition amount of $Co_2O_3$ is less than 3% by weight, τf increases toward the positive side and Qu decreases if the addition amount exceeds 12% by weight, which are not preferred. On the other hand, if the addition amount is from 3 to 12% by weight, τf can be reduced to a value around zero while concentrating Qu and $ε_r$ within practical ranges with no substantial reduction.

Then, as the mixing ratio of $CaTiO_3$ increases, it tends to decrease Qu, increase $ε_r$ and turn τf from negative to positive value (Table 7). Further, as the addition amount of $Co_2O_3$ increases, Qu tends to decrease (FIG. 64), $ε_r$ tends to decrease slightly although shows no substantial change (FIG. 65), τf tends to turn to negative side (FIG. 66) and the sintering density tend to increase (FIG. 67).

Particularly, if the addition amount of $Co_2O_3$ is 6 wt % and sintering is applied at 1350° to 1450° C., Qu is 3780 to 3970, $\tau f$ is $-0.74$ to $-0.03$ ppm/°C., $\epsilon_r$ is 20.4 to 20.8 and the sintering density is 3.83 to 3.89 g/cm$^3$ as shown in Table 12 and FIGS. 64–71, and each of the performances less scatters and excellent performances is exhibited even sintering is applied within a wide temperature range of 100° C. In particular, $\tau f$ takes an extremely small absolute value around 0 ppm/°C. and shows a value of about 0.5 (ppm/°C.)/1 wt % of $Co_2O_3$, and fine control for $\tau f$ can be done extremely easily.

In view of the above, products having such excellent performance and well balance thereof, as well as capable of easy fine control for $\tau f$ and of stable quality can be attained by the addition amount of $Co_2O_3$ and in a wide and appropriate sintering temperature range.

As has been described above, in the dielectric ceramic composition according to the present invention, $\tau f$ can be approached to zero or optionally controlled to a desired value between both of positive and negative sides around 0 (zero) as a center by controlling the blending ratio of $CaTiO_3$ while maintaining Qu and $\epsilon_r$ within practical (high) ranges of characteristics, as well as $\tau f$ can be controlled stably around 0 (zero). Further, even if the sintering temperature is changed within a wide range, sintering products of high density and high quality can be attained due to the addition of $ZnO_2$, $Ta_2O_5$, $Nb_2O_5$, $MnO_2$, $Al_2O_3$ or $Co_2O_3$. In the case of adding ZnO, sintering products of high quality can be obtained even if sintering is applied at a relatively low temperature. Further, in a case of adding $Co_2O_3$, $\tau f$ can be finely controlled easily.

Accordingly, the mixing ratio of $CaTiO_3$ and specific oxides (ZnO and so on) can be varied depending on the purpose.

DESCRIPTION OF THE PREFERRED EMBODIMENTS

Figure 1:
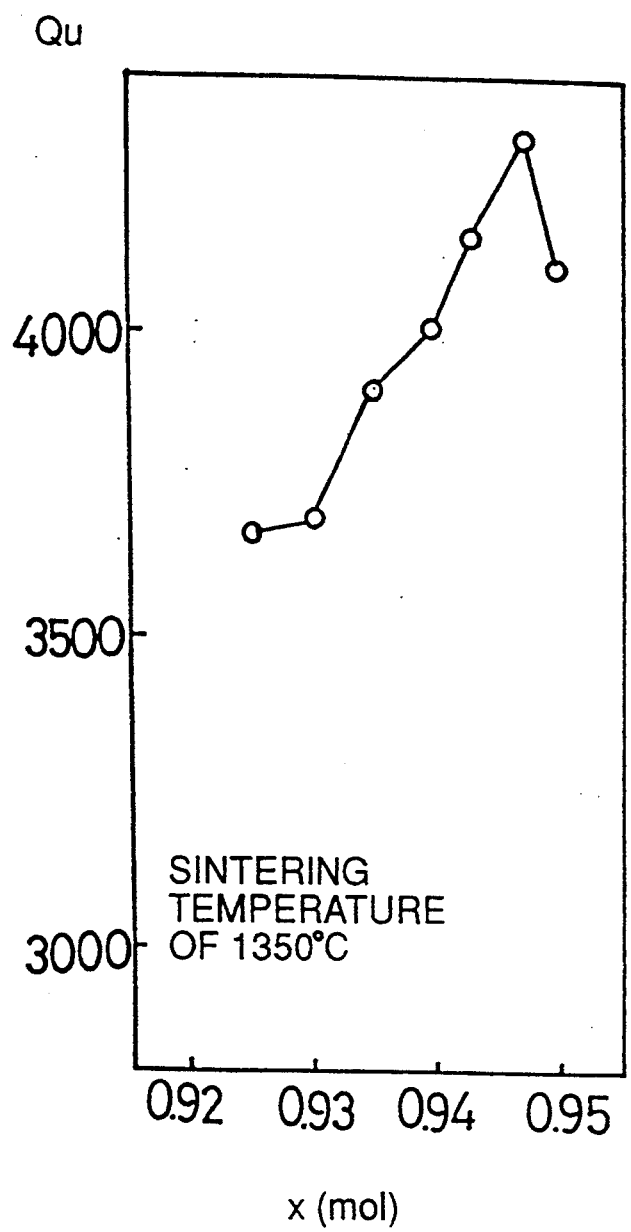
FIG. 1 is a graph showing a relation between x and Qu in a $(xMgTiO_3 \cdot (1-x)CaTiO_3 + 6$ wt % ZnO) ceramic composition produced at a sintering temperature of 1350° C.
Figure 2:
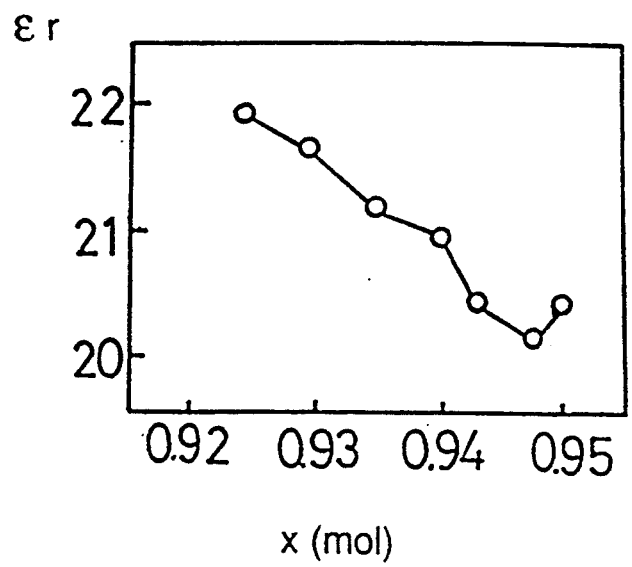
FIG. 2 is a graph showing a relation between x and $\epsilon_r$ in the ceramic composition shown in FIG. 1.
Figure 3:
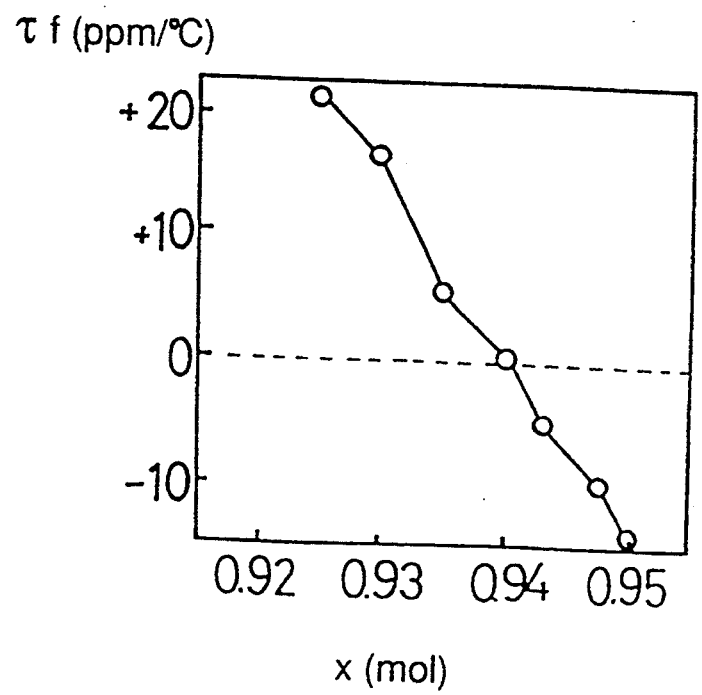
FIG. 3 is a graph showing a relation between x and $\tau f$ in the ceramic composition shown in FIG. 1.
Figure 4:
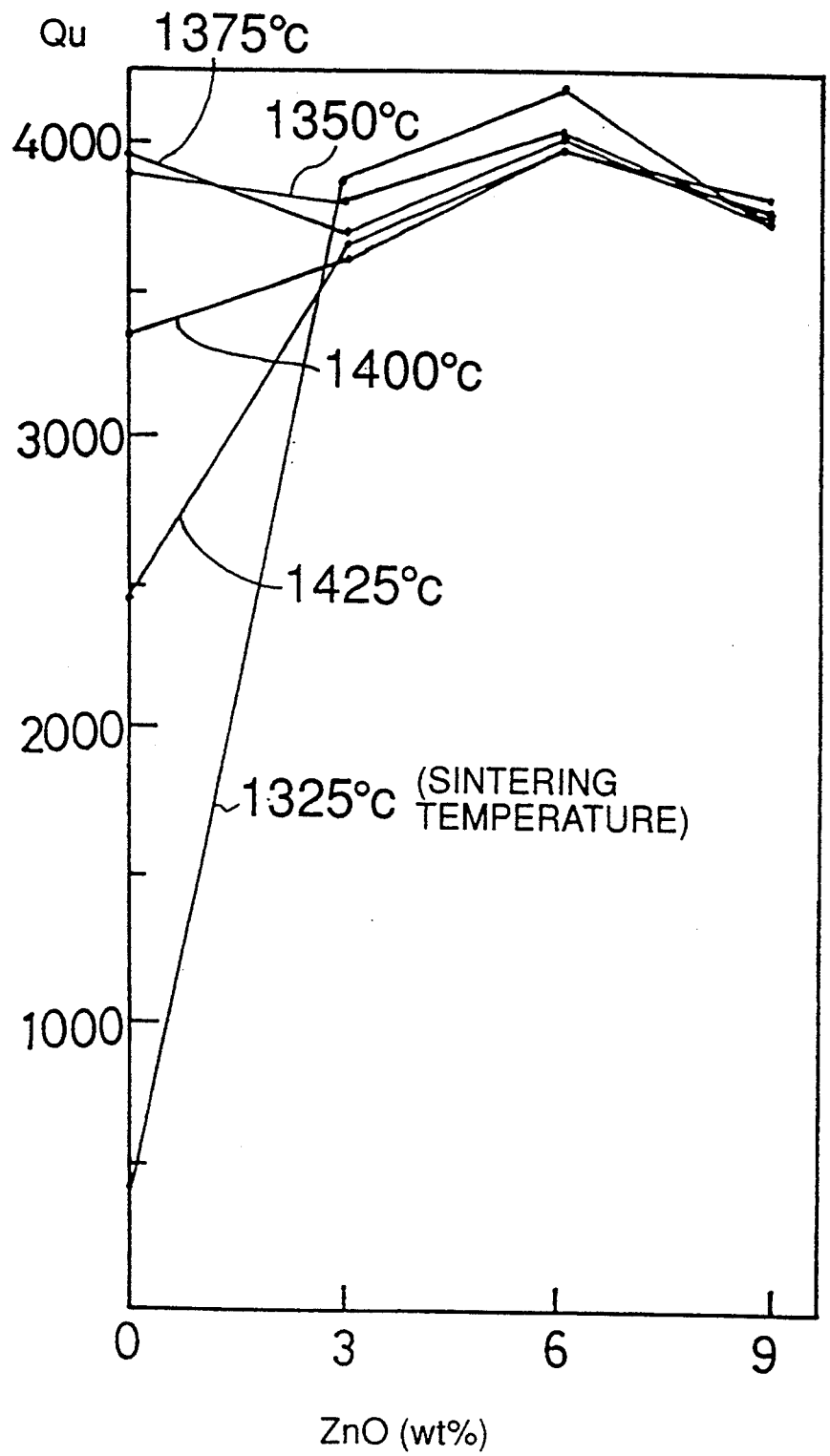
FIG. 4 is a graph showing a relation between the amount of ZnO and Qu in a $(0.94MgTiO_3 \cdot 0.06CaTiO_3 + (0-9)$ wt % ZnO) ceramic composition produced by sintering at each of sintering temperatures.
Figure 5:
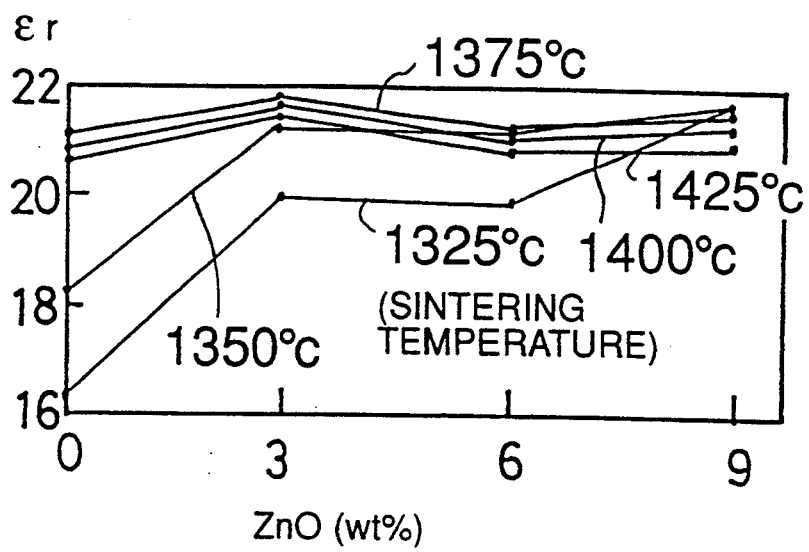
FIG. 5 is a graph showing a relation between the amount of ZnO and $\epsilon_r$ in the ceramic composition shown in FIG. 4.
Figure 6:
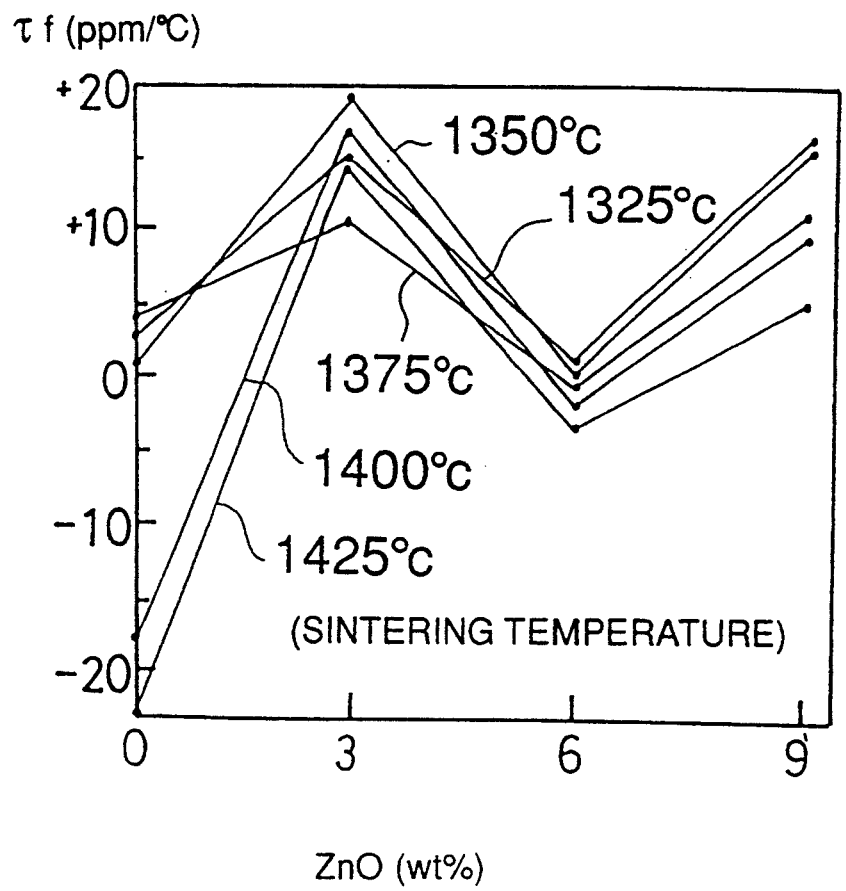
FIG. 6 is a graph showing a relation between the amount of ZnO and $\tau f$ in the ceramic composition shown in FIG. 4.
Figure 7:
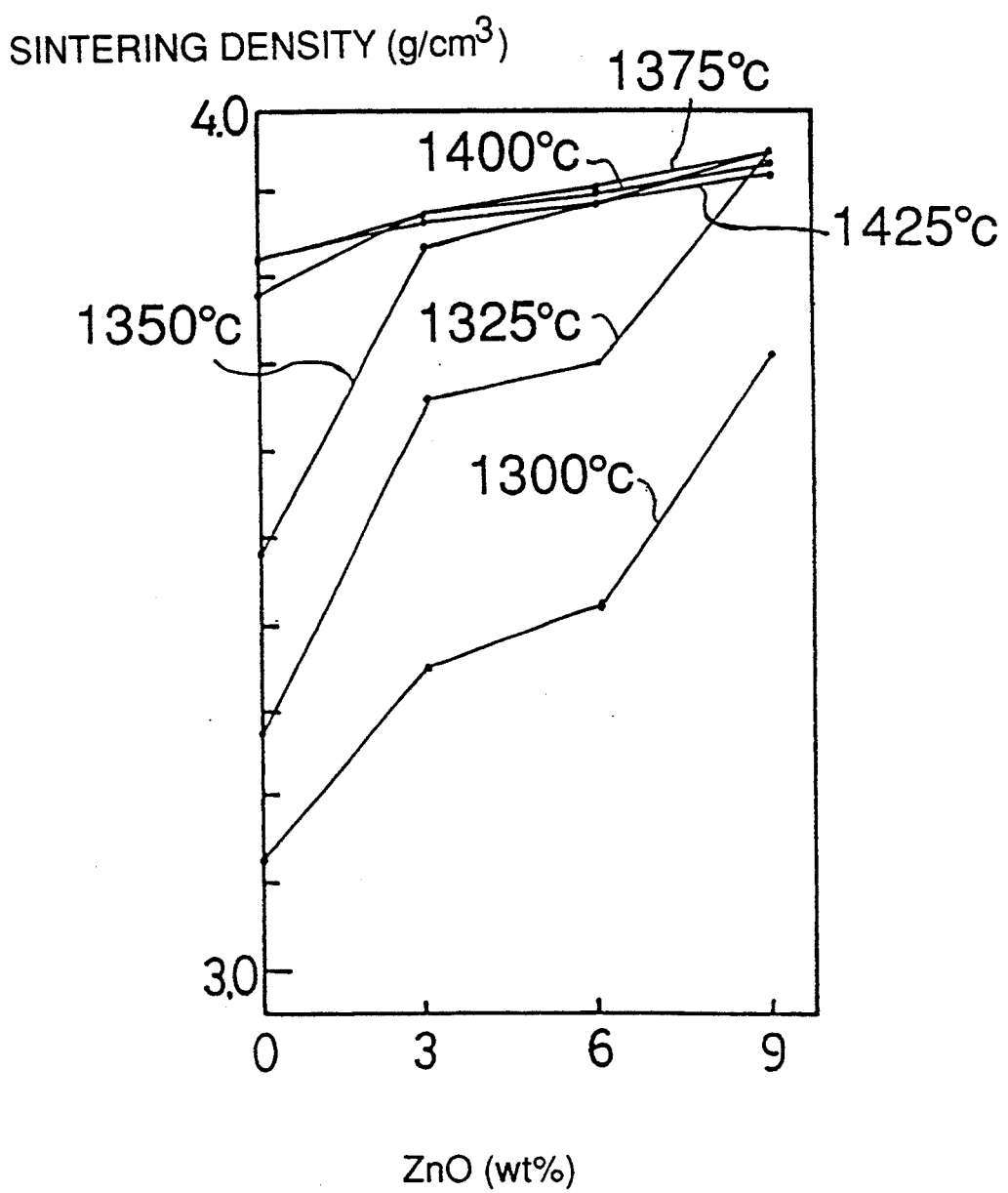
FIG. 7 is a graph showing a relation between the amount of ZnO and the sintering density in the ceramic composition shown in FIG. 4.
Figure 8:
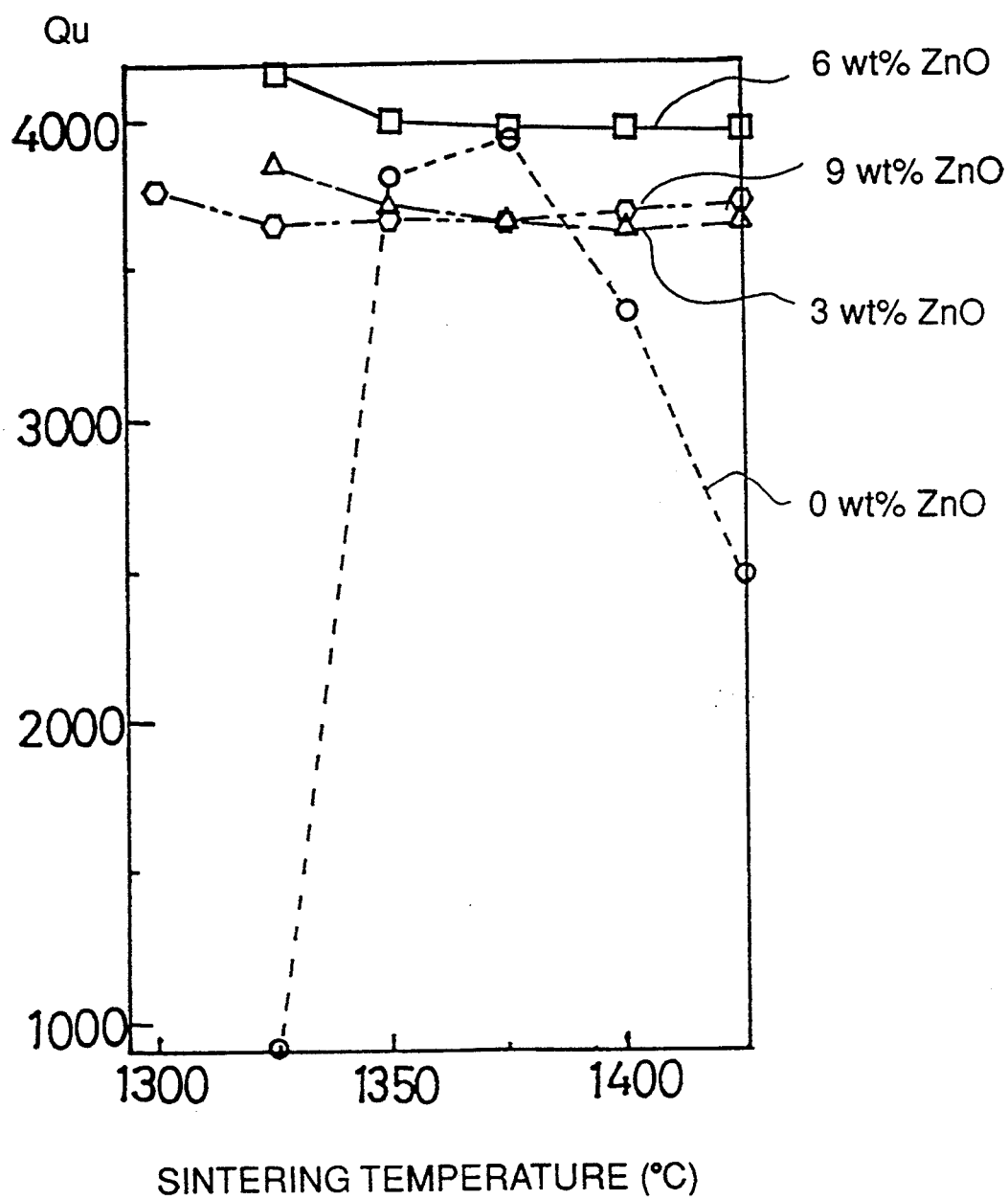
FIG. 8 is a graph showing a relation between the sintering temperature and Qu in the $(0.94MgTiO_3 \cdot 0.06CaTiO_3 + (0-9)$ wt % ZnO) ceramic composition.
Figure 9:
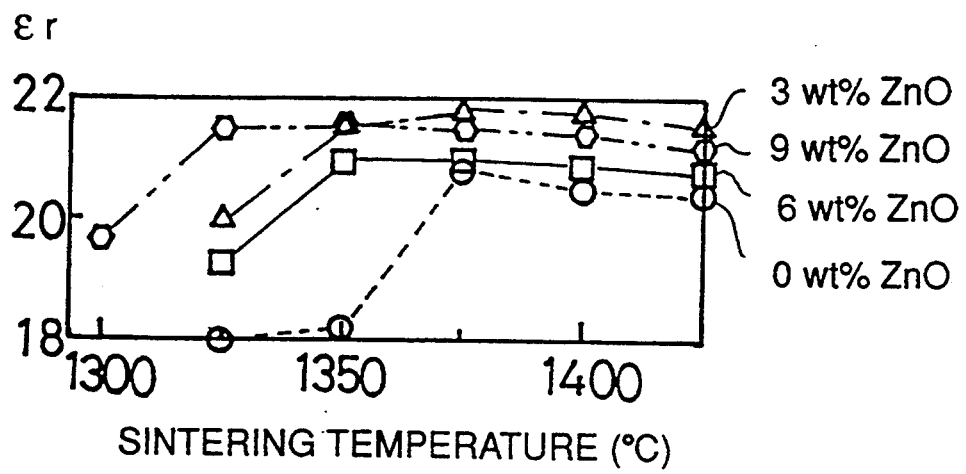
FIG. 9 is a graph showing a relation between the sintering temperature and $\epsilon_r$ in the ceramic composition shown in FIG. 8.
Figure 10:
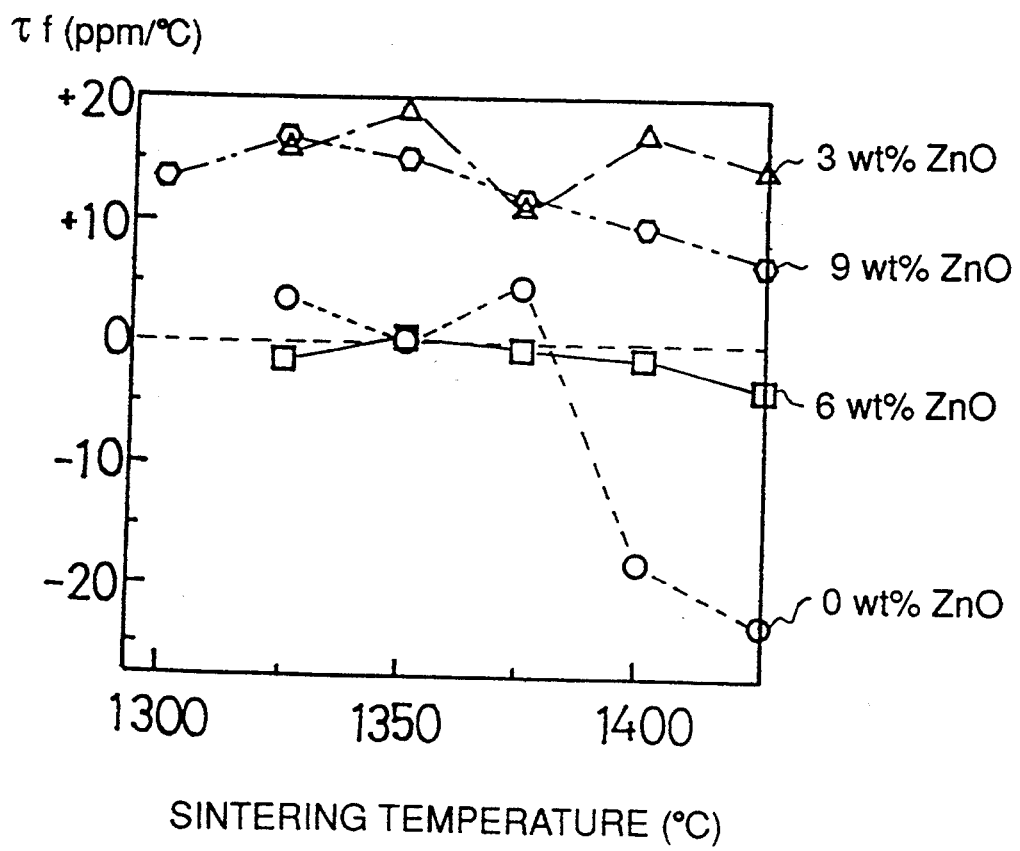
FIG. 10 is a graph showing a relation between the sintering temperature and $\tau f$ in the ceramic composition shown in FIG. 8.
Figure 11:
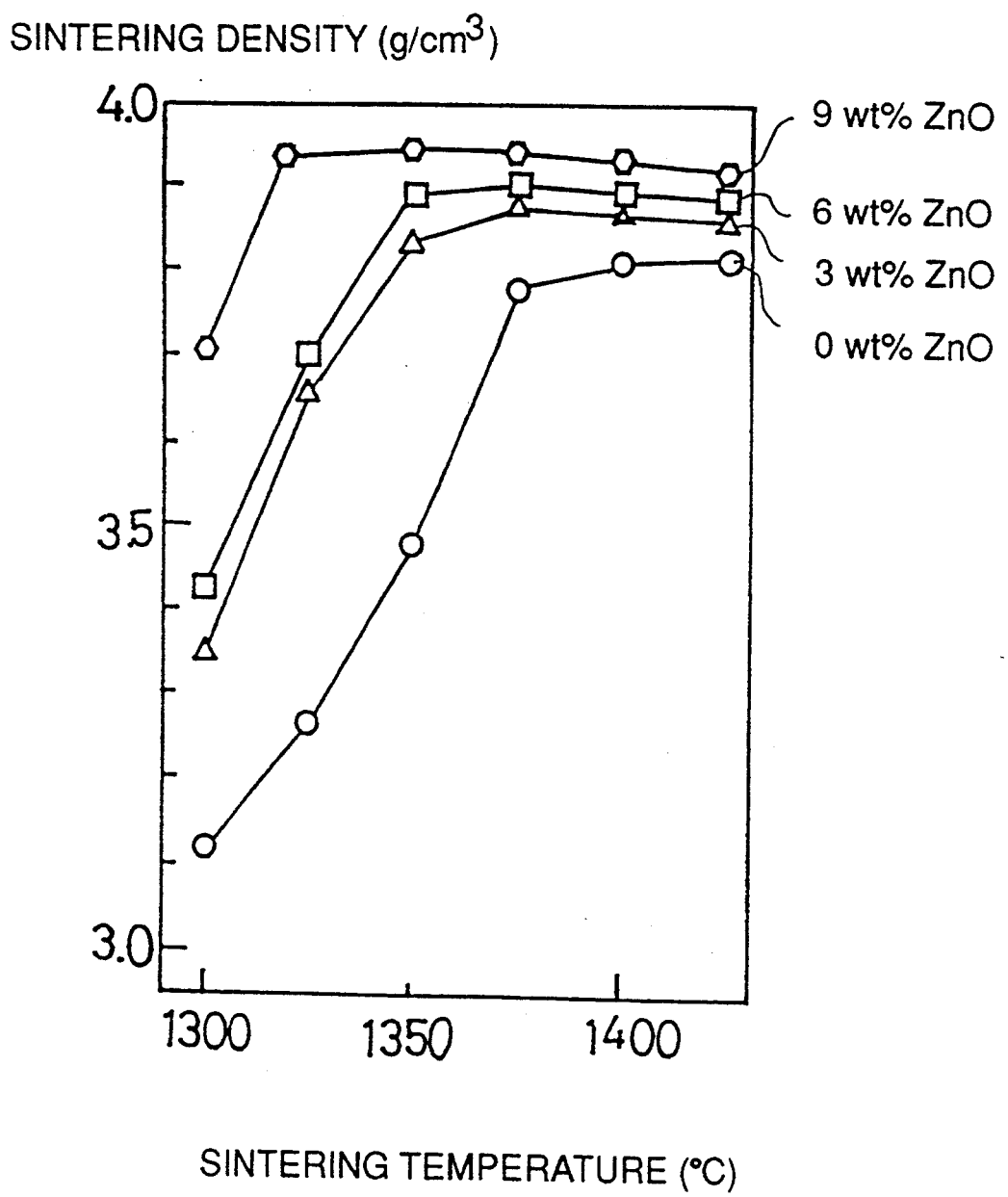
FIG. 11 is a graph showing a relation between the sintering temperature and the sintering density in the ceramic composition shown in FIG. 8.

Now, the present invention will be explained specifically by way of examples.

EXAMPLE 1

MgO powder (99.4% purity), $CaCO_3$ powder for CaO (99% purity), $TiO_2$ powder (99.98% purity) and ZnO powder (99.5% purity) as the starting material were weighted each by a predetermined amount (about 600 g in total) and mixed so as to provide a composition in which each of x and y varies in the formula $xMgTiO_3 \cdot (1-x)CaTiO_3 + y$ wt % ZnO (in which y represents parts by weight of ZnO based on 100 parts by weight of $xMgTiO_3 \cdot (1-x)CaTiO_3$) as shown in Table 1 and FIGS. 1–4. Then, after dry mixing in a mixer (20 to 30 min.) and primary pulverization, they were calcined in an atmospheric air at a temperature of 1100° C. for 2 hours. Subsequently, an appropriate amount of an organic binder (29 g) and water (300–400 g) was added to the calcined powder, which was pulverized together with alumina balls of 20 mmΦ at 90 rpm for 23 hours. Then, the pulverizates were pelletized in vacuum freeze drying (about 0.4 Torr, at 40°–50° C. for about 20 hours), and the thus pelletized raw material was molded into a cylindrical shape of 19 mm Φ×11 mmt (thickness) under a pressing pressure of 1,000 kg/cm².

Subsequently, the molding product was degreased in an atmospheric air at 500° C. for 3 hours and then sintered at each of temperatures with a range of 1300° to 1425° C.

shown in each of the figures of 4 hours and, finally, both end faces were polished to form cylindrical members each of about 16 mmΦ×8 mmt (thickness) as dielectric specimens.

Then, measurement was conducted for each of the specimens, regarding $\epsilon_r$ (relative dielectric constant), Qu and $\tau f$ by a parallel plate dielectric cylindrical resonator method ($TE_{011}$ MODE) or the like and, further, sintering density by an Archimedes method. $\tau f$ was measured in a temperature region of 20° C. to 80° C. and calculated as $\tau f = ((f(80° C.)-f(20° C.))/(f(20° C.)\times\Delta T)\cdot\Delta T:80° C.-20° C.=60° C.$ The resonance frequency is 6 GHz. The results are shown in FIGS. 1–11. As an example, results of X-ray diffraction is shown for a case of $0.95MgTiO_3 \cdot 0.05CaTiO_3$ in FIG. 12 (containing 6% by weight of ZnO based on 0.95 $MgTiO_3 \cdot 0.05CaTiO_3$, sintered at 1300° C. for 4 hours) and in FIG. 13 (not containing ZnO, sintered at 1360° C. for 4 hours).

As can be seen from the results, the value Qu tends to decrease if x in $xMgTiO_3 \cdot (1-x)CaTiO_3$ is small, whereas $\tau f$ and $\epsilon_r$ tend to increase toward the positive side. The sintering density tends to increase as the sintering temperature is higher, whereas it becomes flat relative to the sintering temperature as the addition amount of ZnO is increased.

At a sintering temperature of 1350° to 1425° C., a preferred range for x is from 0.925 to 0.950, since practical characteristic ranges are shown for $\tau f$ as $+23$ to $-17$ ppm/°C., for $\epsilon_r$ as 19 to 22 and for Qu as 3330 to 4390. Particularly, if x=0.940 and the addition amount of ZnO is 6% by weight, at a sintering temperature, for example, of 1350° C. and 1375° C., a particularly excellent balance of characteristics is shown as shown in FIG. 1 to FIG. 6, in which $\tau f$ is from $-1$ to $+1$ ppm/°C., $\epsilon_r$ is about 2.1 and Qu is about 4000. Further, with regard to $\tau f$, since the variation coefficient relative to the sintering temperature is low, a small value around 0 can be adjusted easily. On the other hand, it is not preferred that $CaTiO_3$ is not contained since the value Qu is large but $\epsilon_r$ is small and $\tau f$ remarkably decreases toward the negative side as $-25$ to $-44$ ppm/° C.

TABLE 1

[xMgTiO₃·(1 − x)CaTiO₃ + 0~9 wt % ZnO] ceramic composition

| No. | x | Amount of ZnO (wt %) | Calcining temp. (°C.) | Sinter. temp. (°C.) | Qu (6 GHz) | Rel. dielect. const. $\epsilon_r$ | $\tau f$ (ppm/°C.) | Sint. density (g/cm³) |
|---|---|---|---|---|---|---|---|---|
| 1 | 0.950 | 0 | 1100 | 1350 | 3540 | 19.00 | −21.1 | — |
| 2 | 0.950 | 3 | 1100 | 1350 | 4030 | 20.48 | −10.4 | 3.863 |
| 3 | 0.950 | 6 | 1100 | 1350 | 4090 | 20.39 | −14.1 | 3.911 |
| 4 | 0.950 | 9 | 1100 | 1350 | — | — | — | — |
| 5 | 0.9475 | 0 | 1100 | 1350 | 2880 | 16.80 | −16.9 | 3.386 |
| 6 | 0.9475 | 3 | 1100 | 1350 | 4270 | 20.05 | −5.07 | 3.792 |
| 7 | 0.9475 | 6 | 1100 | 1350 | 4300 | 20.13 | −9.71 | 3.847 |
| 8 | 0.9475 | 9 | 1100 | 1350 | 4360 | 20.05 | −14.7 | 3.895 |
| 9 | 0.943 | 0 | 1100 | 1350 | 3030 | 17.16 | −11.4 | 3.394 |
| 10 | 0.943 | 3 | 1100 | 1350 | 4370 | 19.49 | −7.26 | 3.710 |
| 11 | 0.943 | 6 | 1100 | 1350 | 4140 | 20.38 | −5.01 | 3.849 |
| 12 | 0.943 | 9 | 1100 | 1350 | 4210 | 20.47 | −8.50 | 3.906 |
| 13 | 0.940 | 0 | 1100 | 1350 | 3820 | 18.27 | 0.19 | 3.480 |
| 14 | 0.940 | 3 | 1100 | 1350 | 3720 | 21.52 | 19.0 | 3.834 |
| 15 | 0.940 | 6 | 1100 | 1350 | 4000 | 20.94 | 0.50 | 3.888 |
| 16 | 0.940 | 9 | 1100 | 1350 | 3680 | 21.56 | 15.3 | 3.944 |
| 17 | 0.935 | 0 | 1100 | 1350 | 3890 | 18.39 | 7.85 | 3.467 |
| 18 | 0.935 | 3 | 1100 | 1350 | 3530 | 21.39 | 21.9 | 3.798 |
| 19 | 0.935 | 6 | 1100 | 1350 | 3900 | 21.25 | 5.32 | 3.893 |
| 20 | 0.935 | 9 | 1100 | 1350 | 3640 | 21.83 | 17.2 | 3.954 |
| 21 | 0.930 | 0 | 1100 | 1350 | 3820 | 19.54 | 15.1 | 3.577 |
| 22 | 0.930 | 3 | 1100 | 1350 | 3610 | 21.02 | 17.2 | 3.789 |
| 23 | 0.930 | 6 | 1100 | 1350 | 3690 | 21.64 | 16.6 | 3.896 |
| 24 | 0.930 | 9 | 1100 | 1350 | 3780 | 21.55 | 8.86 | 3.942 |
| 25 | 0.925 | 0 | 1100 | 1350 | 3110 | 18.82 | 17.3 | 3.467 |
| 26 | 0.925 | 3 | 1100 | 1350 | 3600 | 21.13 | 21.6 | 3.758 |
| 27 | 0.925 | 6 | 1100 | 1350 | 3670 | 21.92 | 21.1 | 3.897 |
| 28 | 0.925 | 9 | 1100 | 1350 | 3660 | 21.89 | 16.6 | 3.948 |

Figure 12:
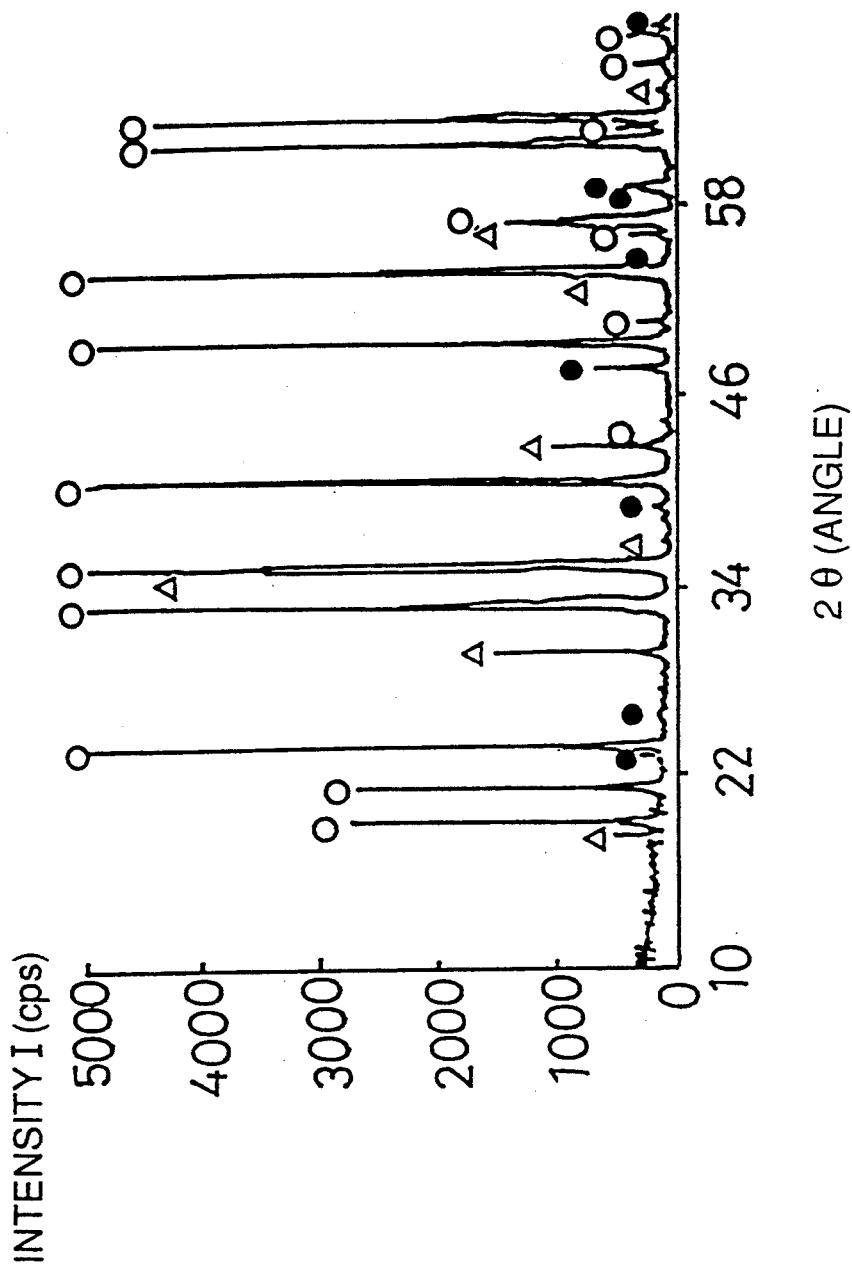
FIG. 12 is a graph showing the result of X-ray diffraction of a $(0.95MgTiO_3 \cdot 0.05CaTiO_3 + 6$ wt % ZnO) ceramic composition.
Figure 13:
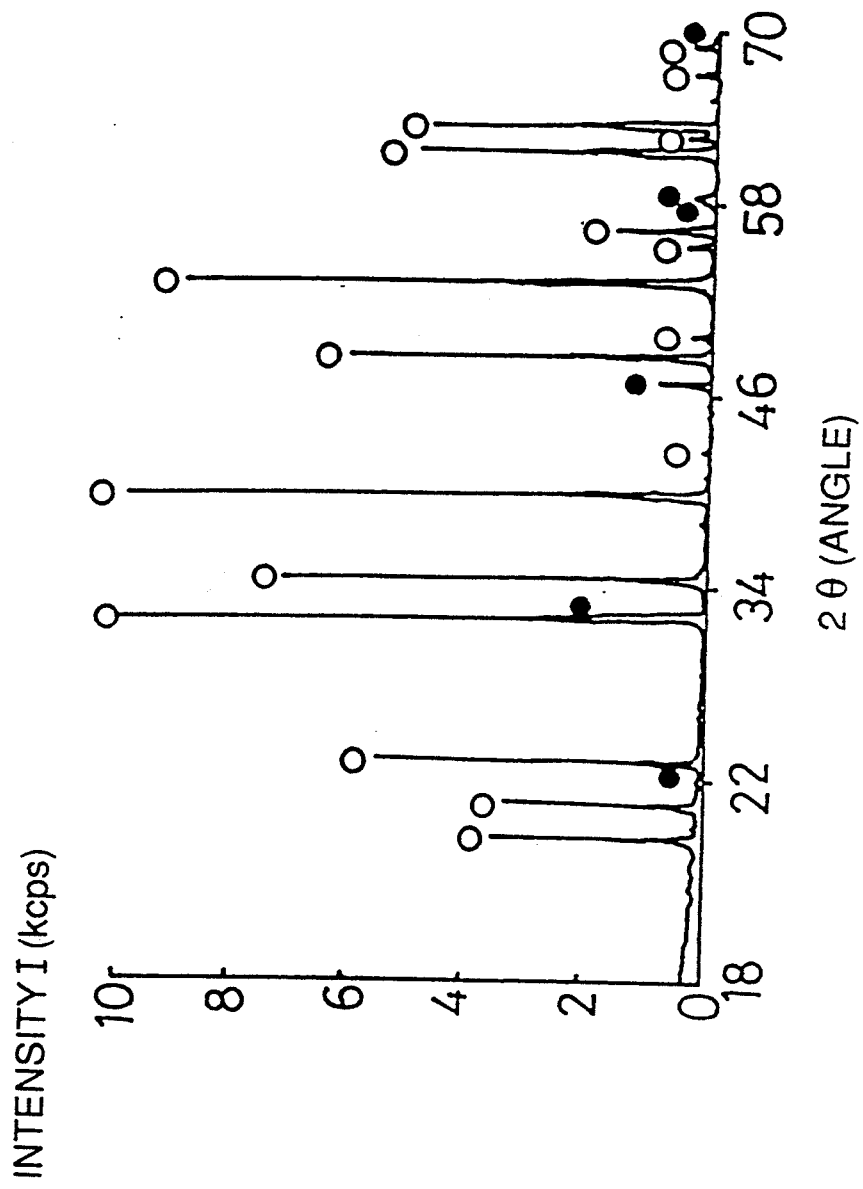
FIG. 13 is a graph showing the result of X-ray diffraction of a $(0.95MgTiO_3 \cdot 0.05CaTiO_3)$ ceramic composition.

Further, the analysis method based on the absence or presence of X-ray diffraction peak in FIG. 12, shows that the structure of products according to the present invention contains $MgTiO_3$ (○), partially containing $ZnTiO_3$) and $CaTiO_3$ (●) and, as other peaks, $Mg_2TiO_4$ (Δ partially containing $ZnTiO_4$) and not containing MgO, CaO and $TiO_2$. FIG. 13 shows a case not containing ZnO, which shows that the structure comprises $MgTiO_3$ (○) and $CaTiO_3$ (●), also shows that MgO, CaO, $TiO_2$ are not contained.

Further, although not illustrated, results of electron microscopic photograph show that the grain size increases along with elevation of the sintering temperature (1300° C.: 3.1 μm, 1350° C.: 7.2 μm, 1400° C.: 12.8 μm, each measured by Intercept method), pores decrease and densification is completed at 1400° C. The rapture cross section showed grain boundary destruction at 1300° C. and intergrain destruction above 1350° C.

EXAMPLE 2

Figure 14:
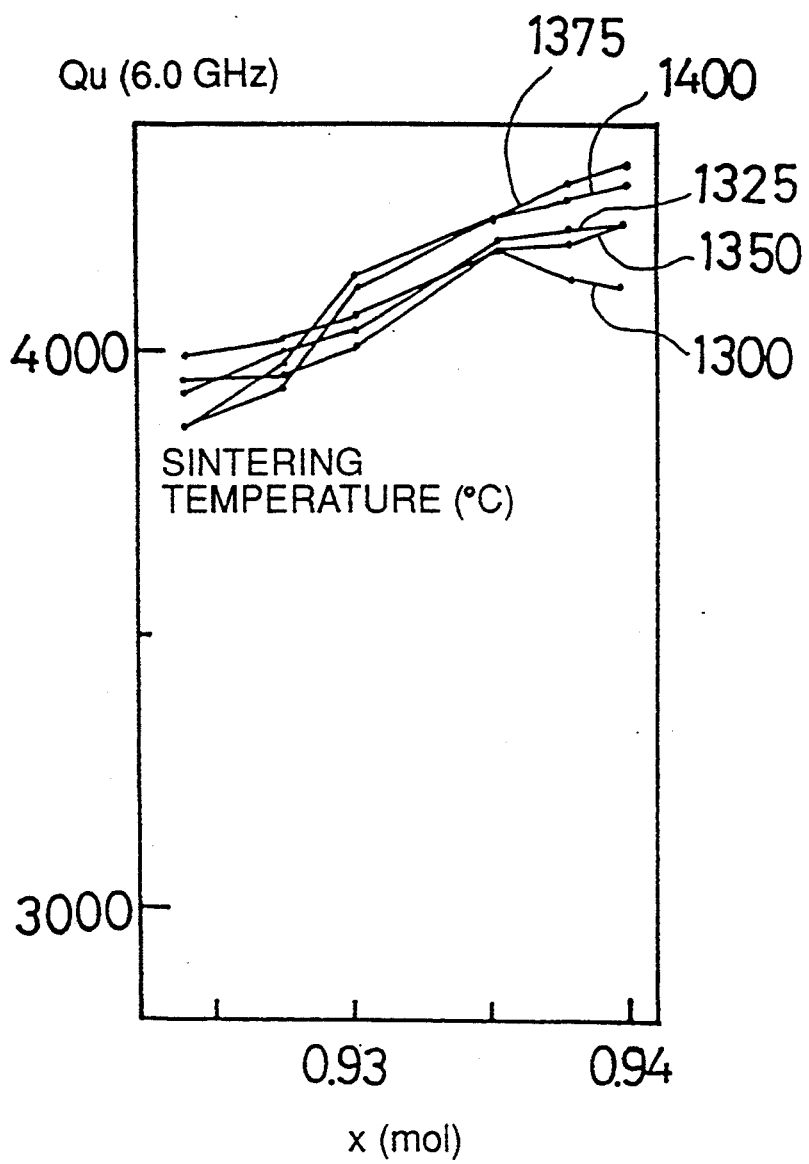
FIG. 14 is a graph showing a relation between x and Qu in a $(xMgTiO_3 \cdot (1-x)CaTiO_3 + 3$ wt % $Ta_2O_5)$ ceramic composition produced by sintering at each of sintering temperatures.
Figure 15:
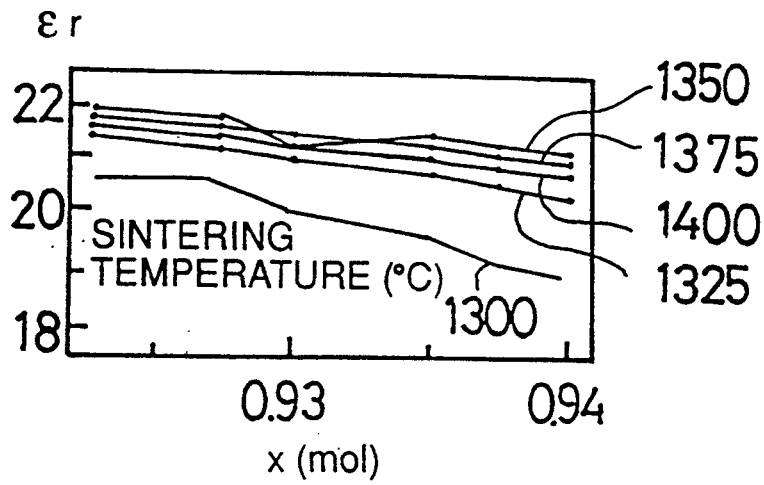
FIG. 15 is a graph showing a relation between x and $\epsilon_r$ in the ceramic composition shown in FIG. 14.
Figure 16:
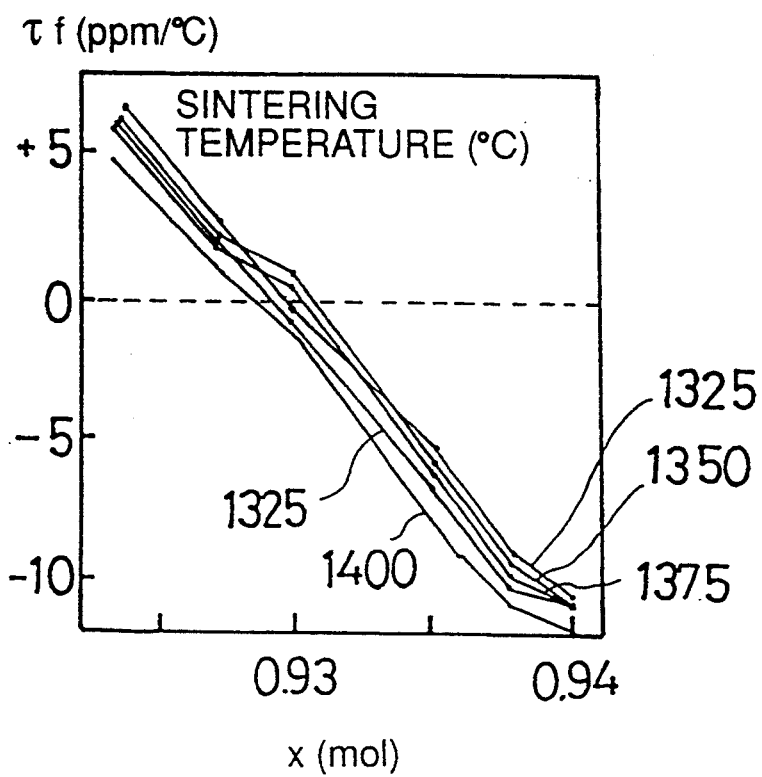
FIG. 16 is a graph showing a relation between x and $\tau f$ in the ceramic composition shown in FIG. 14.
Figure 17:
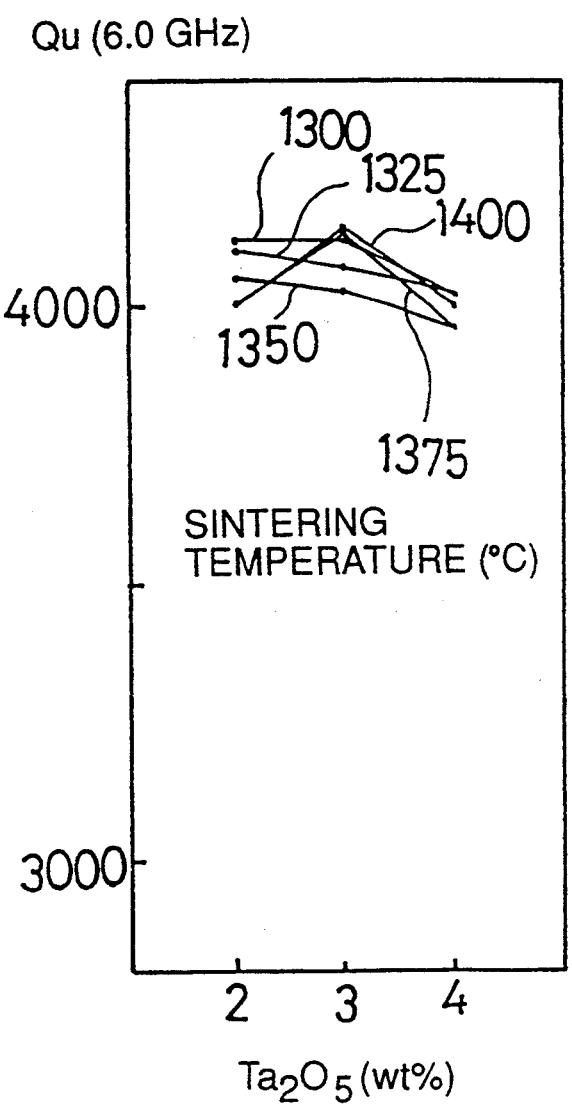
FIG. 17 is a graph showing a relation between the amount of $Ta_2O_5$ and Qu in a $(0.93MgTiO_3 \cdot 0.07CaTiO_3 + (2-4)$ wt % $Ta_2O_5)$ ceramic composition produced by sintering at each of sintering temperatures.
Figure 18:
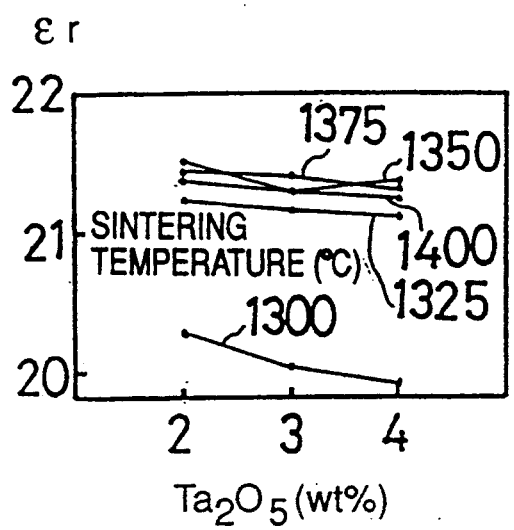
FIG. 18 is a graph showing a relation between the amount of $Ta_2O_5$ and $\epsilon_r$ in the ceramic composition shown in FIG. 17.
Figure 19:
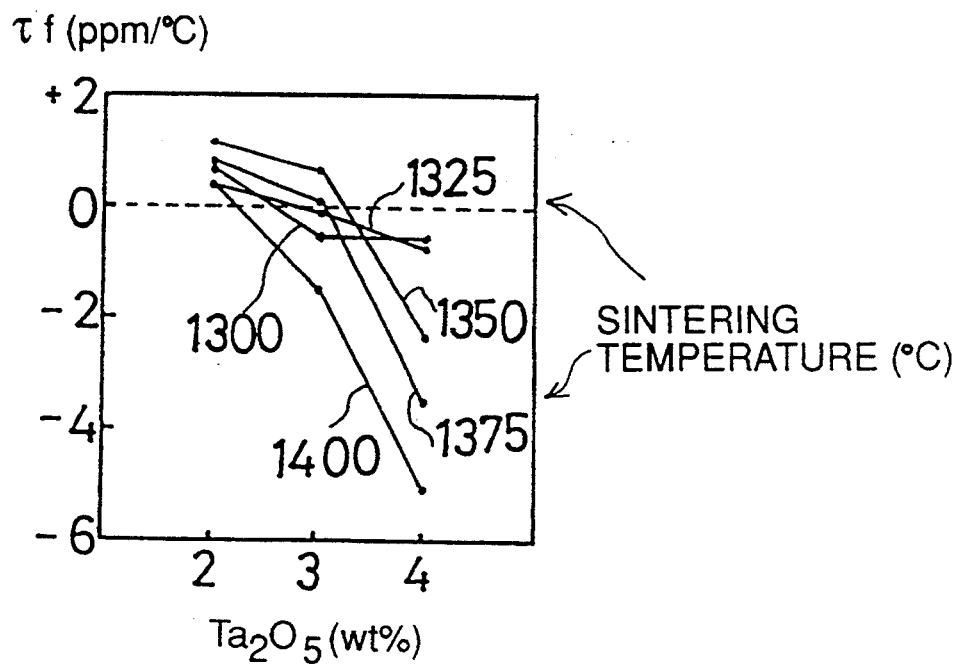
FIG. 19 is a graph showing a relation between the amount of $Ta_2O_5$ and $\tau f$ in the ceramic composition shown in FIG. 17.
Figure 20:
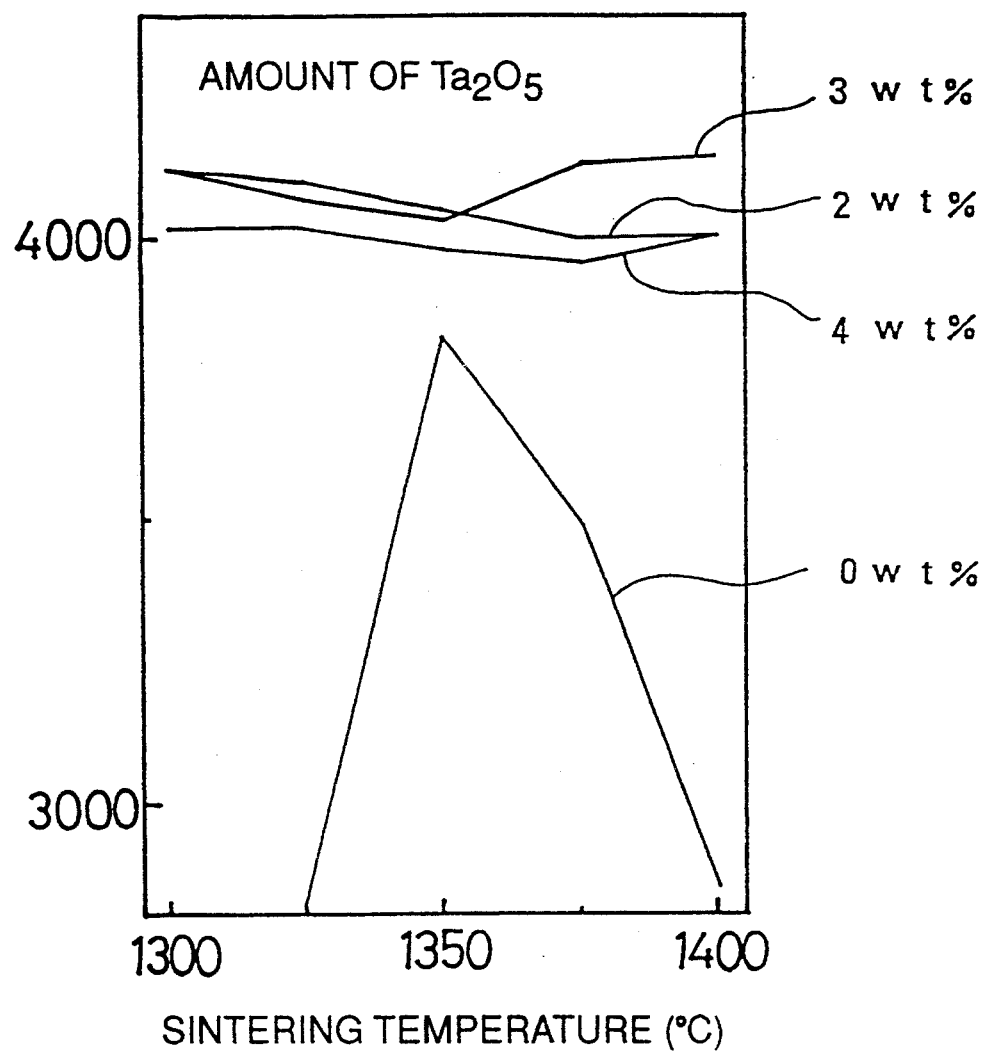
FIG. 20 is a graph showing a relation between the sintering temperature and Qu in the $(0.93MgTiO_3 \cdot 0.07CaTiO_3 + (0-4)$ wt % $Ta_2O_5)$ ceramic composition.
Figure 21:
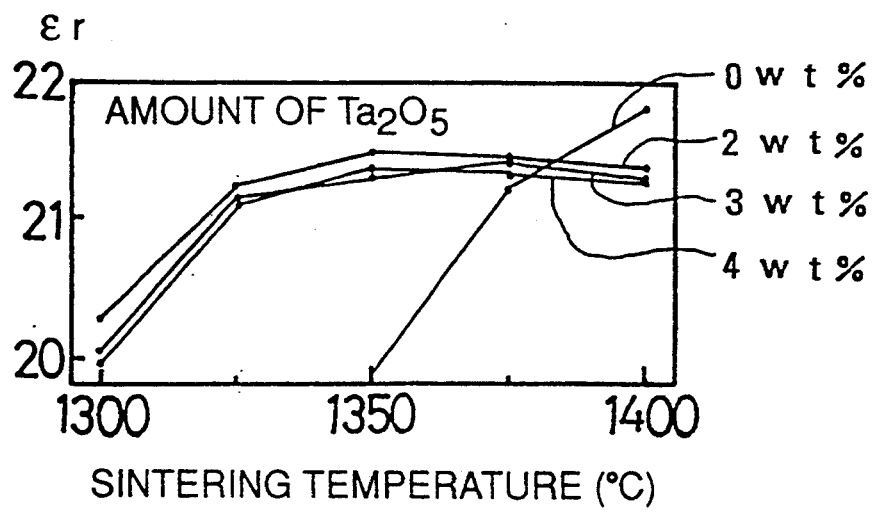
FIG. 21 is a graph showing a relation between the sintering temperature and $\epsilon_r$ in the ceramic composition shown in FIG. 20.
Figure 22:
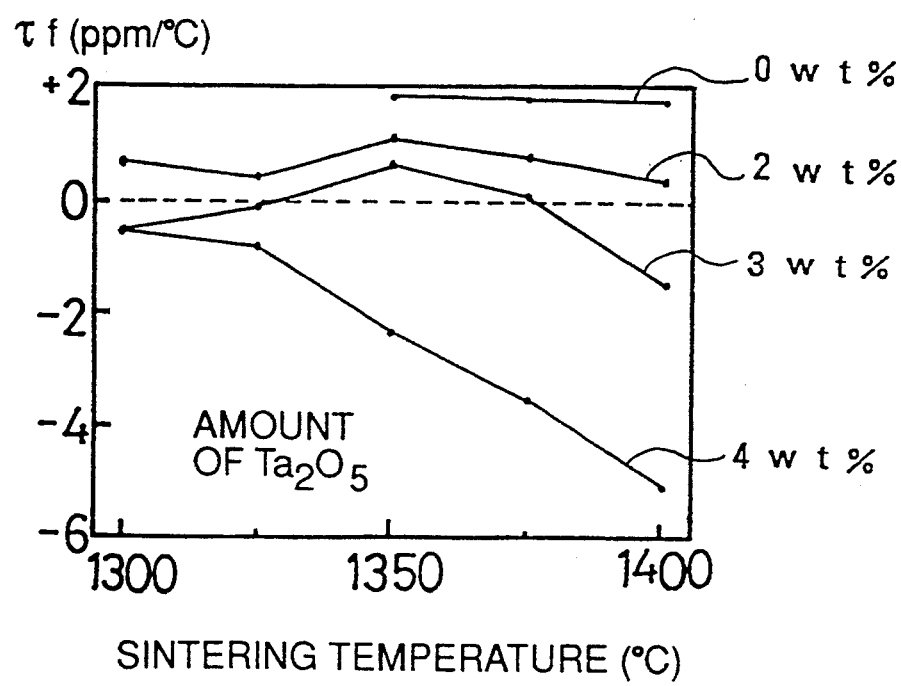
FIG. 22 is a graph showing a relation between the sintering temperature and $\tau f$ in the ceramic composition shown in FIG. 20.
Figure 23:
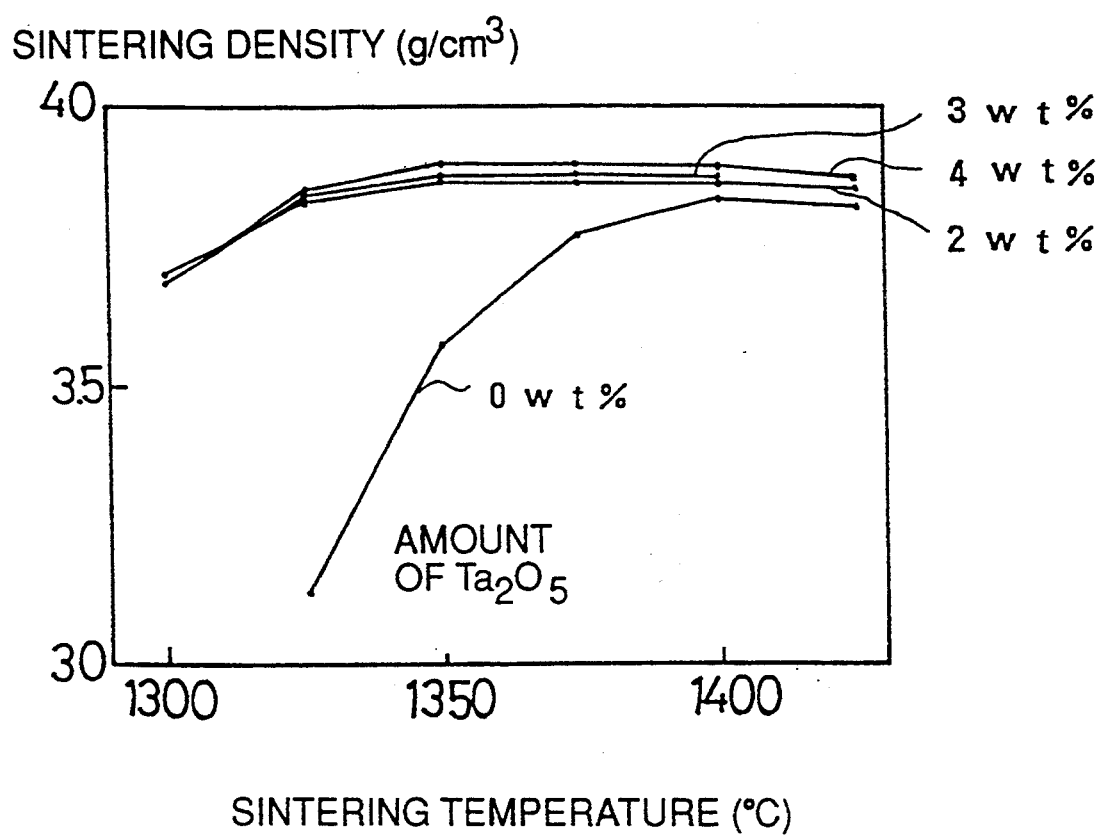
FIG. 23 is a graph showing a relation between the sintering temperature and the sintering density in the ceramic composition shown in FIG. 20.
Figure 24:
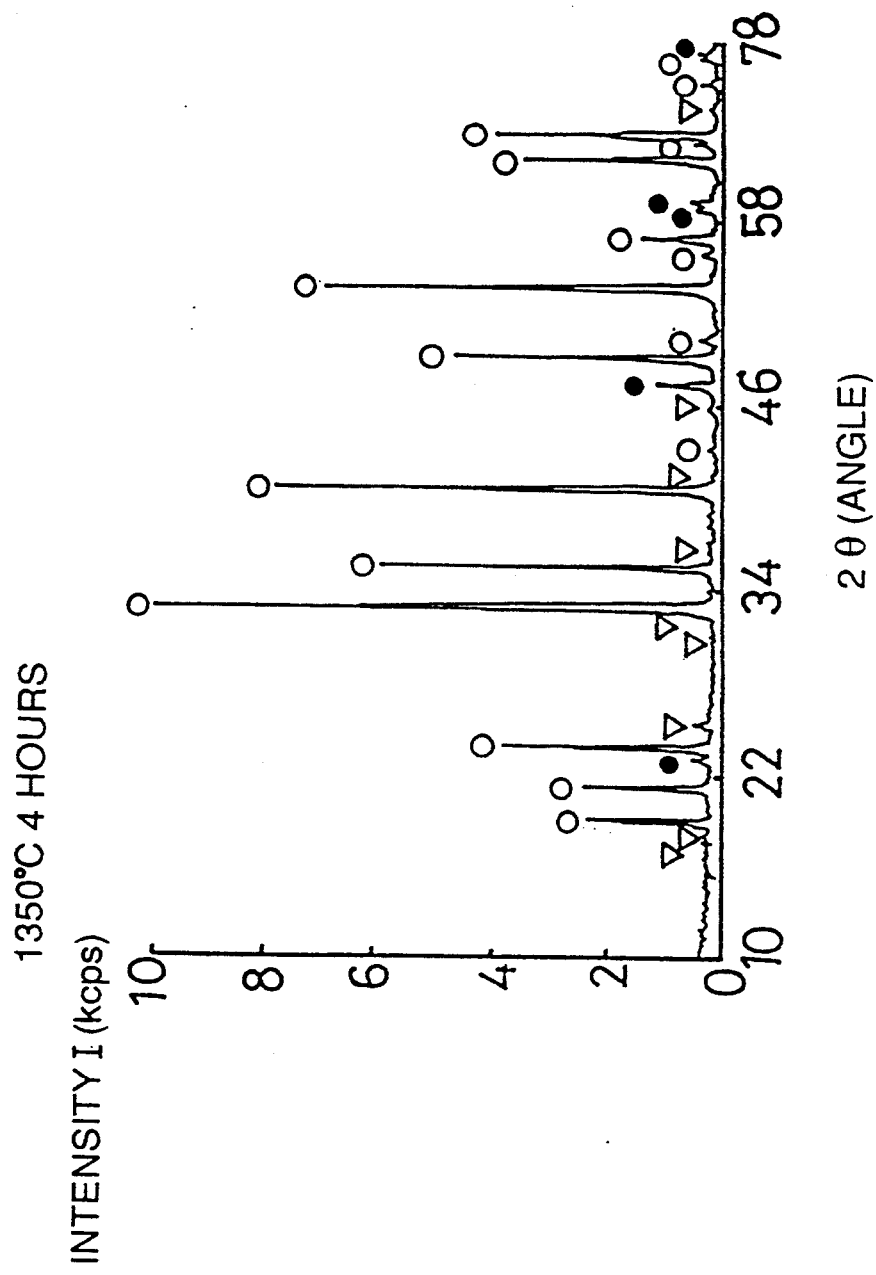
FIG. 24 is a graph showing the result of X-ray diffraction of a $xMgTiO_3 \cdot (1-x)CaTiO_3 + 3$ wt % $Ta_2O_5$, the sintering temperature: 1300° C.) ceramic composition.

Using $Ta_2O_5$ powder (99.9% purity) instead of the ZnO powder used in Example 1, a predetermined amount of the starting material (about 500 g in total) was weighted and mixed so as to provide a composition in which x and y vary in the formula: x $MgTiO_3$·(1−x)$CaTiO_3$+y wt % $Ta_2O_5$ in which y means % be weight of $Ta_2O_5$ based on 100 parts by weight of x$MgTiO_3$·(1−x)$CaTiO_3$) as shown in Tables 2 and 3 and FIGS. 14 and 17. Subsequently, molding products of the same shape were produced, sintered in the same manner, and then polished to prepare dielectric specimens of the same shape as in Example 1. Further, characteristics were measured by the same method and the results are shown in Tables 2-3 and FIGS. 14-23. Further, as an example, results of X-ray diffraction of 0.93$MgTiO_3$·0.07$CaTiO_3$3 wt % in a case of $Ta_2O_5$ are shown in FIG. 24 (sintered at 1300° C. for 4 hours) and in FIG. 25 (sintered at 1350° C. for 4 hours).

From the foregoing results, the value Qu tends to decrease if x is small in x $MgTiO_3$·(1−x)$CaTiO_3$ but τf and $\epsilon_r$ tend to increase toward the positive side. Further, the sintering density tends to increase along with elevation of

TABLE 2

[x$MgTiO_3$·(1 − x)$CaTiO_3$ + 3 wt % $Ta_2O_5$] ceramic composition

| No. | x | Amount of $Ta_2O_5$ (wt %) | Calcining temp. (°C.) | Sinter. temp. (°C.) | Qu (6 GHz) | Rel. dielect. const. $\epsilon r$ | τ f (ppm/°C.) | Sint. density (g/cm³) |
|---|---|---|---|---|---|---|---|---|
| 1 | 0.940 | 3 | 1100 | 1400 | 4350 | 20.68 | −12.48 | 3.870 |
| 2 | 0.9375 | 3 | 1100 | 1400 | 4310 | 20.82 | −11.0 | 3.872 |
| 3 | 0.935 | 3 | 1100 | 1400 | 4260 | 20.97 | −8.50 | 3.875 |
| 4 | 0.930 | 3 | 1100 | 1400 | 4140 | 21.28 | −1.47 | 3.868 |
| 5 | 0.927 | 3 | 1100 | 1400 | 3940 | 21.50 | 1.02 | 3.875 |
| 6 | 0.923 | 3 | 1100 | 1400 | 3850 | 21.72 | 5.10 | 3.875 |
| 7 | 0.940 | 3 | 1100 | 1375 | 4380 | 20.76 | −11.4 | 3.875 |
| 8 | 0.9375 | 3 | 1100 | 1375 | 4330 | 20.88 | −9.40 | 3.878 |
| 9 | 0.935 | 3 | 1100 | 1375 | 4260 | 21.07 | −6.58 | 3.881 |
| 10 | 0.930 | 3 | 1100 | 1375 | 4130 | 21.39 | 0.09 | 3.876 |
| 11 | 0.927 | 3 | 1100 | 1375 | 3890 | 21.60 | 1.70 | 3.884 |
| 12 | 0.923 | 3 | 1100 | 1375 | 3850 | 21.81 | 6.20 | 3.882 |
| 13 | 0.940 | 3 | 1100 | 1350 | 4230 | 20.77 | −11.4 | 3.874 |
| 14 | 0.9375 | 3 | 1100 | 1350 | 4190 | 20.90 | −9.12 | 3.874 |
| 15 | 0.935 | 3 | 1100 | 1350 | 4180 | 21.08 | −6.40 | 3.881 |
| 16 | 0.930 | 3 | 1100 | 1350 | 4030 | 21.28 | 0.65 | 3.874 |
| 17 | 0.927 | 3 | 1100 | 1350 | 3920 | 21.64 | 2.26 | 3.884 |
| 18 | 0.923 | 3 | 1100 | 1350 | 3900 | 21.87 | 6.87 | 3.882 |
| 19 | 0.940 | 3 | 1100 | 1325 | 4230 | 20.49 | −11.3 | 3.835 |
| 20 | 0.9375 | 3 | 1100 | 1325 | 4220 | 20.62 | −8.94 | 3.835 |
| 21 | 0.935 | 3 | 1100 | 1325 | 4190 | 20.90 | −5.78 | 3.850 |
| 22 | 0.930 | 3 | 1100 | 1325 | 4070 | 21.15 | −0.11 | 3.834 |
| 23 | 0.927 | 3 | 1100 | 1325 | 3980 | 21.46 | 3.09 | 3.855 |
| 24 | 0.923 | 3 | 1100 | 1325 | 3890 | 21.61 | 7.16 | 3.844 |
| 25 | 0.940 | 3 | 1100 | 1300 | 4130 | 19.06 | −11.4 | 3.640 |
| 26 | 0.9375 | 3 | 1100 | 1300 | 4150 | 19.26 | −9.73 | 3.650 |
| 27 | 0.935 | 3 | 1100 | 1300 | 4180 | 19.71 | −6.75 | 3.687 |
| 28 | 0.930 | 3 | 1100 | 1300 | 4120 | 20.04 | −0.53 | 3.686 |
| 29 | 0.927 | 3 | 1100 | 1300 | 4070 | 20.70 | 1.82 | 3.753 |
| 30 | 0.923 | 3 | 1100 | 1300 | 3980 | 20.59 | 6.8 | 3.706 |

TABLE 3

[x$MgTiO_3$·(1 − x)$CaTiO_3$ + 2~4 wt % $Ta_2O_5$] ceramic composition

| No. | x | Amount of $Ta_2O_5$ (wt %) | Calcining temp. (°C.) | Sinter. temp. (°C.) | Qu (6 GHz) | Rel. dielect. const. $\epsilon r$ | τ f (ppm/°C.) | Sint. density (g/cm³) |
|---|---|---|---|---|---|---|---|---|
| 1 | 0.923 | 3 | 1100 | 1425 | 3840 | 21.59 | 3.92 | 3.863 |
| 2 | 0.927 | 3 | 1100 | 1425 | 3900 | 21.34 | 0. | 3.862 |
| 3 | 0.930 | 2 | 1100 | 1425 | 4060 | 21.26 | 0.31 | 3.848 |
| 4 | 0.930 | 4 | 1100 | 1425 | 4000 | 21.05 | −6.27 | 3.872 |
| 5 | 0.930 | 2 | 1100 | 1400 | 4000 | 21.37 | 0.37 | 3.861 |
| 6 | 0.930 | 3 | 1100 | 1400 | 4140 | 21.28 | −1.47 | 3.868 |
| 7 | 0.930 | 4 | 1100 | 1400 | 4000 | 21.25 | −5.08 | 3.889 |
| 8 | 0.930 | 2 | 1100 | 1375 | 4000 | 21.44 | 0.81 | 3.863 |

TABLE 3-continued

[xMgTiO$_3$·(1 − x)CaTiO$_3$ + 2~4 wt % Ta$_2$O$_5$] ceramic composition

| No. | x | Amount of Ta$_2$O$_5$ (wt %) | Calcining temp. (°C.) | Sinter. temp. (°C.) | Qu (6 GHz) | Rel. dielect. const. $\epsilon_r$ | $\tau f$ (ppm/°C.) | Sint. density (g/cm$^3$) |
|---|---|---|---|---|---|---|---|---|
| 9 | 0.930 | 3 | 1100 | 1375 | 4130 | 21.39 | 0.09 | 3.876 |
| 10 | 0.930 | 4 | 1100 | 1375 | 3960 | 21.31 | −3.52 | 3.895 |
| 11 | 0.930 | 2 | 1100 | 1350 | 4050 | 21.47 | 1.10 | 3.865 |
| 12 | 0.930 | 3 | 1100 | 1350 | 4030 | 21.28 | 0.65 | 3.874 |
| 13 | 0.930 | 4 | 1100 | 1350 | 3980 | 21.36 | −2.33 | 3.894 |
| 14 | 0.930 | 2 | 1100 | 1325 | 4100 | 21.23 | 0.42 | 3.829 |
| 15 | 0.930 | 3 | 1100 | 1325 | 4070 | 21.15 | −0.11 | 3.834 |
| 16 | 0.930 | 4 | 1100 | 1325 | 4020 | 21.10 | −0.76 | 3.848 |
| 17 | 0.930 | 2 | 1100 | 1300 | 4120 | 20.27 | 0.68 | 3.698 |
| 18 | 0.930 | 3 | 1100 | 1300 | 4120 | 20.04 | −0.53 | 3.686 |
| 19 | 0.930 | 4 | 1100 | 1300 | 4020 | 19.90 | −0.53 | 3.686 | the sintering temperature but it becomes flat relative to the sintering temperature as the addition amount of Ta$_2$O$_5$ increases.

At a sintering temperature from 1300° C., a preferred range of x is from 0.923 to 0.940, since practical characteristic ranges are shown for $\tau f$ as −13 to +8 ppm/° C., for $\epsilon_r$ as 19 to 22 and for Qu as 3850 to 4380. Particularly, if x is 0.930 and the addition amount of Ta$_2$O$_5$ is 3% by weight, at a sintering temperature, for example, of 1325° C. to 1375° C., $\tau f$ is from −0.1 to +0.65 ppm/° C., $\epsilon_r$ is from 21.1 to 21.4 and Qu is from 4030 to 4230, as shown in FIG. 14 to FIG. 19 and Tables 2 and 3, showing particularly excellent balance of the characteristics and the scattering thereof is extremely small. On the other hand, it is not preferred that CaTiO$_3$ is not contained, since the Qu value is large, $\epsilon_r$ is small and, in addition, $\tau f$ extremely decreases toward the negative side as −25 to −44 ppm/° C.

Figure 25:
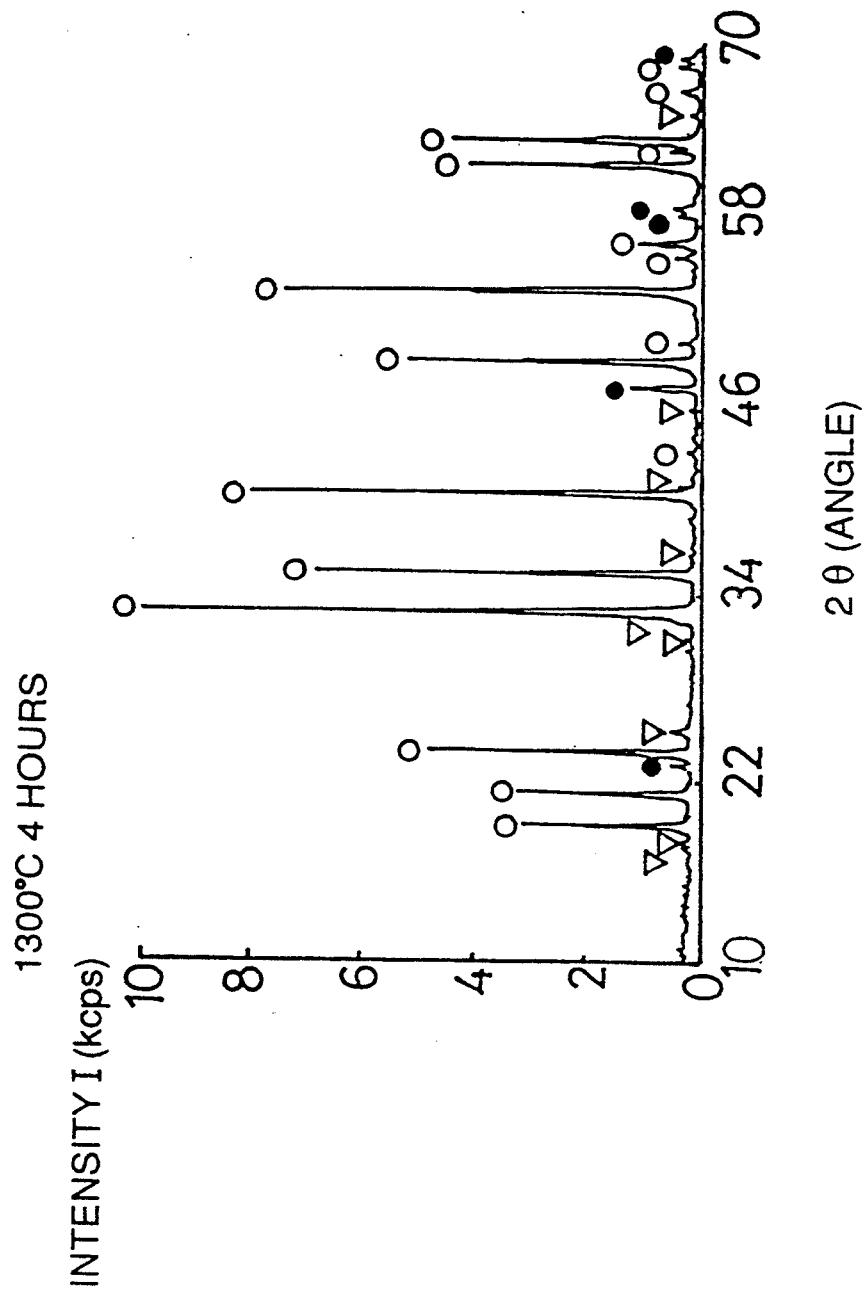
FIG. 25 is a graph showing the result of X-ray diffraction of a $xMgTiO_3 \cdot (1-x)CaTiO_3 + 3$ wt % $Ta_2O_5$, the sintering temperature: 1350° C.) ceramic composition.
Figure 26:
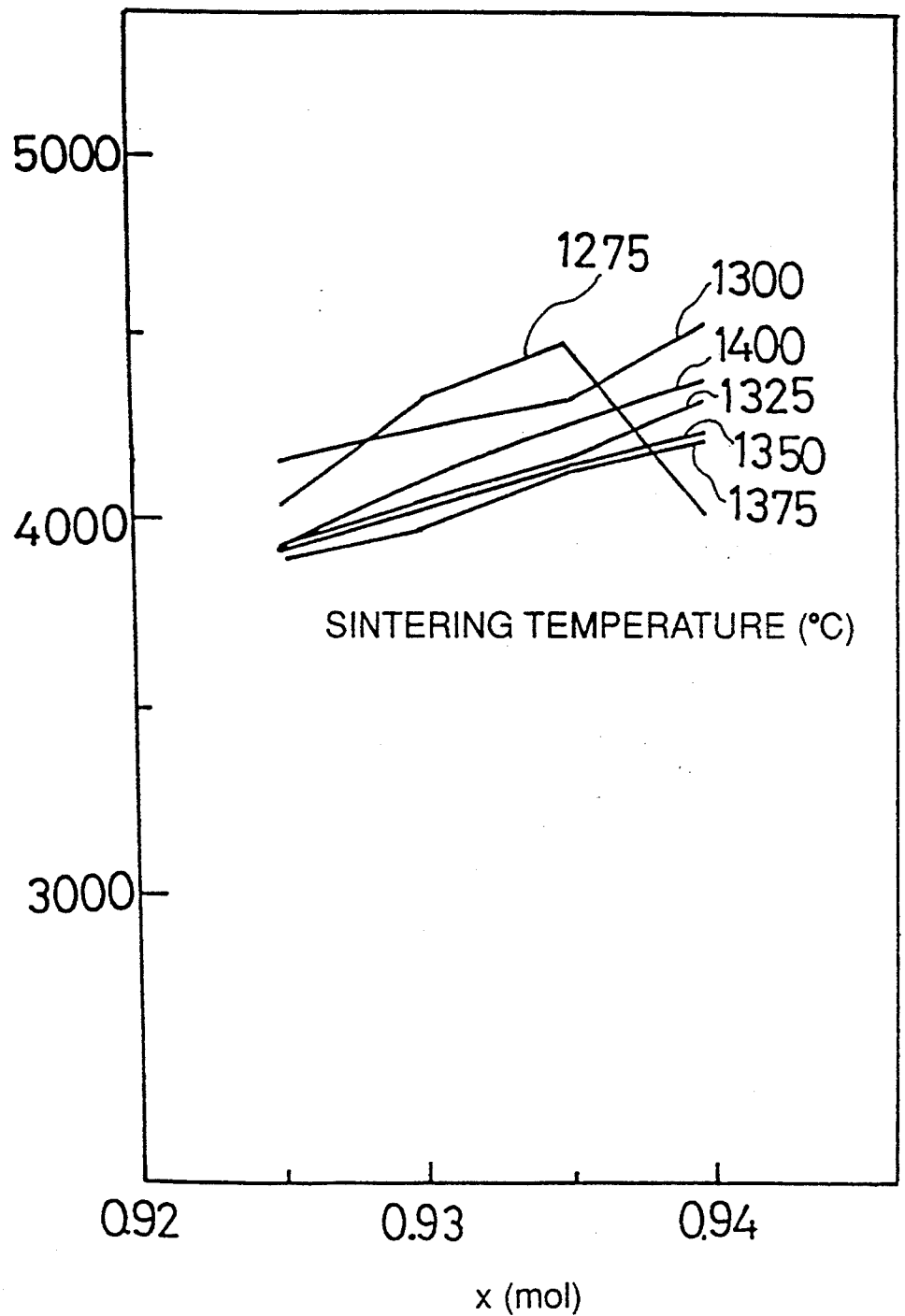
FIG. 26 is a graph showing a relation between x and Qu in a $(xMgTiO_3 \cdot (1-x)CaTiO_3 + 2$ wt % $Nb_2O_5)$ ceramic composition produced by sintering at each of sintering temperatures.
Figure 27:
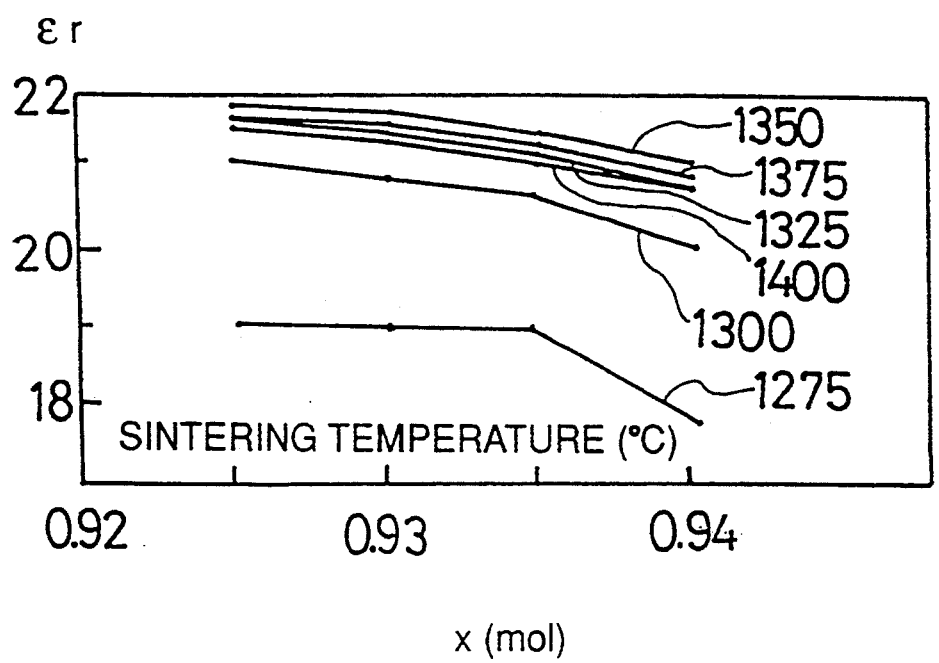
FIG. 27 is a graph showing a relation between x and $\epsilon_r$ in the ceramic composition shown in FIG. 26.
Figure 28:
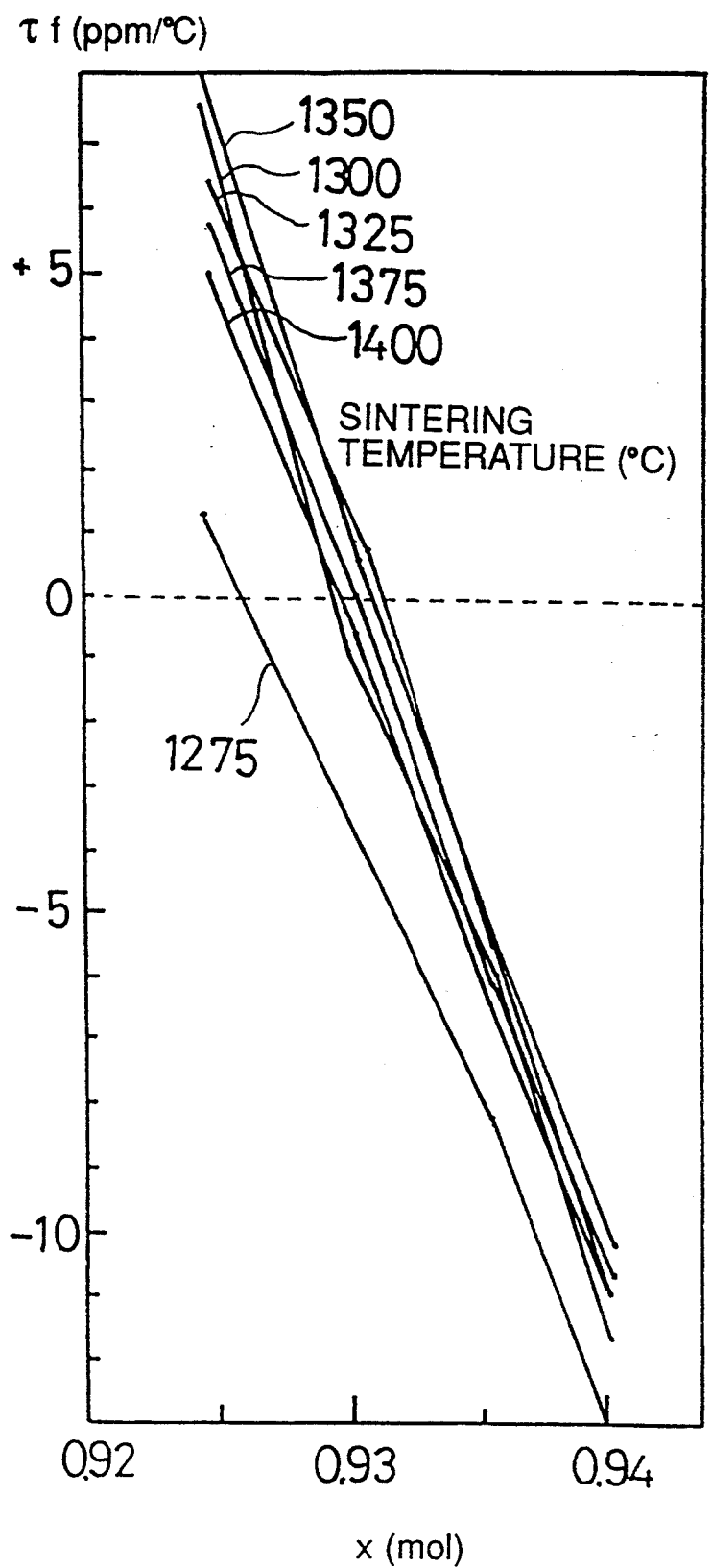
FIG. 28 is a graph showing a relation between x and $\tau f$ in the ceramic composition shown in FIG. 26.

Further, the analysis method based on the absence or presence of X-ray diffraction peaks shown in FIGS. 24 and 25 shows that the structure of products according to the present invention contains MgTiO$_3$ (○) and CaTiO$_3$ (●) and MgTi$_2$O$_5$ (▽) as other peaks and that MgO, CaO and TiO2 are not contained.

Further, although not illustrated, results of electron microscopic photograph show that the grain size increases along with the elevation of the sintering temperature (1300° C.:2.5 μm, 1350° C.:3.7 μm, 1400° C.:6.5 μm, each measured by Intercept method), pores decrease and densification is completed at 1350° C. The rapture cross-section shows grain boundary destruction at 1300° C. and intergrain destruction above 1350° C. Further, the surface tissue was classified into two kinds of grains, namely, huge grains (usual grains, 10–50 μm of grain size) and fine square grains (less than 1–10 μm). As a result of EDS (Energy Dispersive Spectrum) analysis, Mg, Ca, Ti and Si were detected from the usual grains while Mg, Ca, Ti and Ta were detected from the square grains. It is considered that the square grains are in the form of Ta compounds. Further, it is considered that the Si ingredient was mixed from the starting material.

EXAMPLE 3

Using Nb$_2$O$_5$ powder (100% purity) instead of the ZnO powder used in Example 1, a predetermined amount of the starting material (about 500 g in total) was weighted and mixed so as to provide a composition in which x and y vary in the formula: xMgTiO$_3$·(1−x)CaTiO$_3$+y wt % Nb$_2$O$_5$ in which y means % by weight of Nb$_2$O$_5$ based on 100 parts by weight of xMgTiO$_3$·(1−x)CaTiO$_3$ as shown in Tables 4–6 and FIGS. 26–36.

Figure 37:
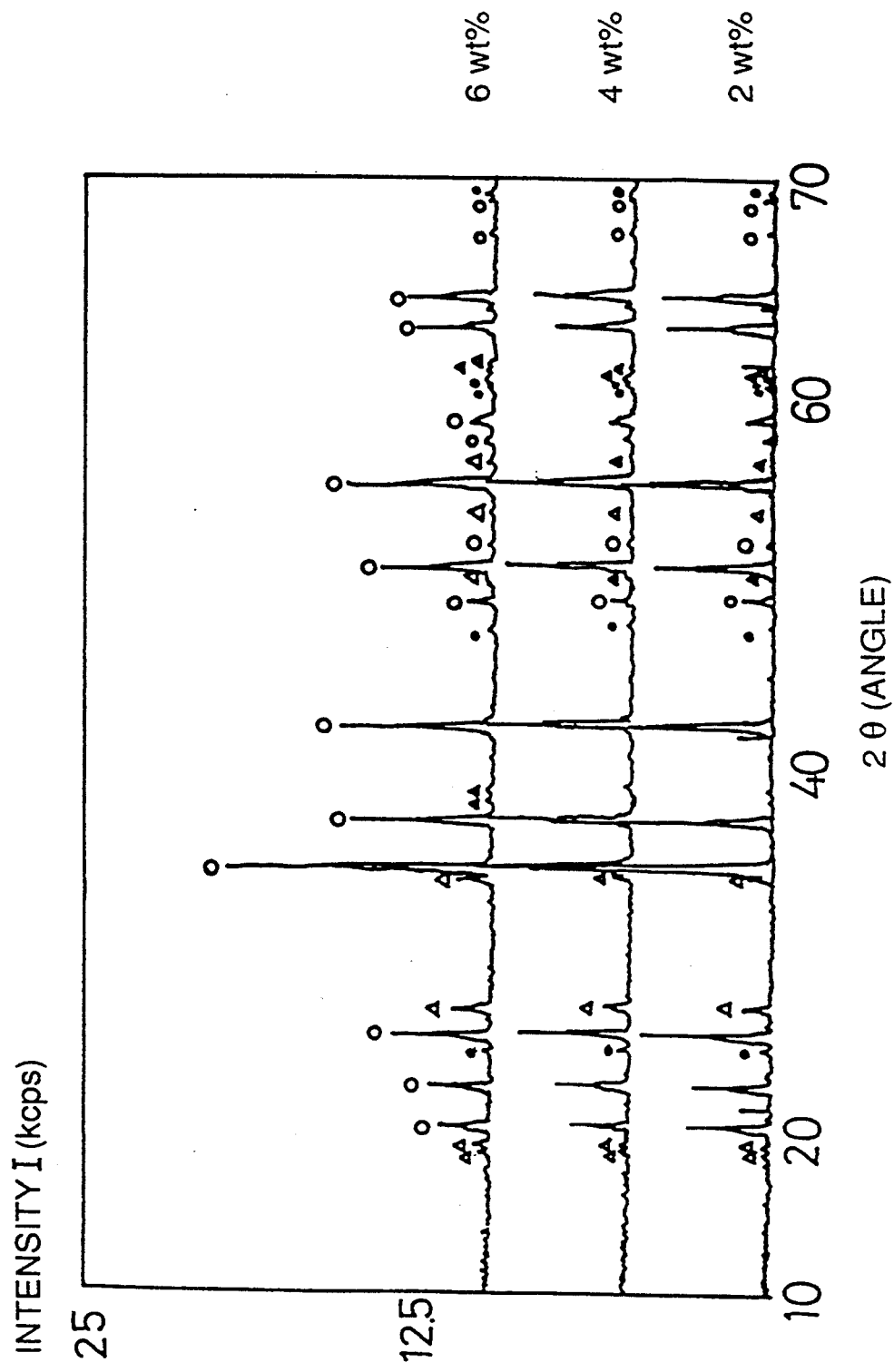
FIG. 37 is a graph showing the result of X-ray diffraction of a (0.93MgTiO$_3$·0.07CaTiO$_3$+(2, 4 or 6 wt %) Nb$_2$O$_5$) ceramic composition.

Table 4 shows the change of the addition amount of MgTiO$_3$ and Tables 5 and 6 show the change of the addition amount of Nb$_2$O$_5$. Subsequently, molding products of the same shape were produced, sintered in the same manner, and then polished to prepare dielectric specimens of the same shape as in Example 1 (Nos. 1–24 in Table 4 and Nos. 1–36 in Tables 5 and 6). Further, characteristics were measured by the same method and the results are shown in Tables 4–6 and FIGS. 26–36. Further, as an example, results of X-ray diffraction of 0.93MgTiO$_3$·0.07CaTiO$_3$ are shown in FIG. 37 (containing 2%, 4% or 6% by weight of Nb$_2$O$_5$ to 0.93MgTiO$_3$·0.07CaTiO$_3$ sintered at 1350° C. for 4 hours).

From the foregoing results, the value Qu tends to decrease if x is small in xMgTiO$_3$·(1−x)CaTiO$_3$ but $\tau f$ and $\epsilon_r$ tend to increase toward the positive side. Further, the sintering density tends to increase along with elevation of the sintering temperature but it shows no substantial change to the change of the sintering temperature as the addition amount of Nb$_2$O$_5$ increases.

Further, although Qu and $\epsilon_r$ do not change so much by the addition of Nb$_2$O$_5$, $\tau f$ tends to decrease. Accordingly, addition of Nb$_2$O$_5$ is suitable to the control of $\tau f$ without reducing the performance of Qu and $\epsilon_r$. Further, if Nb$_2$O$_5$ is not added, characteristics can not be measured when the sintering temperature is low (1275°–1325° C.) (Table 6). Even upon sintering at 1350°–1400° C., although characteristics can be measured $\tau f$ is remarkably large (Table 5 and FIG. 31; 19.7 (No. 1) and 17.5 (No. 7), 15.1 ppm/°C. (No. 13)). The sintering density is also low upon

TABLE 4

[xMgTiO$_3$·(1 − x)CaTiO$_3$ + 2 wt % Nb$_2$O$_5$] ceramic composition

| No. | x | Amount of Nb$_2$O$_5$ (wt %) | Calcining temp. (°C.) | Sinter. temp. (°C.) | Qu (6 GHz) | Rel. dielect. const. $\epsilon_r$ | $\tau f$ (ppm/°C.) | Sint. density (g/cm$^3$) |
|---|---|---|---|---|---|---|---|---|
| 1 | 0.940 | 2 | 1100 | 1400 | 4380 | 20.77 | −11.0 | 3.816 |

TABLE 4-continued

[xMgTiO$_3$.(1 − x)CaTiO$_3$ + 2 wt % Nb$_2$O$_5$] ceramic composition

| No. | x | Amount of Nb$_2$O$_5$ (wt %) | Calcining temp. (°C.) | Sinter. temp. (°C.) | Qu (6 GHz) | Rel. dielect. const. ε r | τ f (ppm/ °C.) | Sint. density (g/cm$^3$) |
|---|---|---|---|---|---|---|---|---|
| 2 | 0.935 | 2 | 1100 | 1400 | 4250 | 21.08 | −6.50 | 3.821 |
| 3 | 0.930 | 2 | 1100 | 1400 | 4100 | 21.36 | −0.76 | 3.821 |
| 4 | 0.925 | 2 | 1100 | 1400 | 3930 | 21.71 | 4.95 | 3.824 |
| 5 | 0.940 | 2 | 1100 | 1375 | 4220 | 20.87 | −10.8 | 3.828 |
| 6 | 0.935 | 2 | 1100 | 1375 | 4130 | 21.19 | −6.26 | 3.832 |
| 7 | 0.930 | 2 | 1100 | 1375 | 3980 | 21.48 | −0.16 | 3.830 |
| 8 | 0.925 | 2 | 1100 | 1375 | 3900 | 21.82 | 5.71 | 3.831 |
| 9 | 0.940 | 2 | 1100 | 1350 | 4230 | 20.92 | −10.1 | 3.828 |
| 10 | 0.935 | 2 | 1100 | 1350 | 4150 | 21.23 | −5.55 | 3.834 |
| 11 | 0.930 | 2 | 1100 | 1350 | 4030 | 21.51 | 0.51 | 3.831 |
| 12 | 0.925 | 2 | 1100 | 1350 | 3920 | 21.86 | 8.01 | 3.834 |
| 13 | 0.940 | 2 | 1100 | 1325 | 4260 | 20.77 | −11.0 | 3.805 |
| 14 | 0.935 | 2 | 1100 | 1325 | 4160 | 21.16 | −5.58 | 3.821 |
| 15 | 0.930 | 2 | 1100 | 1325 | 4050 | 21.44 | 0.52 | 3.817 |
| 16 | 0.925 | 2 | 1100 | 1325 | 3940 | 21.73 | 6.40 | 3.815 |
| 17 | 0.940 | 2 | 1100 | 1300 | 4540 | 20.07 | −11.72 | 3.716 |
| 18 | 0.935 | 2 | 1100 | 1300 | 4320 | 20.73 | −6.21 | 3.757 |
| 19 | 0.930 | 2 | 1100 | 1300 | 4250 | 20.95 | −0.92 | 3.755 |
| 20 | 0.925 | 2 | 1100 | 1300 | 4160 | 21.15 | 7.49 | 3.739 |
| 21 | 0.940 | 2 | 1100 | 1275 | 4010 | 17.87 | −13.0 | 3.444 |
| 22 | 0.935 | 2 | 1100 | 1275 | 4470 | 18.97 | −8.20 | 3.543 |
| 23 | 0.930 | 2 | 1100 | 1275 | 4320 | 19.05 | −3.69 | 3.532 |
| 24 | 0.925 | 2 | 1100 | 1275 | 4040 | 18.99 | 1.16 | 3.487 |

TABLE 5

[0.93 MgTiO$_3$.0.07 CaTiO$_3$ + 0~6 wt % Nb$_2$O$_5$] ceramic composition

| No. | Amount of Nb$_2$O$_5$ (wt %) | Calcining temp. (°C.) | Sinter. temp. (°C.) | Qu (6 GHz) | Rel. dielect. const. ε r | τ f (ppm/ °C.) | Sint. density (g/cm$^3$) |
|---|---|---|---|---|---|---|---|
| 1 | 0 | 1100 | 1400 | 3490 | 21.78 | 19.7 | 3.834 |
| 2 | 1 | 1100 | 1400 | 2740 | 21.10 | −8.19 | 3.820 |
| 3 | 2 | 1100 | 1400 | 4100 | 21.36 | −0.76 | 3.821 |
| 4 | 3 | 1100 | 1400 | 4140 | 21.34 | −3.64 | 3.817 |
| 5 | 4 | 1100 | 1400 | 4170 | 21.33 | −7.27 | 3.819 |
| 6 | 6 | 1100 | 1400 | 4130 | 21.26 | −11.6 | 3.812 |
| 7 | 0 | 1100 | 1375 | 3650 | 21.22 | 17.5 | 3.769 |
| 8 | 1 | 1100 | 1375 | 2260 | 21.16 | −7.63 | 3.823 |
| 9 | 2 | 1100 | 1375 | 3980 | 21.48 | −0.16 | 3.830 |
| 10 | 3 | 1100 | 1375 | 4120 | 21.55 | −2.47 | 3.829 |
| 11 | 4 | 1100 | 1375 | 4160 | 21.55 | −6.14 | 3.833 |
| 12 | 6 | 1100 | 1375 | 4110 | 21.52 | −9.93 | 3.830 |
| 13 | 0 | 1100 | 1350 | 3820 | 19.54 | 15.1 | 3.577 |
| 14 | 1 | 1100 | 1350 | 4190 | 21.49 | 1.71 | 3.829 |
| 15 | 2 | 1100 | 1350 | 4030 | 21.51 | 0.51 | 3.831 |
| 16 | 3 | 1100 | 1350 | 4120 | 21.55 | −1.57 | 3.833 |
| 17 | 4 | 1100 | 1350 | 4130 | 21.59 | −4.63 | 3.837 |
| 18 | 6 | 1100 | 1350 | 4110 | 21.56 | −9.00 | 3.837 |

TABLE 6

[0.93 MgTiO$_3$.0.07 CaTiO$_3$ + 0~6 wt % Nb$_2$O$_5$] ceramic composition

| No. | Amount of Nb$_2$O$_5$ (wt %) | Calcining temp. (°C.) | Sinter. temp. (°C.) | Qu (6 GHz) | Rel. dielect. const. ε r | τ f (ppm/ °C.) | Sint. density (g/cm$^3$) |
|---|---|---|---|---|---|---|---|
| 19 | 0 | 1100 | 1325 | | Unmeasurable | | 3.131 |
| 20 | 1 | 1100 | 1325 | 4250 | 21.25 | 0.53 | 3.799 |
| 21 | 2 | 1100 | 1325 | 4050 | 21.44 | 0.52 | 3.817 |
| 22 | 3 | 1100 | 1325 | 4140 | 21.49 | −2.04 | 3.816 |
| 23 | 4 | 1100 | 1325 | 4080 | 21.57 | −3.86 | 3.831 |
| 24 | 6 | 1100 | 1325 | 4040 | 21.58 | −8.16 | 3.829 |
| 25 | 0 | 1100 | 1300 | | Unmeasurable | | |
| 26 | 1 | 1100 | 1300 | 4310 | 20.53 | 1.59 | 3.704 |
| 27 | 2 | 1100 | 1300 | 4250 | 20.95 | −0.92 | 3.755 |
| 28 | 3 | 1100 | 1300 | 4200 | 21.03 | −2.49 | 3.762 |
| 29 | 4 | 1100 | 1300 | 4070 | 21.34 | −3.18 | 3.792 |
| 30 | 6 | 1100 | 1300 | 4070 | 21.39 | −8.24 | 3.801 |
| 31 | 0 | 1100 | 1275 | | Unmeasurable | | |
| 32 | 1 | 1100 | 1275 | | Unmeasurable | | 3.390 |
| 33 | 2 | 1100 | 1275 | 4320 | 19.05 | −3.69 | 3.532 |
| 34 | 3 | 1100 | 1275 | 3740 | 18.92 | −5.80 | 3.508 |

TABLE 6-continued

[0.93 MgTiO$_3$.0.07 CaTiO$_3$ + 0~6 wt % Nb$_2$O$_5$] ceramic composition

| No. | Amount of Nb$_2$O$_5$ (wt %) | Calcining temp. (°C.) | Sinter. temp. (°C.) | Qu (6 GHz) | Rel. dielect. const. ε r | τ f (ppm/°C.) | Sint. density (g/cm$^3$) |
|---|---|---|---|---|---|---|---|
| 35 | 4 | 1100 | 1275 | 4230 | 19.97 | −4.93 | 3.621 |
| 36 | 6 | 1100 | 1275 | 4190 | 19.90 | −9.14 | 3.624 | sintering at 1375° C. or 1350° C. (No. 7 and No. 13 in Table 5).

At a sintering temperature from 1300° to 1400° C. and the addition amount of Nb$_2$O$_5$ of 2% by weight, a preferred range of x is from 0.925 to 0.940, since practical characteristic ranges are shown for τf as −11.72 to +8.01 ppm/°C. for ε$_r$ as 20.07 to 21.86 and for Qu as 3900 to 4540. Particularly, if x is 0.930 and the addition amount of Nb$_2$O$_5$ is 2% by weight at a sintering temperature, for example, of 1350° C. and 1375° C., τf is −0.16 to +0.51 ppm/°C, ε$_r$ is 21.48 to 21.51 and Qu is 3980 to 4030, showing particularly excellent performance balance with scarce scattering thereof. Further, regarding τf, a small value around 0 ppm/°C. can be controlled easily since the variation coefficient to the sintering temperature is low. On the other hand, it is not preferred that CaTiO$_3$ is not contained, since the Qu value is large, but ε$_r$ is small and, in addition, τf extremely decreases toward the negative side as −25 to −44 ppm/°C.

Further, the analysis method based on the absence or presence of X-ray diffraction peaks in FIG. 37 shows that the structure of products according to the present invention contains MgTiO$_3$ (○)) and CaTiO$_3$ (●) and MgTi$_2$O$_5$ (Δ) as other peaks and that MgO, CaO and TiO2 are not contained. Further, peaks for Nb$_2$O$_5$ compounds were not detected. However, although a diffraction pattern is substantially the same for the addition amount of Nb$_2$O$_5$, peaks for MgTiO$_3$ and MgTi$_2$O$_5$ shifted slightly to the lower angle side of 2θ—along with increase of the addition amount from 2 to 6% by weight (FIG. 37). Accordingly, it is considered that Nb$^{5+}$ ions are solid solubilized in MgTiO$_3$ and MgTi$_2$O$_5$.

Further, although not illustrated, results of electron microscopic photograph show that the grain size increases along with the elevation of the sintering temperature (1275° C.:2.6 μm, 1300° C.:3.1 μm, 1350° C.:4.9 μm and 1400° C.:6.1 μm, each measured by an Intercept method), and pores decrease, showing that densification is completed at 1350° C. The rapture cross-section shows inter-grain destruction for each of the cases.

EXAMPLE 4

Figure 38:
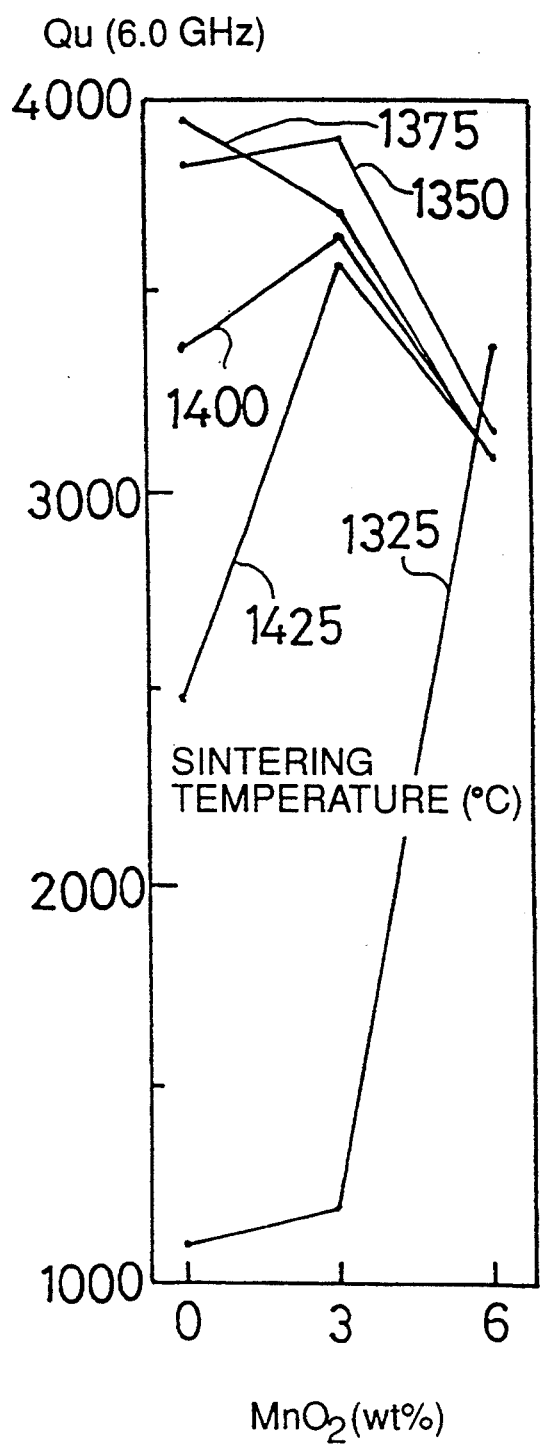
FIG. 38 is a graph showing a relation between the amount of MnO$_2$ and Qu in a (0.94MgTiO$_3$·0.06CaTiO$_3$+0–6 wt % MnO$_2$) ceramic composition produced by sintering at each of sintering temperatures.
Figure 39:
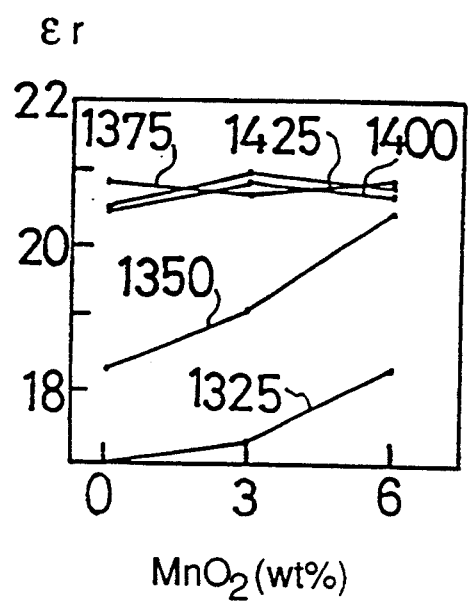
FIG. 39 is a graph showing a relation between the amount of MnO$_2$ and $\epsilon_r$ in the ceramic composition shown in FIG. 38.
Figure 40:
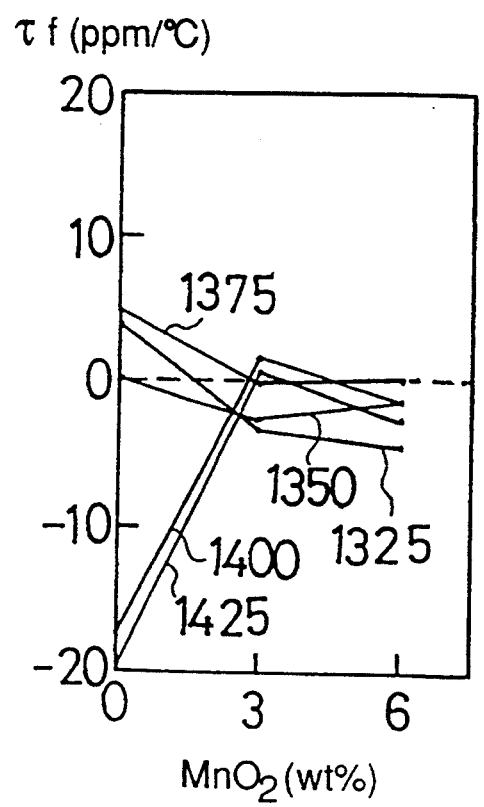
FIG. 40 is a graph showing a relation between the amount of MnO$_2$ and $\tau f$ in the ceramic composition shown in FIG. 38.
Figure 41:
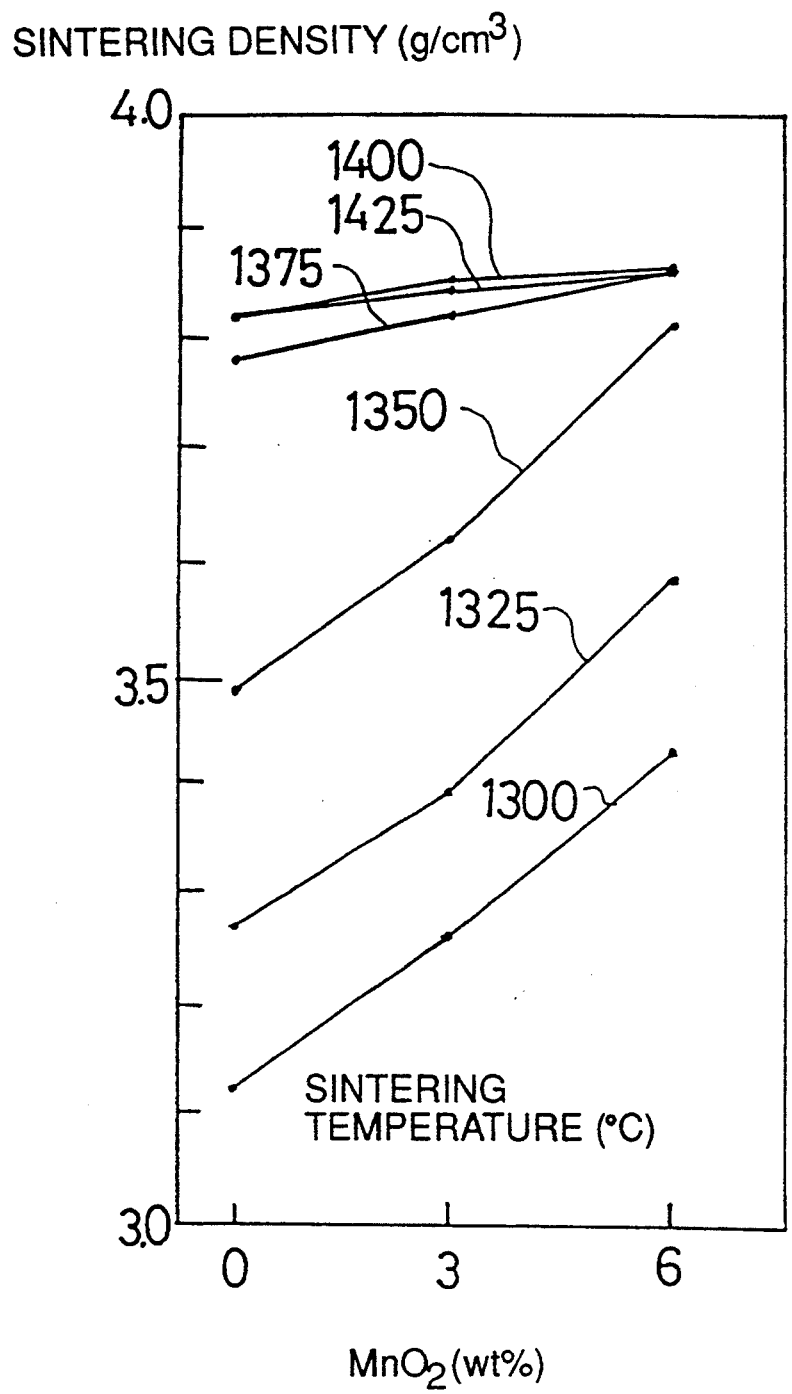
FIG. 41 is a graph showing a relation between the amount of 0–6 wt % MnO$_2$ and the sintering density in the ceramic composition shown in FIG. 38.
Figure 42:
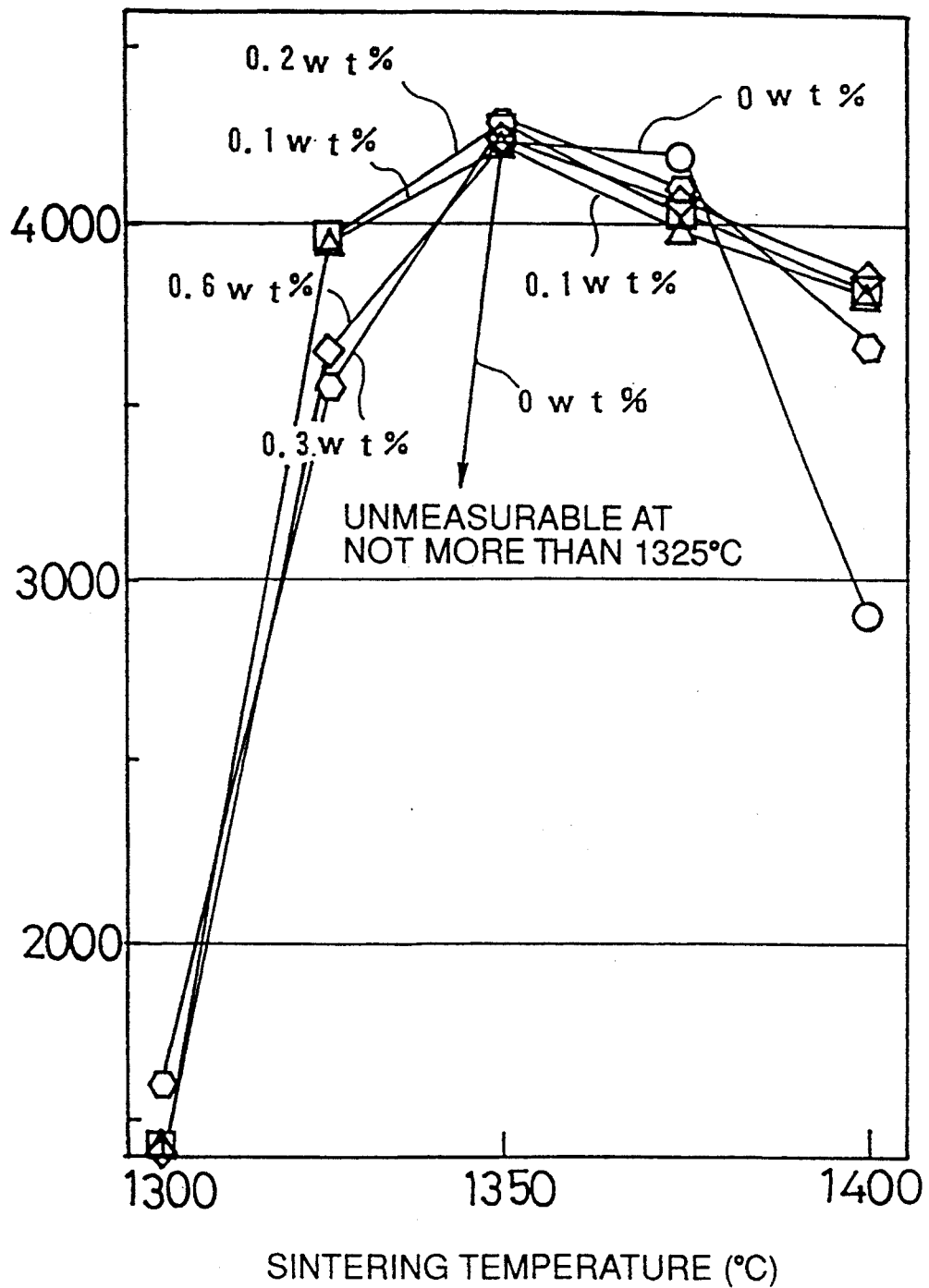
FIG. 42 is a graph showing a relation between the sintering temperature and Qu in the (0.95MgTiO$_3$·0.05CaTiO$_3$+(0–0.6) wt % MnO$_2$) ceramic composition.
Figure 43:
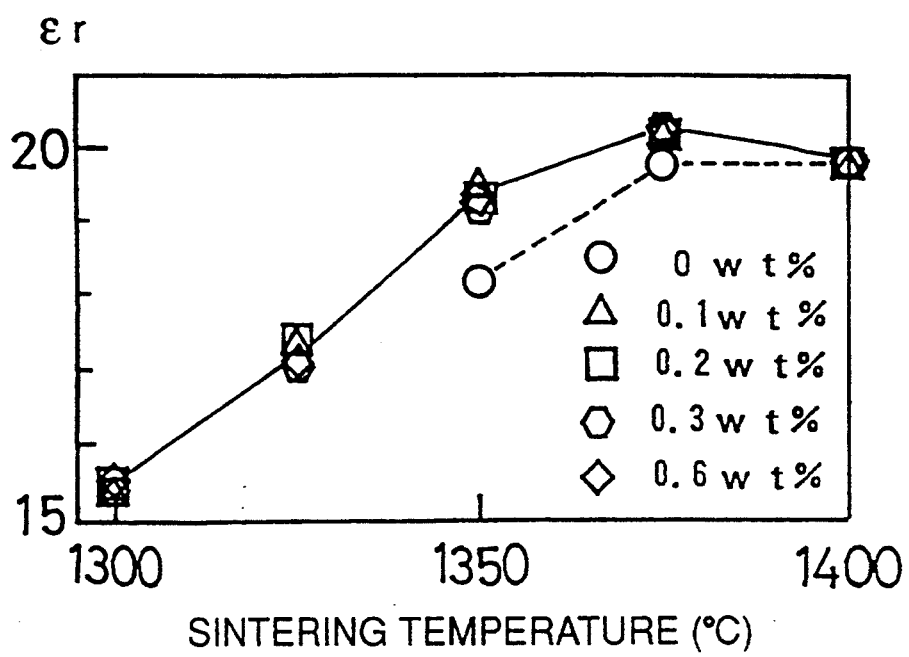
FIG. 43 is a graph showing a relation between the sintering temperature and $\epsilon_r$ in the ceramic composition shown in FIG. 42.
Figure 44:
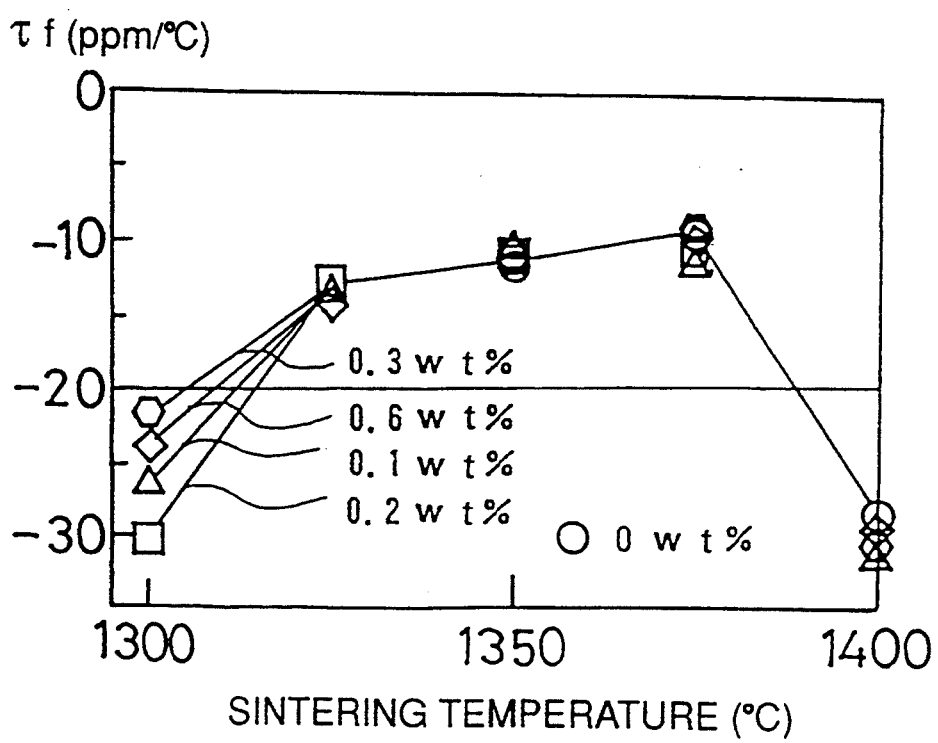
FIG. 44 is a graph showing a relation between the sintering temperature and $\tau f$ in the ceramic composition shown in FIG. 42.
Figure 45:
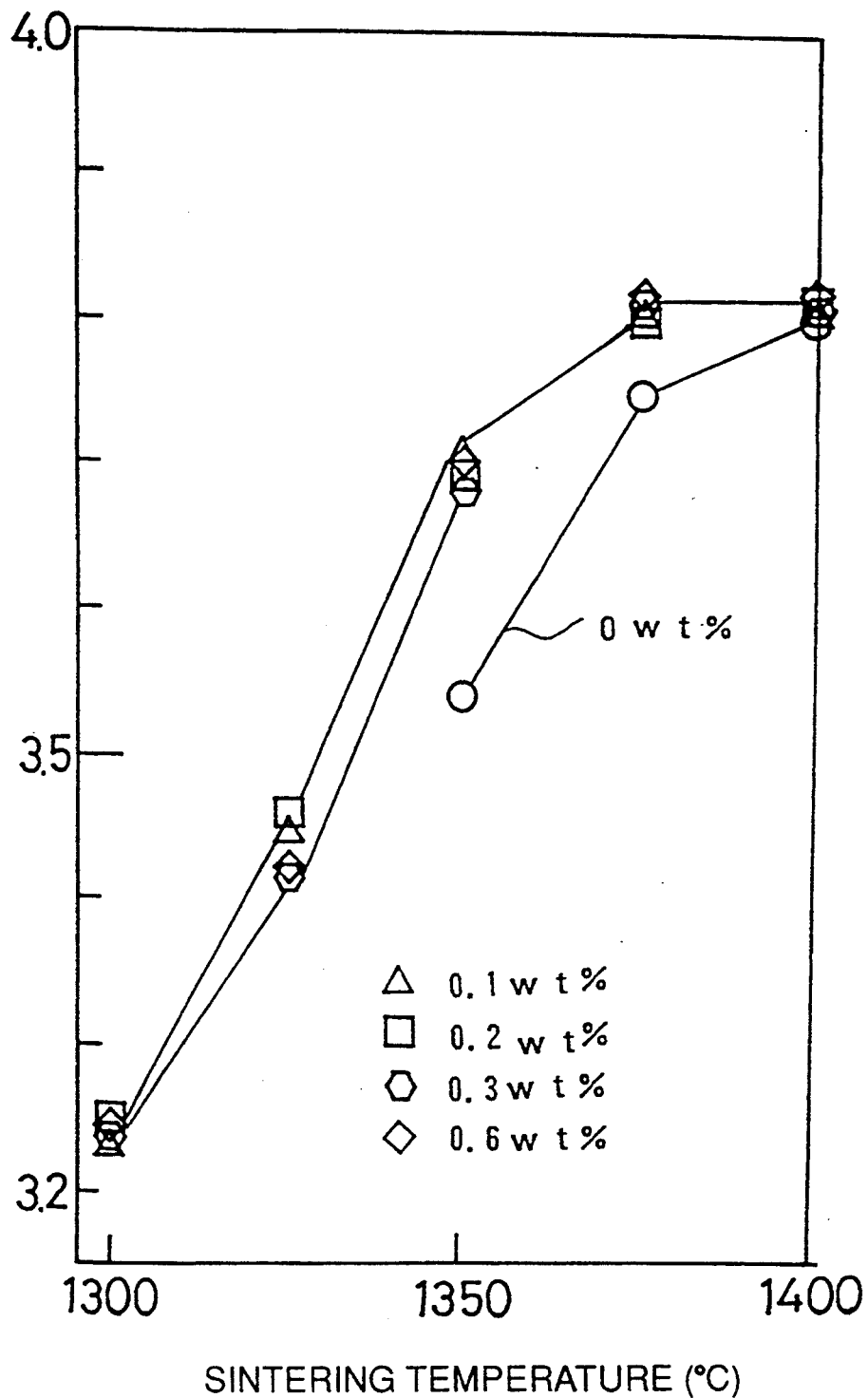
FIG. 45 is a graph showing a relation between the sintering temperature and the sintering density in the ceramic composition shown in FIG. 42.
Figure 46:
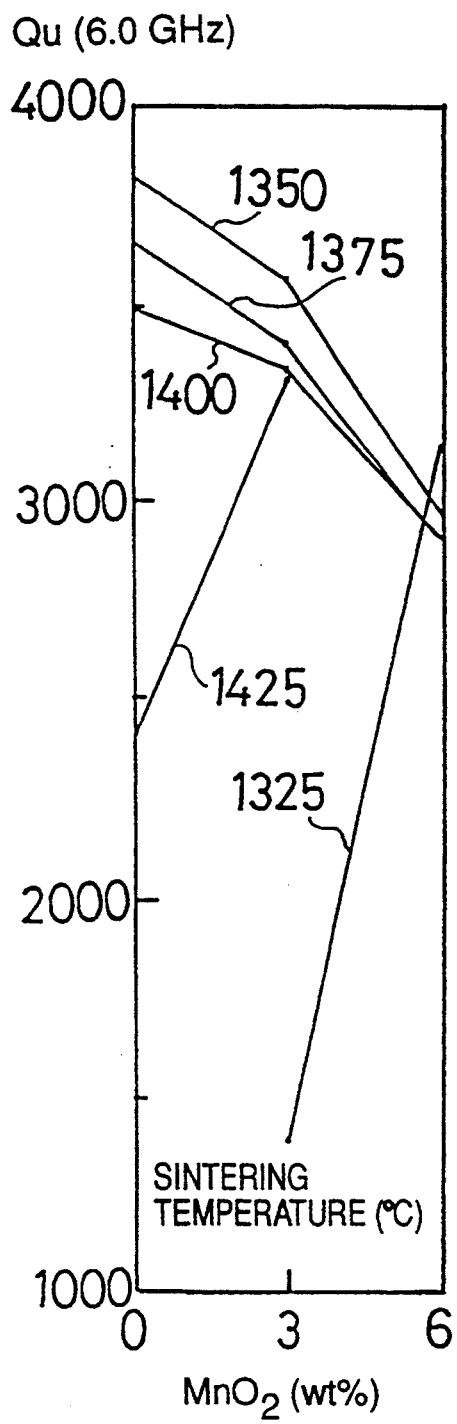
FIG. 46 is a graph showing a relation between the sintering temperature and Qu in the (0.93MgTiO$_3$·0.07CaTiO$_3$+(0–6) wt % MnO$_2$) ceramic composition.
Figure 47:
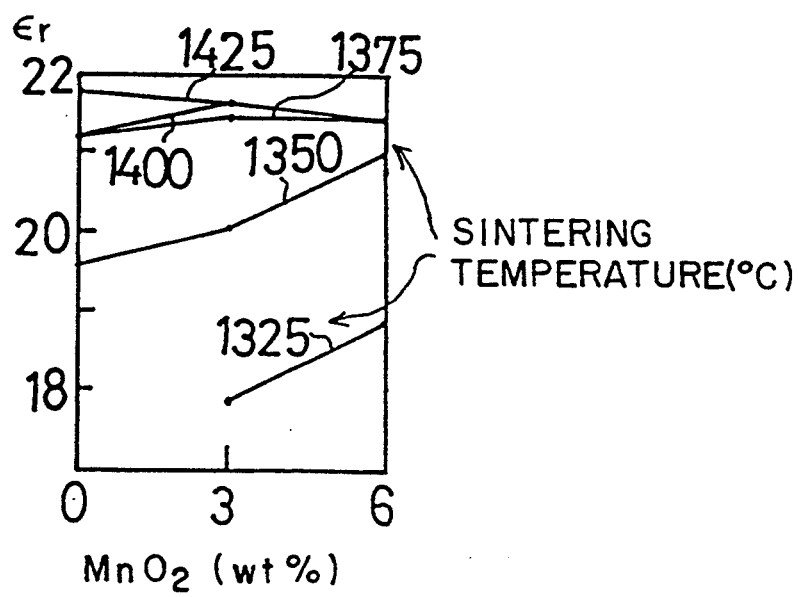
FIG. 47 is a graph showing a relation between the sintering temperature and $\epsilon_r$ in the ceramic composition shown in FIG. 46.
Figure 48:
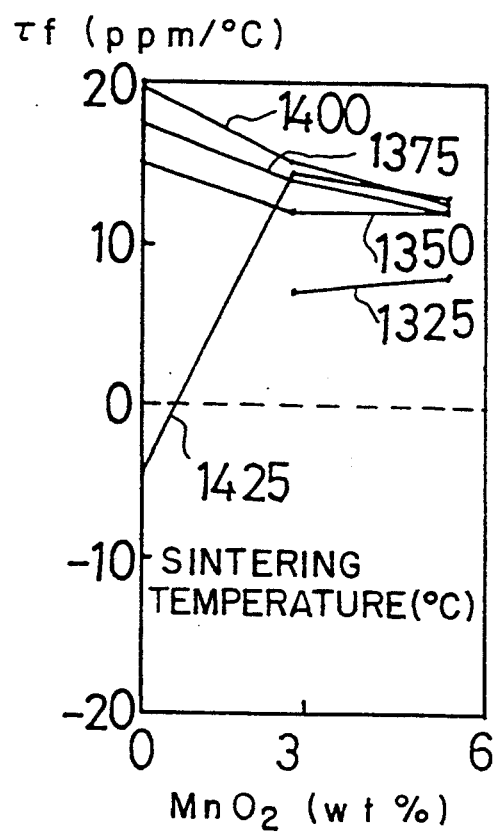
FIG. 48 is a graph showing a relation between the sintering temperature and $\tau f$ in the ceramic composition shown in FIG. 46.
Figure 49:
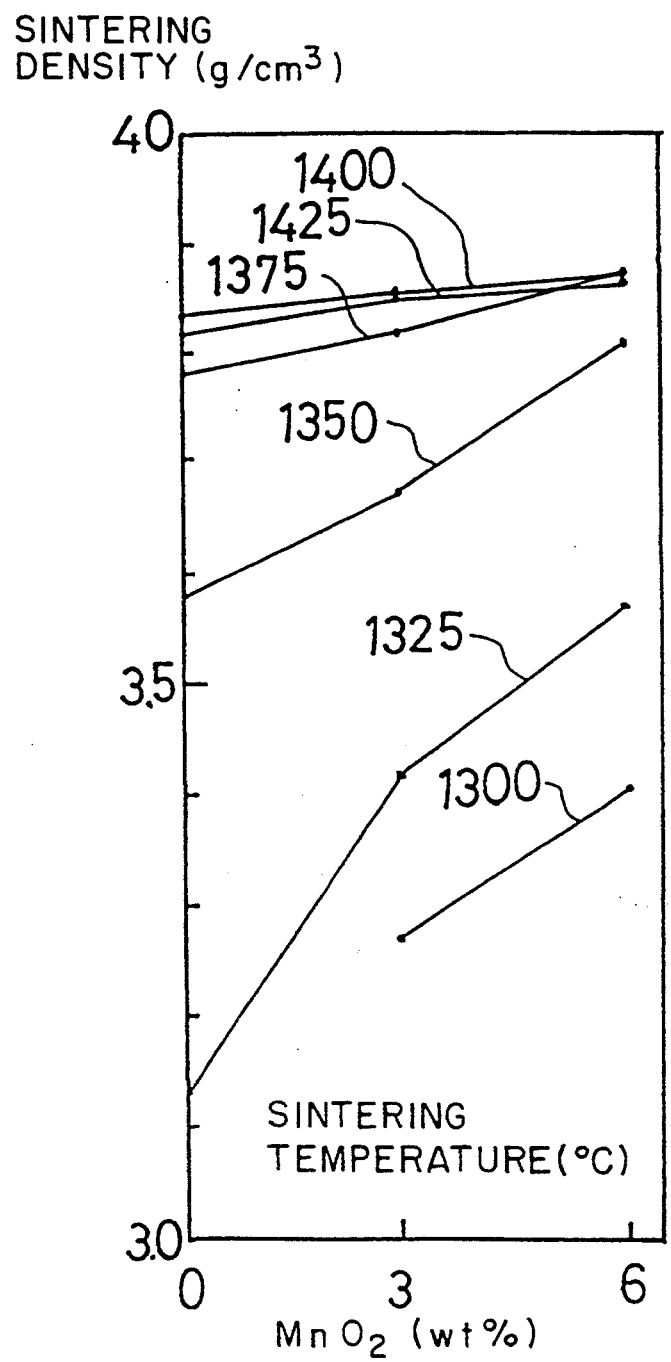
FIG. 49 is a graph showing a relation between the sintering temperature and the sintering density in the ceramic composition shown in FIG. 46.

Using MnO$_2$ powder (96% purity) instead of the ZnO powder used in Example 1, a predetermined amount of the starting material (about 500 g in total) was weighted and mixed so as to provide a composition in which x and y vary in the formula: xMgTiO$_3$·(1−x)CaTiO$_3$+y wt % MnO$_2$ in which y means % by weight of MnO$_2$ based on 100 parts by weight of xMgTiO$_3$·(1−x)CaTiO$_3$ as shown in Tables 7-10 and FIGS. 38 and 42. Table 7 shows the change of the addition amount (constitutional amount of CaTiO$_3$ and Tables 8-10 show the change of the addition amount of MnO$_2$. Subsequently, molding products of the same shape were produced, sintered in the same manner, and then polished to prepare dielectric

TABLE 7

[xMgTiO$_3$·(1 − x)CaTiO$_3$] ceramic composition (x = 0.97~0.93)

| No. | 1 − x | Calcining temp. (°C.) | Sinter. temp. (°C.) | Qu (6 GHz) | Rel. dielect. const. ε r | τ f (ppm/°C.) | Sint. density (g/cm$^3$) |
|---|---|---|---|---|---|---|---|
| 1 | 0.03 | 1100 | 1425 | 4020 | 18.60 | −49.6 | 3.765 |
| 2 | 0.05 | 1100 | 1425 | 2840 | 19.82 | −33.8 | 3.803 |
| 3 | 0.07 | 1100 | 1425 | 2390 | 21.17 | −4.47 | 3.819 |
| 4 | 0.03 | 1100 | 1400 | 3800 | 18.58 | −47.8 | 3.758 |
| 5 | 0.05 | 1100 | 1400 | 2900 | 19.79 | −28.6 | 3.803 |
| 6 | 0.07 | 1100 | 1400 | 3490 | 21.78 | 19.72 | 3.834 |
| 7 | 0.03 | 1100 | 1375 | 4820 | 18.61 | −33.3 | 3.716 |
| 8 | 0.05 | 1100 | 1375 | 4190 | 19.81 | −9.63 | 3.746 |
| 9 | 0.07 | 1100 | 1375 | 3650 | 21.22 | 17.5 | 3.769 |
| 10 | 0.03 | 1100 | 1350 | 4700 | 17.06 | −34.4 | 3.529 |
| 11 | 0.05 | 1100 | 1350 | 4230 | 18.22 | −11.7 | 3.543 |
| 12 | 0.07 | 1100 | 1350 | 3820 | 19.54 | 15.1 | 3.577 |
| 13 | 0.03 | 1100 | 1325 | 1150 | 13.56 | −42.8 | 3.057 |
| 14 | 0.05 | 1100 | 1325 | | Unmeasurable | | 3.072 |
| 15 | 0.07 | 1100 | 1325 | | Unmeasurable | | 3.131 |

TABLE 8

[0.94 MgTiO$_3$.0.06 CaTiO$_3$ + 0~6 wt % MnO$_2$] ceramic composition

| No. | Amount of MnO$_2$ (wt %) | Calcining temp. (°C.) | Sinter. temp. (°C.) | Qu (6 GHz) | Rel. dielect. const. ε r | τ f (ppm/°C.) | Sint. density (g/cm$^3$) |
|---|---|---|---|---|---|---|---|
| 1 | 3 | 1100 | 1425 | 3570 | 20.86 | 0.56 | 3.841 |
| 2 | 6 | 1100 | 1425 | 3090 | 20.68 | −2.38 | 3.854 |
| 3 | 3 | 1100 | 1400 | 3640 | 20.95 | 1.78 | 3.847 |
| 4 | 6 | 1100 | 1400 | 3080 | 20.79 | −1.21 | 3.861 |
| 5 | 3 | 1100 | 1375 | 3700 | 20.68 | −0.09 | 3.815 |
| 6 | 6 | 1100 | 1375 | 3080 | 20.84 | 0.20 | 3.862 |

TABLE 8-continued

[0.94 MgTiO₃·0.06 CaTiO₃ + 0~6 wt % MnO₂] ceramic composition

| No. | Amount of MnO₂ (wt %) | Calcining temp. (°C.) | Sinter. temp. (°C.) | Qu (6 GHz) | Rel. dielect. const. $\epsilon_r$ | τf (ppm/ °C.) | Sint. density (g/cm³) |
|---|---|---|---|---|---|---|---|
| 7 | 3 | 1100 | 1350 | 3890 | 19.04 | −2.60 | 3.616 |
| 8 | 6 | 1100 | 1350 | 3150 | 20.45 | −1.23 | 3.807 |
| 9 | 3 | 1100 | 1325 | 660 | 17.00 | −3.26 | 3.384 |
| 10 | 6 | 1100 | 1325 | 3360 | 18.52 | −4.36 | 3.578 |
| 11 | 3 | 1100 | 1300 | Unmeasurable | | | 3.255 |
| 12 | 6 | 1100 | 1300 | Unmeasurable | | | 3.418 |
| 13 | 0 | 1100 | 1425 | 2480 | 20.46 | −23.0 | 3.815 |
| 14 | 0 | 1100 | 1400 | 3360 | 20.51 | −18.0 | 3.812 |
| 15 | 0 | 1100 | 1375 | 3940 | 20.83 | 4.84 | 3.778 |
| 16 | 0 | 1100 | 1350 | 3820 | 18.27 | 0.19 | 3.480 |
| 17 | 0 | 1100 | 1325 | 430 | 16.28 | 3.72 | 3.266 |
| 18 | 0 | 1100 | 1300 | Unmeasurable | | | 3.121 |

TABLE 9

[0.95 MgTiO₃·0.05 CaTiO₃ + 0.1~0.6 wt % MnO₂] ceramic composition

| No. | Amount of MnO₂ (wt %) | Calcining temp. (°C.) | Sinter. temp. (°C.) | Qu (6 GHz) | Rel. dielect. const. $\epsilon_r$ | τf (ppm/ °C.) | Sint. density (g/cm³) |
|---|---|---|---|---|---|---|---|
| 1 | 0.1 | 1100 | 1400 | 3790 | 19.80 | −31.4 | 3.804 |
| 2 | 0.2 | 1100 | 1400 | 3810 | 19.83 | −31.3 | 3.807 |
| 3 | 0.3 | 1100 | 1400 | 3660 | 19.85 | −30.7 | 3.814 |
| 4 | 0.6 | 1100 | 1400 | 3850 | 19.83 | −29.6 | 3.818 |
| 5 | 0.1 | 1100 | 1375 | 3970 | 20.21 | −11.8 | 3.805 |
| 6 | 0.2 | 1100 | 1375 | 4030 | 20.21 | −10.7 | 3.804 |
| 7 | 0.3 | 1100 | 1375 | 4100 | 20.27 | −9.31 | 3.807 |
| 8 | 0.6 | 1100 | 1375 | 4060 | 20.25 | −9.87 | 3.810 |
| 9 | 0.1 | 1100 | 1350 | 4220 | 19.50 | −10.4 | 3.713 |
| 10 | 0.2 | 1100 | 1350 | 4270 | 19.30 | −10.7 | 3.693 |
| 11 | 0.3 | 1100 | 1350 | 4280 | 19.20 | −11.6 | 3.683 |
| 12 | 0.6 | 1100 | 1350 | 4250 | 19.34 | −11.1 | 3.703 |
| 13 | 0.1 | 1100 | 1325 | 3950 | 17.42 | −13.4 | 3.449 |
| 14 | 0.2 | 1100 | 1325 | 3970 | 17.41 | −12.7 | 3.462 |
| 15 | 0.3 | 1100 | 1325 | 3550 | 17.05 | −14.2 | 3.422 |
| 16 | 0.6 | 1100 | 1325 | 3650 | 17.10 | −14.1 | 3.426 |
| 17 | 0.1 | 1100 | 1300 | 1090 | 15.43 | −26.4 | 3.230 |
| 18 | 0.2 | 1100 | 1300 | 1010 | 15.56 | −30.2 | 3.251 |
| 19 | 0.3 | 1100 | 1300 | 1450 | 15.41 | −21.5 | 3.232 |
| 20 | 0.6 | 1100 | 1300 | 950 | 15.54 | −23.7 | 3.245 |

TABLE 10

[0.93 MgTiO₃·0.07 CaTiO₃ + 0~6 wt % MnO₂] ceramic composition

Figure 50:
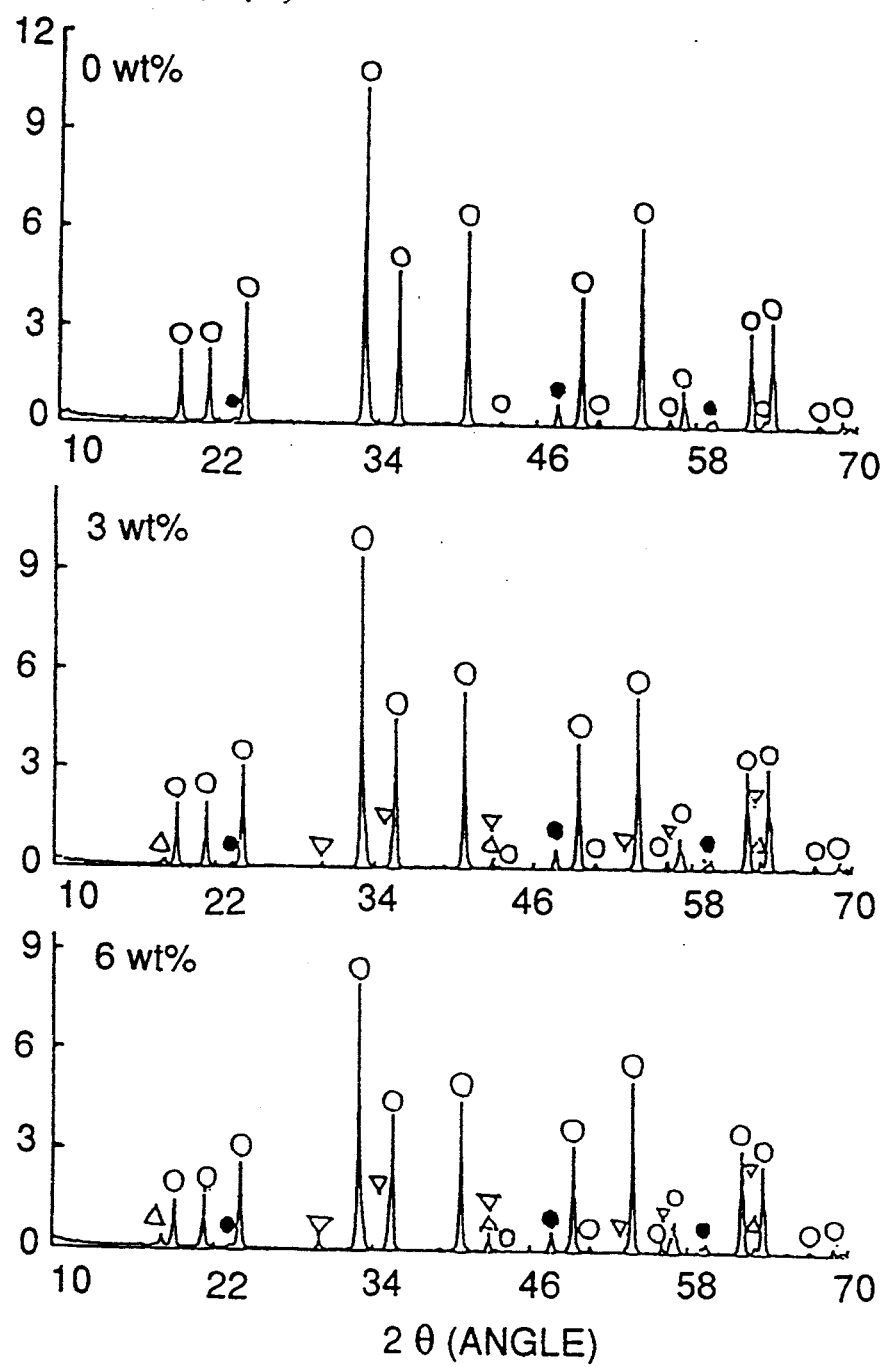
FIG. 50 is a graph showing the result of X-ray diffraction of a (0.94MgTiO$_3$·0.06CaTiO$_3$+(0, 3 or 6 wt %) MnO$_2$) ceramic composition.
Figure 51:
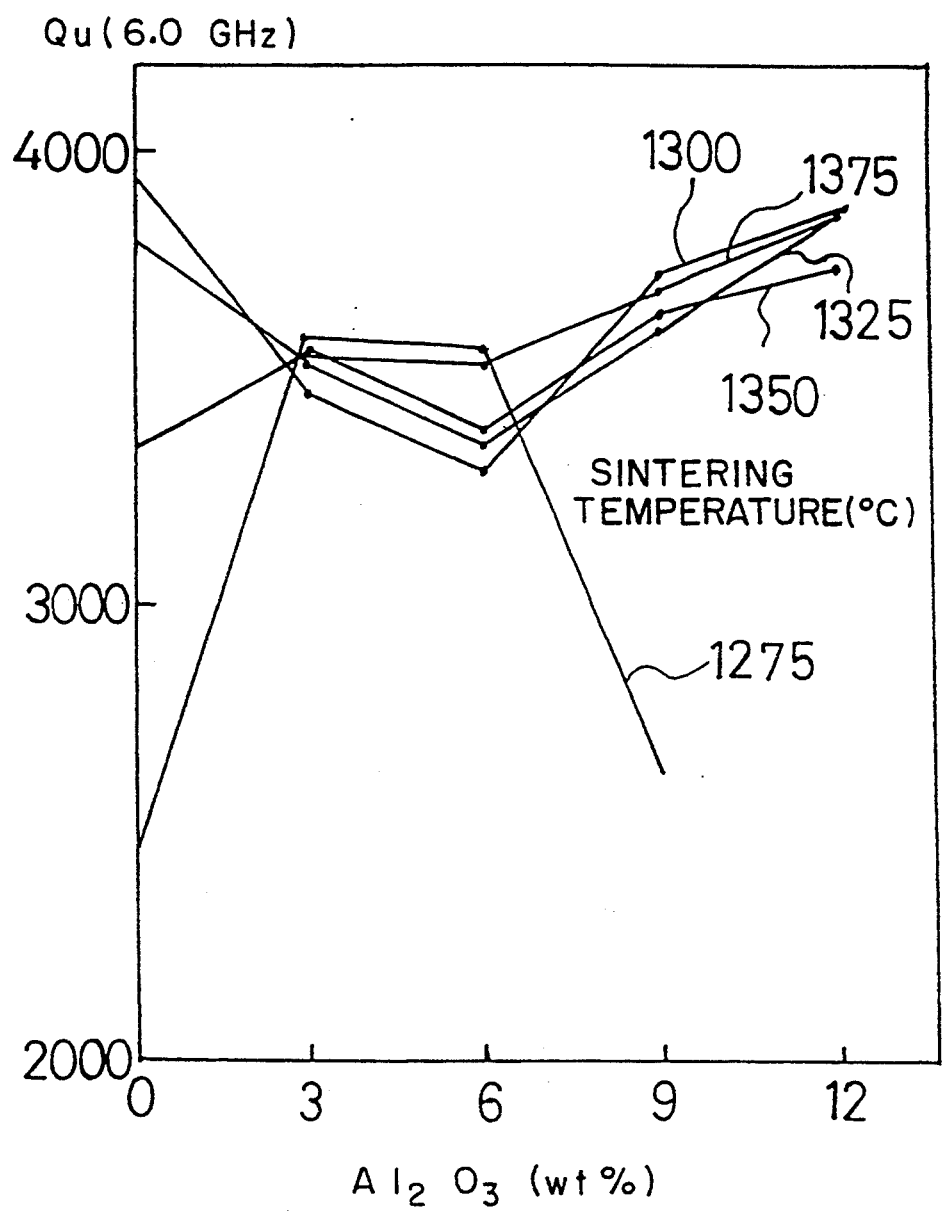
FIG. 51 is a graph showing a relation between the amount of Al$_2$O$_3$ and Qu in a (0.94MgTiO$_3$·0.06CaTiO$_3$+0–12 wt % Al$_2$O$_3$) ceramic composition produced by sintering at each of sintering temperatures.
Figure 52:
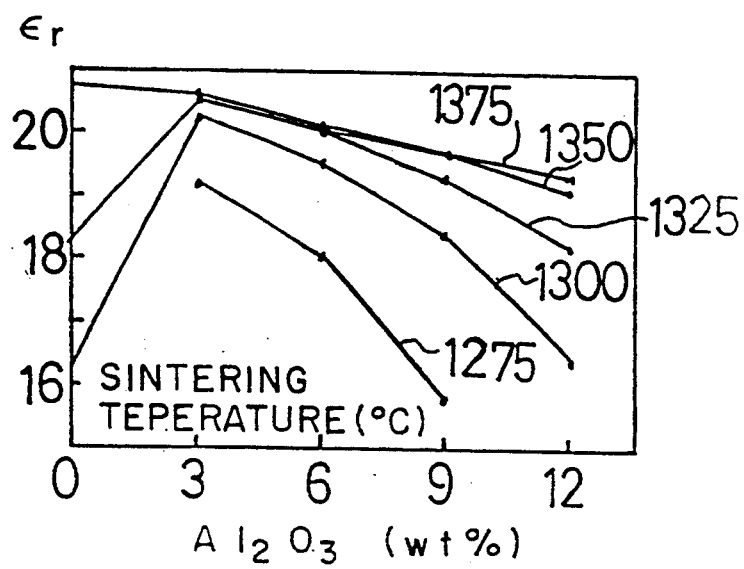
FIG. 52 is a graph showing a relation between the amount of Al$_2$O$_3$ and $\epsilon_r$ in the ceramic composition shown in FIG. 51.
Figure 53:
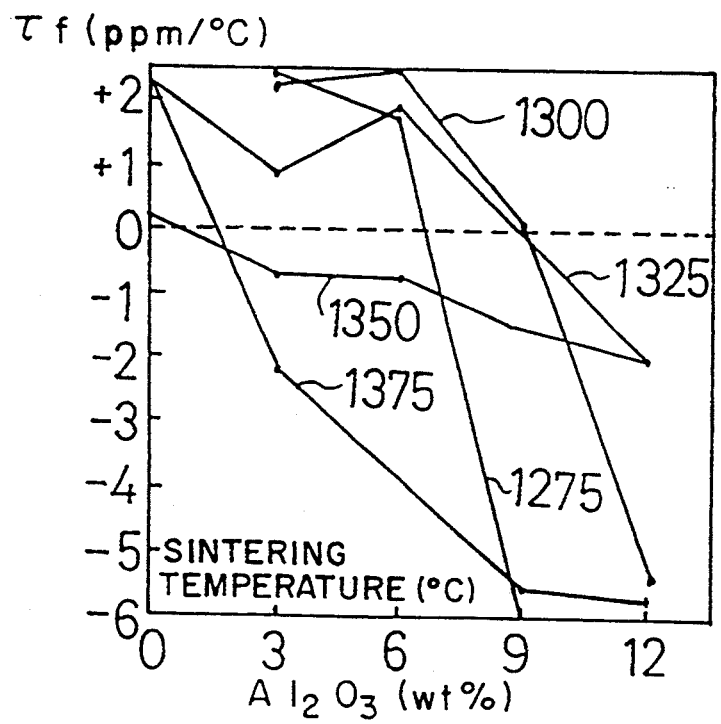
FIG. 53 is a graph showing a relation between the amount of Al$_2$O$_3$ and $\tau f$ in the ceramic composition shown in FIG. 51.
Figure 54:
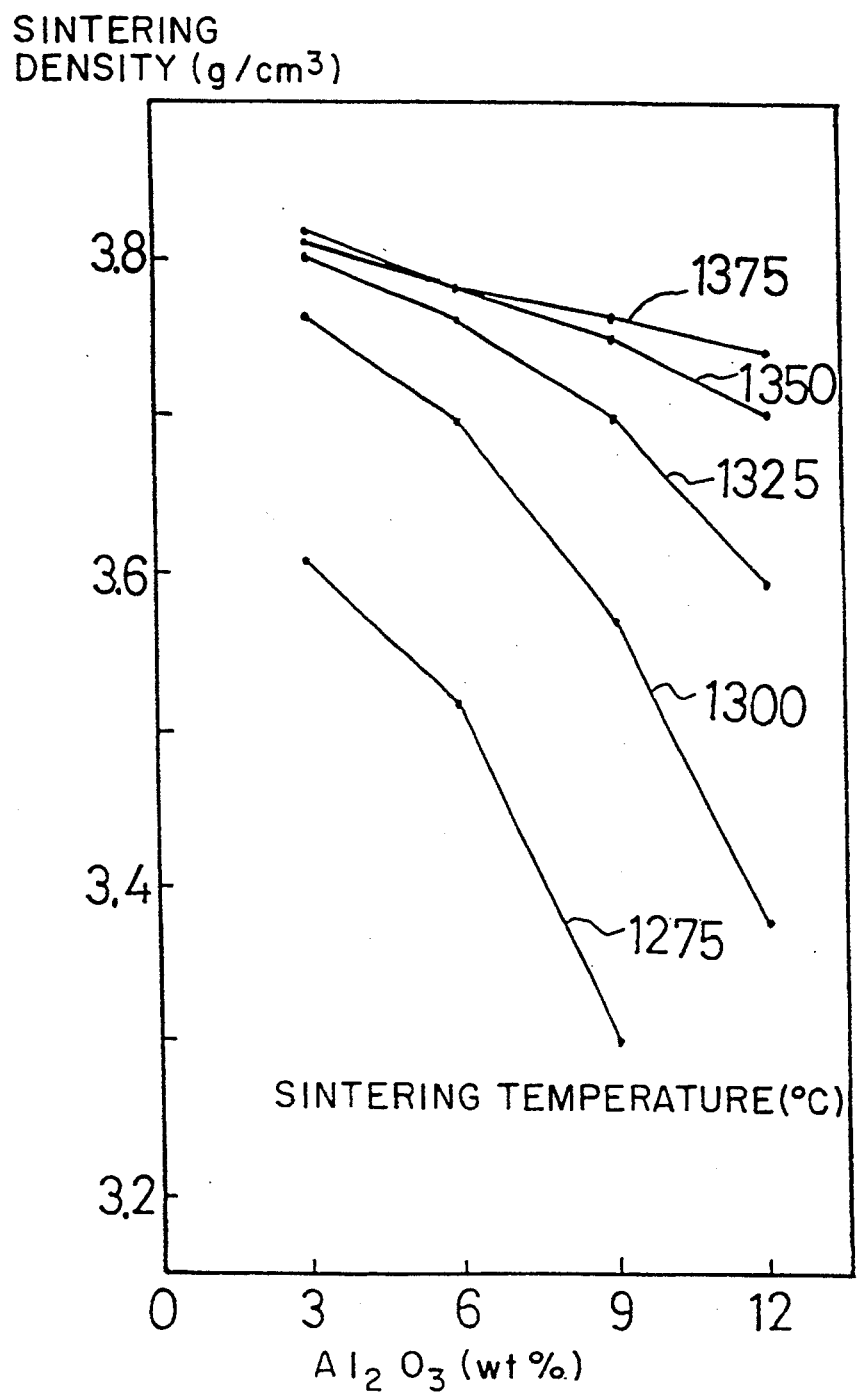
FIG. 54 is a graph showing a relation between the amount of 3–12 wt % Al$_2$O$_3$ and the sintering density in the ceramic composition shown in FIG. 51.
Figure 55:
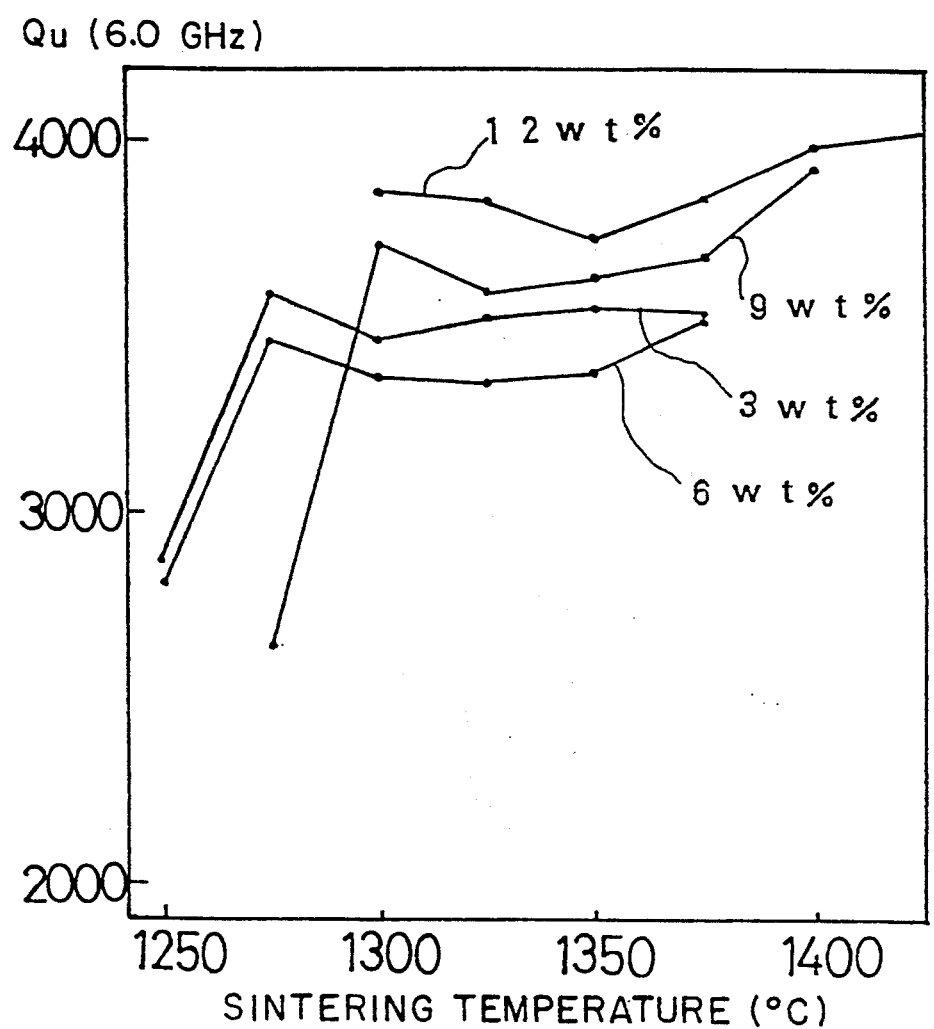
FIG. 55 is a graph showing a relation between the sintering temperature and Qu in the (0.94MgTiO$_3$·0.06CaTiO$_3$+(3–12) wt % Al$_2$O$_3$) ceramic composition.
Figure 56:
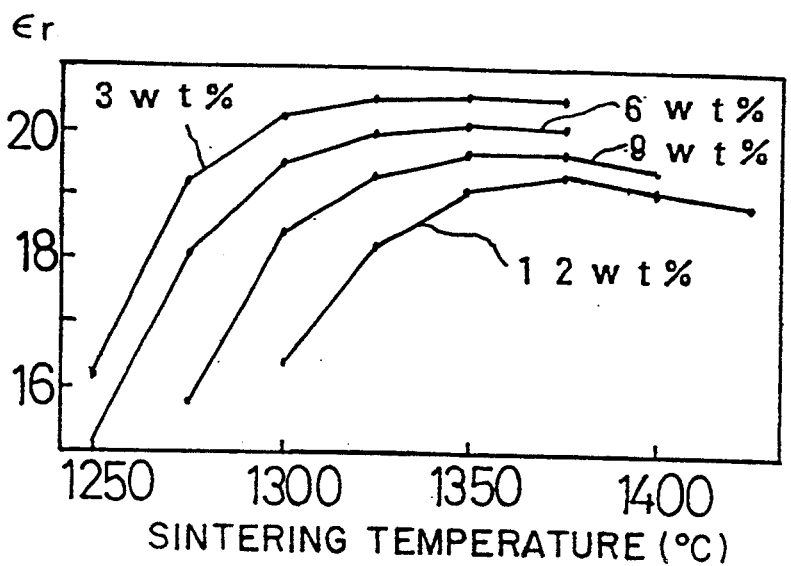
FIG. 56 is a graph showing a relation between the sintering temperature and $\epsilon_r$ in the ceramic composition shown in FIG. 55.
Figure 57:
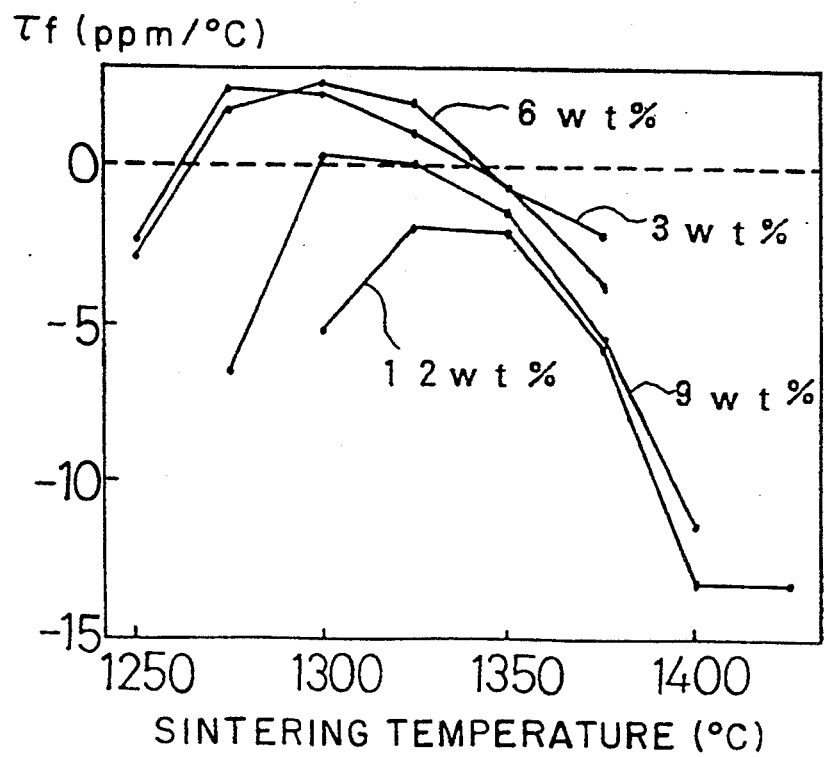
FIG. 57 is a graph showing a relation between the sintering temperature and $\tau f$ in the ceramic composition shown in FIG. 55.
Figure 58:
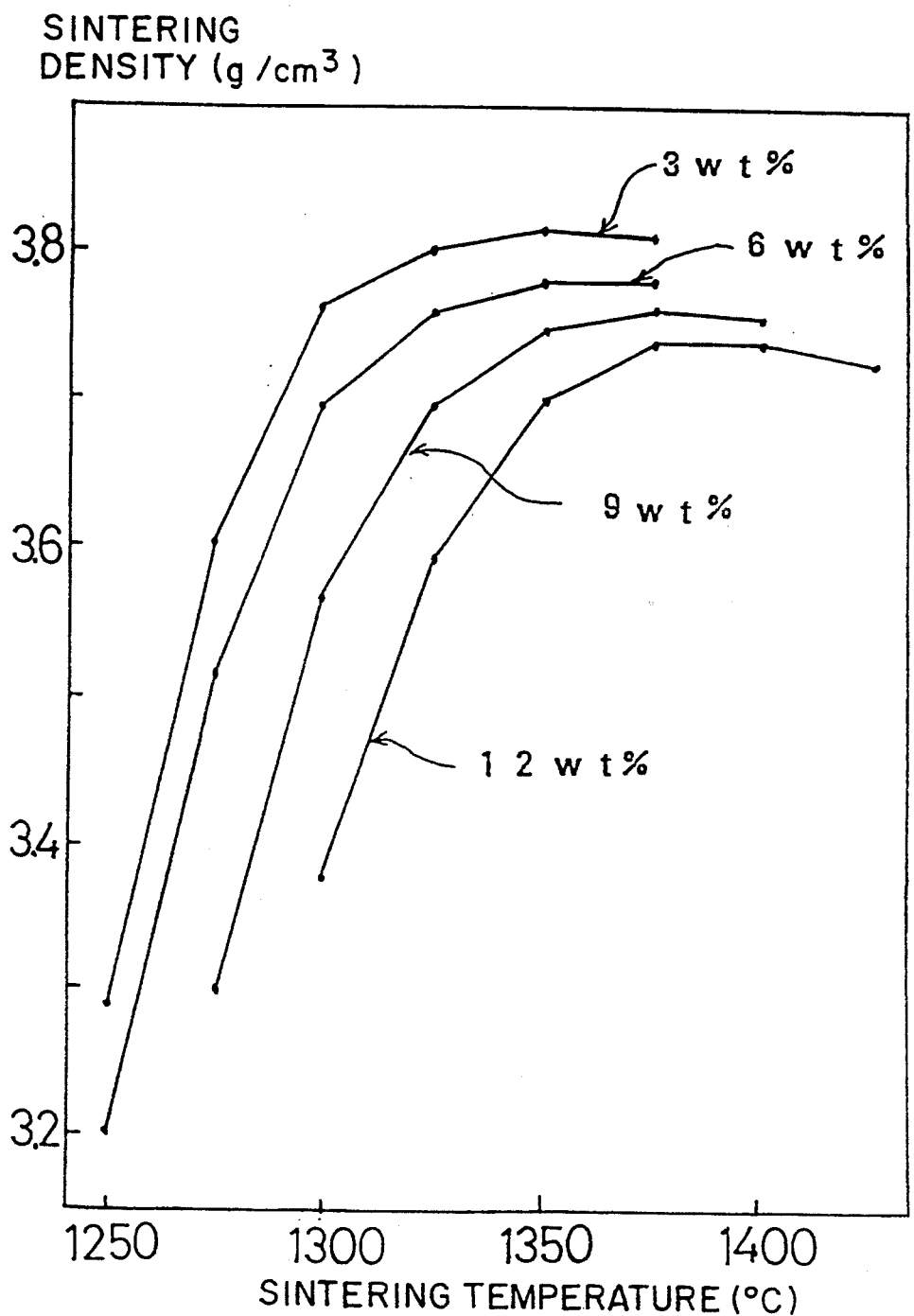
FIG. 58 is a graph showing a relation between the sintering temperature and the sintering density in the ceramic composition shown in FIG. 55.

| No. | Amount of MnO₂ (wt %) | Calcining temp. (°C.) | Sinter. temp. (°C.) | Qu (6 GHz) | Rel. dielect. const. $\epsilon_r$ | τf (ppm/ °C.) | Sint. density (g/cm³) |
|---|---|---|---|---|---|---|---|
| 1 | 3 | 1100 | 1425 | 3310 | 21.64 | 14.3 | 3.844 |
| 2 | 6 | 1100 | 1425 | 2900 | 21.38 | 12.8 | 3.855 |
| 3 | 3 | 1100 | 1400 | 3330 | 21.60 | 15.0 | 3.851 |
| 4 | 6 | 1100 | 1400 | 2880 | 21.42 | 12.3 | 3.864 |
| 5 | 3 | 1100 | 1375 | 3400 | 21.46 | 13.8 | 3.833 |
| 6 | 6 | 1100 | 1375 | 2890 | 21.44 | 11.8 | 3.865 |
| 7 | 3 | 1100 | 1350 | 3560 | 20.06 | 11.8 | 3.668 |
| 8 | 6 | 1100 | 1350 | 2960 | 21.00 | 12.0 | 3.803 |
| 9 | 3 | 1100 | 1325 | 1390 | 17.71 | 6.92 | 3.416 |
| 10 | 6 | 1100 | 1325 | 3140 | 18.90 | 7.07 | 3.563 |
| 11 | 3 | 1100 | 1300 | Unmeasurable | | | 3.268 |
| 12 | 6 | 1100 | 1300 | Unmeasurable | | | 3.395 |
| 13 | 0 | 1100 | 1425 | 2390 | 21.17 | −4.47 | 3.819 |
| 14 | 0 | 1100 | 1400 | 3490 | 21.78 | 19.7 | 3.834 |
| 15 | 0 | 1100 | 1375 | 3650 | 21.22 | 17.5 | 3.769 |
| 16 | 0 | 1100 | 1350 | 3820 | 19.54 | 15.1 | 3.577 |
| 17 | 0 | 1100 | 1325 | Unmeasurable | | | 3.131 | specimens of the same shape as in Example 1 (Nos. 1–18 in Table 8, Nos. 1–20 in Table 9 and Nos. 1–17 in Table 10). Further, characteristics were measured by the same method. The results are shown in Tables 8–10 and FIGS. 38–49. Further, as an example, results of X-ray diffraction of 0.94MgTiO₃·0.06CaTiO₃ are shown in FIG. 50 (containing 0%, 3% or 6% by weight of MnO₂ to 0.94MgTiO₃·0.06 CaTiO₃ sintered at 1300° C. for 4 hours).

From the foregoing results, the value Qu tends to decrease if (1−x) is large in xMgTiO₃·(1−x)CaTiO₃, whereas τf and $\epsilon_r$ tend to increase toward the positive side. Further, the sintering density tends to increase along with elevation of the sintering temperature but it shows no substantial change relative to the change of the sintering temperature as the addition amount of $MnO_2$ increases.

Further, although $\epsilon_r$ shows no substantial change, Qu and $\tau f$ tend to decrease due to the addition of $MnO_2$. Accordingly, addition of $MnO_2$ is suitable to the control of $\tau f$ with no reduction of the performance of $\epsilon_r$. Further, as shown in Table 8, in a case if $MnO_2$ is not added, the sintering density is small if the sintering temperature is low (1325° to 1350° C.) and a temperature higher than 1375° C. is necessary for ensuring a sufficient sinterability. On the other hand, in a case of adding $MnO_2$ (3 to 6% by weight), a sufficient sinterability is shown even at a sintering temperature of 1350° C.

At a sintering temperature from 1350° to 1425° C. and with the addition amount of $MnO_2$ of 3% by weight, a preferred range of $(1-x)$ is from 0.06 to 0.07, since practical characteristic ranges are shown for $\tau f$ as $-2.60$ to $+15.0$ ppm/°C., for $\epsilon_r$ as 19.04 to 21.64 and for Qu as 3310 to 3890. Particularly, if $(1-x)$ is 0.06 and the addition amount of $MnO_2$ is 3% by weight, at a sintering temperature, for example, of 1375° C., $\tau f$ is $-0.09$ ppm/°C., $\epsilon_r$ is 20.7 and Qu is 3700, showing particularly excellent balance of performance and the scattering thereof is extremely small. Further, regarding $\tau f$, since the variation coefficient to the sintering temperature is low, a small value around zero ppm/°C. can be controlled easily. On the other hand, it is not preferred that $CaTiO_3$ is not contained, since the Qu value is large, but $\epsilon_r$ is small and, in addition, $\tau f$ extremely decreases is considered that Qu decreases due to the decrease in the amount of $MgTiO_3$.

Further, although not illustrated, results of electron microscopic photograph show that the grain size increases along with the elevation of the sintering temperature (1300° C.:2.7 μm, 1350° C.:8.7 μm, 1400° C.:9.2 μm, each measured by an Intercept method). The rapture cross-section shows inter-grain destruction in each of the cases. As a result of EDS analysis, only Mg, Ca, Ti and Mn were detected.

EXAMPLE 5

Using $Al_2O_3$ powder (99.9% purity) instead of the ZnO powder used in Example 1, a predetermined amount of the starting material (about 500 g in total) was weighted and mixed so as to provide a composition in which x and y vary in the formula: $xMgTiO_3 \cdot (1-x)CaTiO_3 + y$ wt % $Al_2O_3$ in which y means % by weight of $Al_2O_3$ based on 100 parts by weight of $xMgTiO_3 \cdot (1-x)CaTiO_3$ in Tables 7 and 11 and FIGS. 51-58. Table 7 shows the change of the addition amount (constitutional amount) of $CaTiO_3(1-x)$ and Tables 11 shows the change of the addition amount of $Al_2O_3$. Subsequently, molding products of the same shape were produced, sintered in the same manner at a predetermined temperature and then polished to prepare dielectric specimens of the same shape as in Example 1 (Nos. 1-12 in Table 7 and Nos. 1-24 in Table 11). Further, characteristics were measured by the same method. The results are shown in Table 7 and 11 and FIGS.

TABLE 11

| | [0.94 $MgTiO_3 \cdot 0.06$ $CaTiO_3$ + 3~12 wt % $Al_2O_3$] ceramic composition | | | | | | |
|---|---|---|---|---|---|---|---|
| No. | Amount of $Al_2O_3$ (wt %) | Calcining temp. (°C.) | Sinter. temp. (°C.) | Qu (6 GHz) | Rel. dielect. const. $\epsilon r$ | $\tau f$ (ppm/ °C.) | Sint. density (g/cm³) |
| 1 | 12 | 1100 | 1425 | 4040 | 18.90 | −13.2 | 3.725 |
| 2 | 9 | 1100 | 1400 | 3940 | 19.47 | −11.3 | 3.756 |
| 3 | 12 | 1100 | 1400 | 4000 | 19.10 | −13.2 | 3.739 |
| 4 | 3 | 1100 | 1375 | 3550 | 20.54 | −2.21 | 3.811 |
| 5 | 6 | 1100 | 1375 | 3530 | 20.07 | −3.85 | 3.781 |
| 6 | 9 | 1100 | 1375 | 3700 | 19.70 | −5.50 | 3.762 |
| 7 | 12 | 1100 | 1375 | 3860 | 19.34 | −5.77 | 3.739 |
| 8 | 3 | 1100 | 1350 | 3560 | 20.60 | −0.70 | 3.816 |
| 9 | 6 | 1100 | 1350 | 3390 | 20.13 | −0.74 | 3.781 |
| 10 | 9 | 1100 | 1350 | 3640 | 19.68 | −1.53 | 3.747 |
| 11 | 12 | 1100 | 1350 | 3750 | 19.09 | −2.06 | 3.698 |
| 12 | 3 | 1100 | 1325 | 3530 | 20.56 | 0.97 | 3.802 |
| 13 | 6 | 1100 | 1325 | 3360 | 20.00 | 1.91 | 3.759 |
| 14 | 9 | 1100 | 1325 | 3600 | 19.29 | 0 | 3.696 |
| 15 | 12 | 1100 | 1325 | 3850 | 18.20 | −1.99 | 3.593 |
| 16 | 3 | 1100 | 1300 | 3470 | 20.24 | 2.25 | 3.762 |
| 17 | 6 | 1100 | 1300 | 3370 | 19.50 | 2.59 | 3.695 |
| 18 | 9 | 1100 | 1300 | 3730 | 18.40 | 0.12 | 3.568 |
| 19 | 12 | 1100 | 1300 | 3870 | 16.39 | −5.22 | 3.376 |
| 20 | 3 | 1100 | 1275 | 3590 | 19.20 | 2.37 | 3.607 |
| 21 | 6 | 1100 | 1275 | 3470 | 18.05 | 1.76 | 3.517 |
| 22 | 9 | 1100 | 1275 | 2640 | 15.77 | −6.50 | 3.298 |
| 23 | 3 | 1100 | 1250 | 2870 | 16.18 | −2.39 | 3.287 |
| 24 | 6 | 1100 | 1250 | 2810 | 15.15 | −2.87 | 3.203 | toward the negative side as −25 to −44 ppm/°C.

Figure 29:
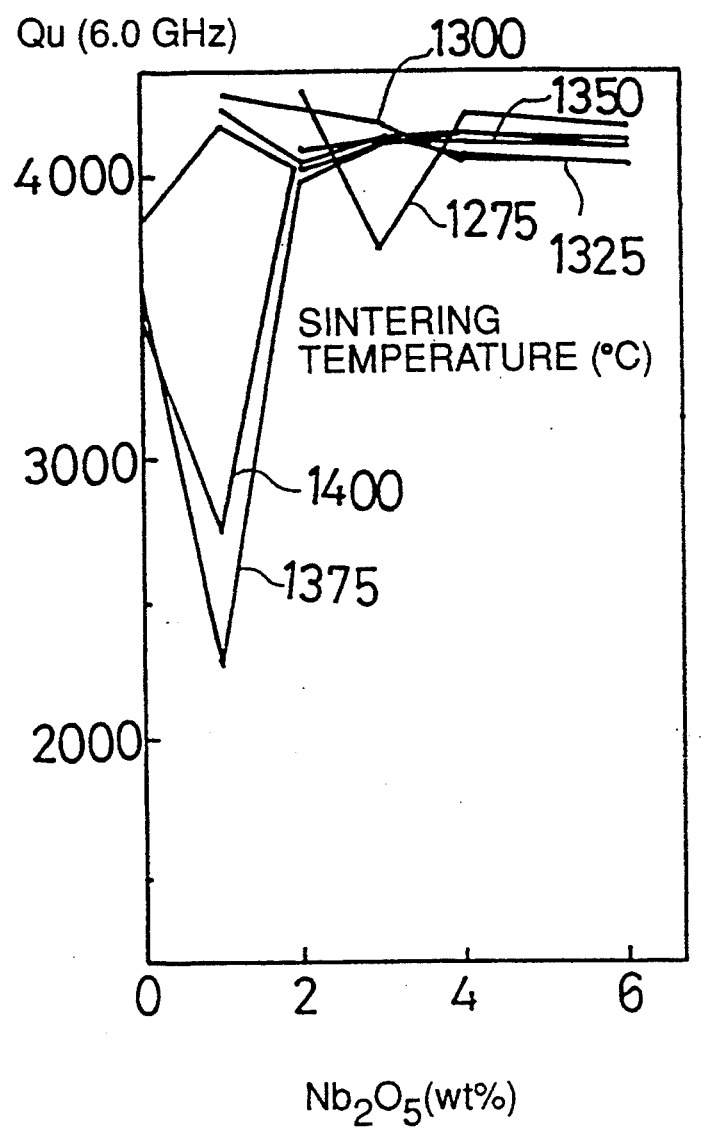
FIG. 29 is a graph showing a relation between the amount of $Nb_2O_5$ and Qu in a $(0.93MgTiO_3 \cdot 0.07CaTiO_3 + (0-6)$ wt % $Nb_2O_5)$ ceramic composition produced by sintering at each of sintering temperatures.
Figure 30:
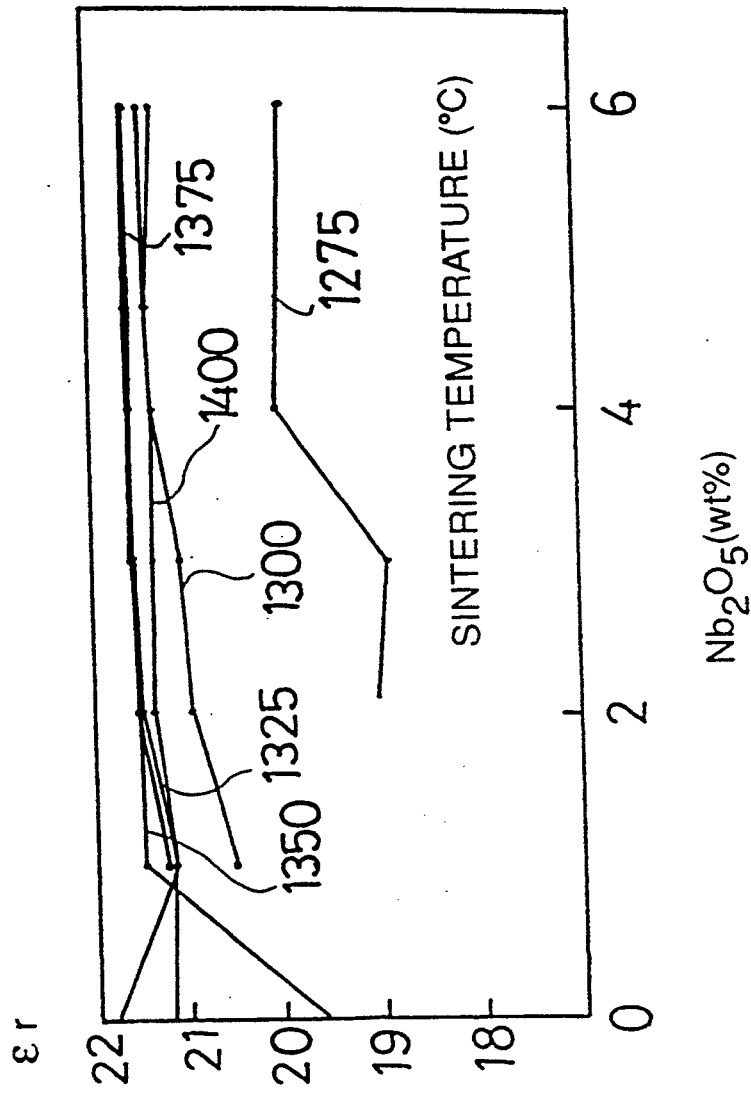
FIG. 30 is a graph showing a relation between the amount of $Nb_2O_5$ and $\epsilon_r$ in the ceramic composition shown in FIG. 29.
Figure 31:
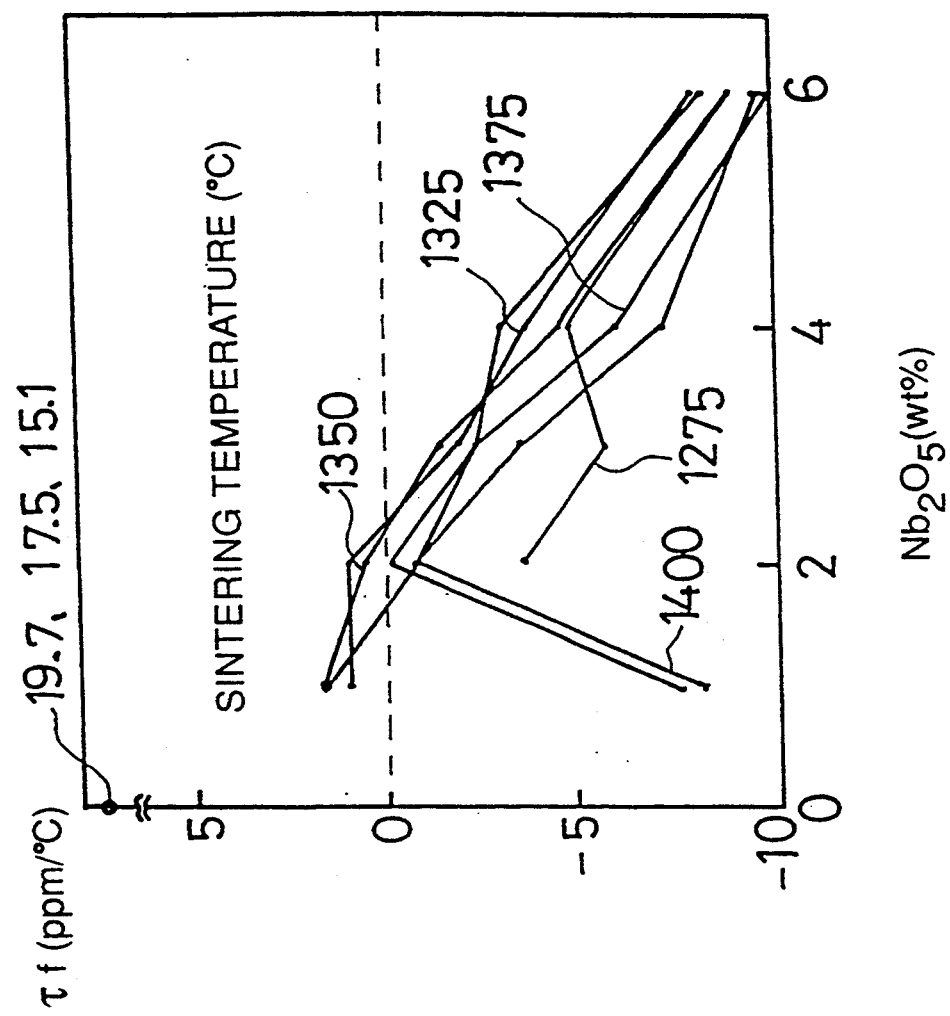
FIG. 31 is a graph showing a relation between the amount of $Nb_2O_5$ and $\tau f$ in the ceramic composition shown in FIG. 29.
Figure 32:
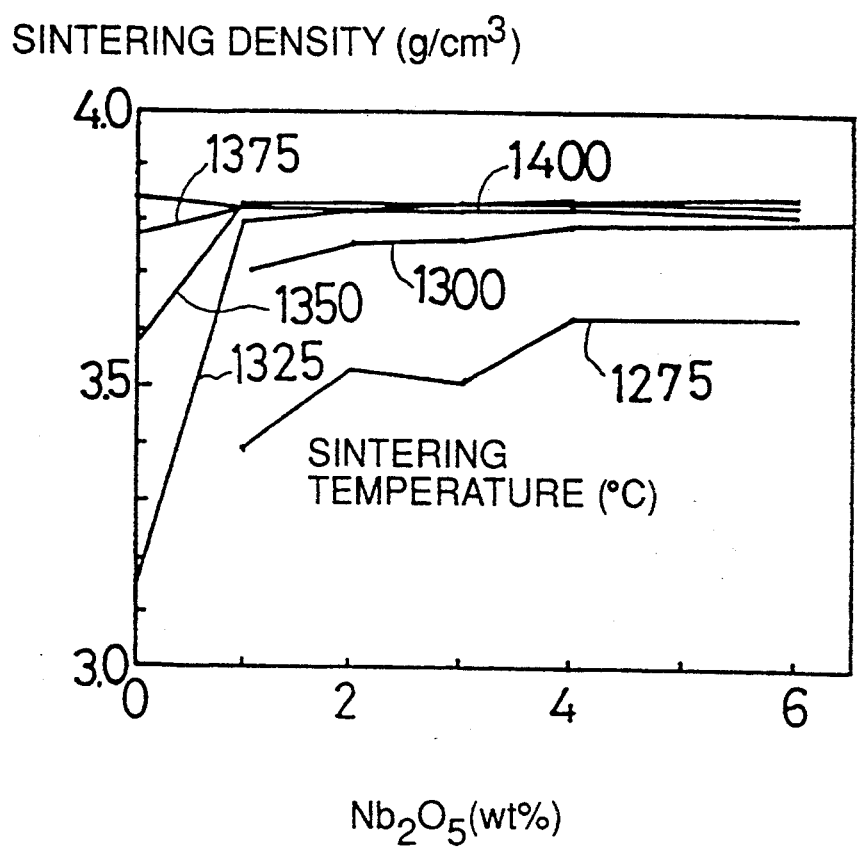
FIG. 32 is a graph showing a relation between the amount of (0–6 wt %) $Nb_2O_5$ and the sintering density in the ceramic composition shown in FIG. 29.
Figure 33:
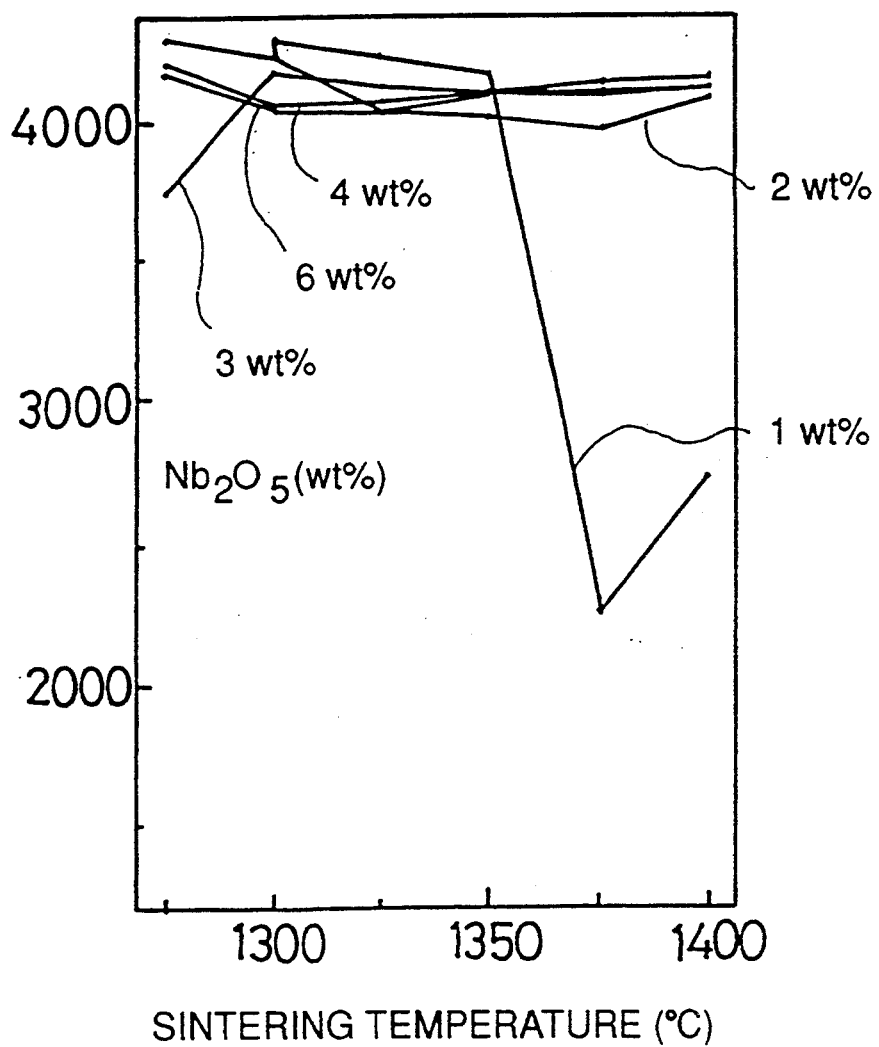
FIG. 33 is a graph showing a relation between the sintering temperature and Qu in the (0.93MgTiO$_3$·0.07CaTiO$_3$+(1–6) wt % Nb$_2$O$_5$) ceramic composition.
Figure 34:
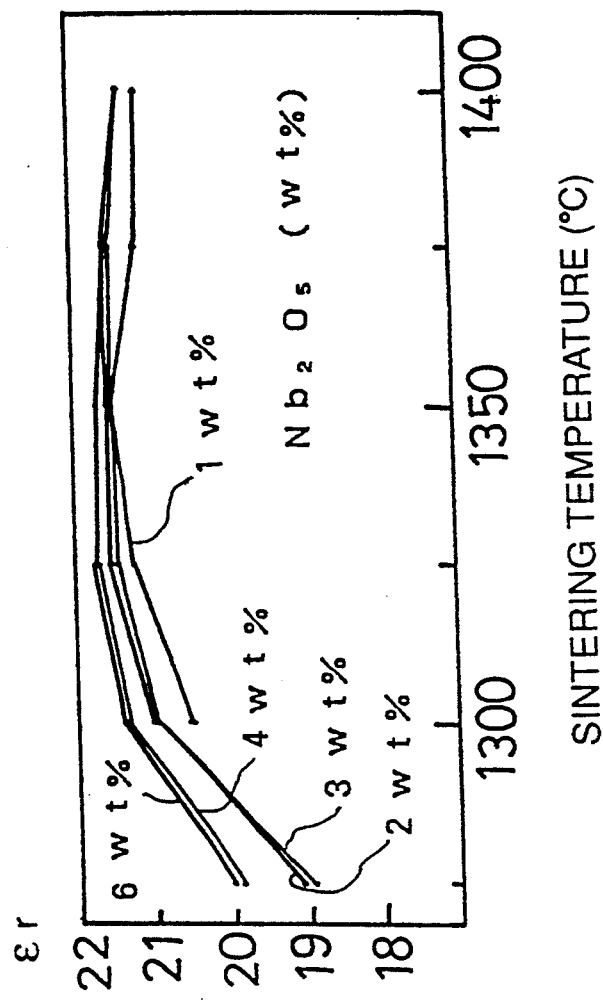
FIG. 34 is a graph showing a relation between the sintering temperature and $\epsilon_r$ in the ceramic composition shown in FIG. 33.
Figure 35:
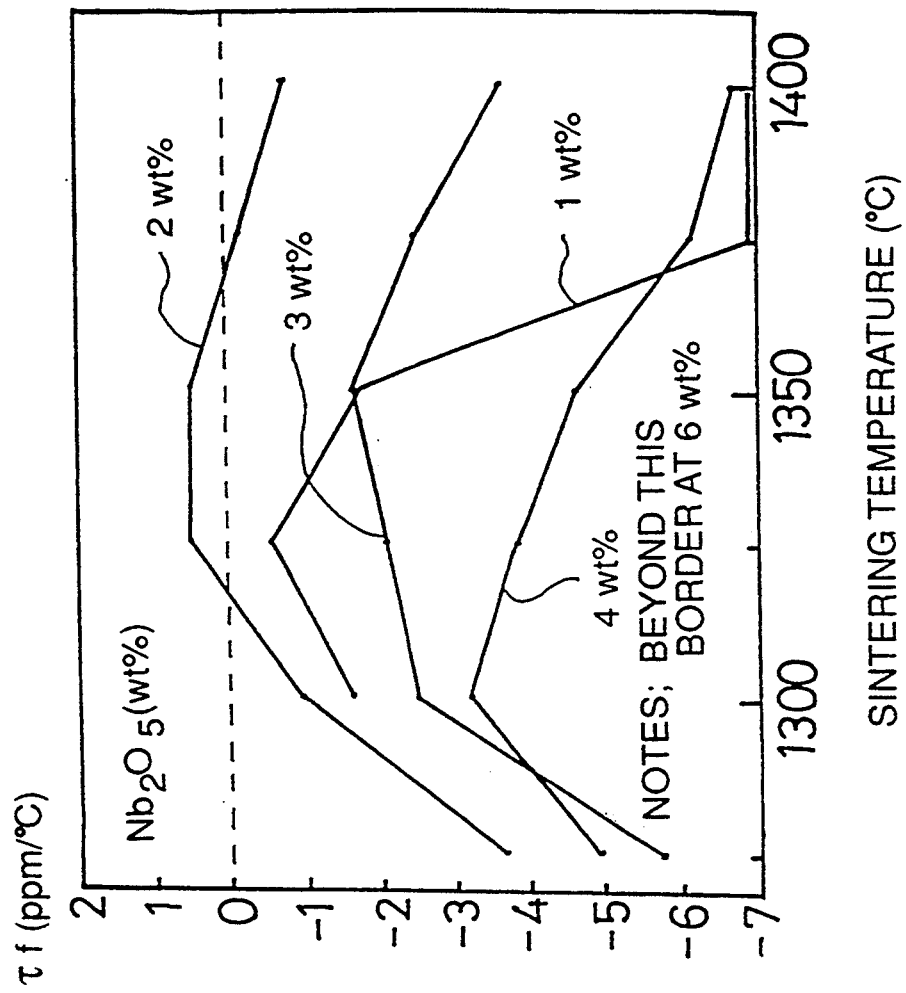
FIG. 35 is a graph showing a relation between the sintering temperature and $\tau f$ in the ceramic composition shown in FIG. 33.
Figure 36:
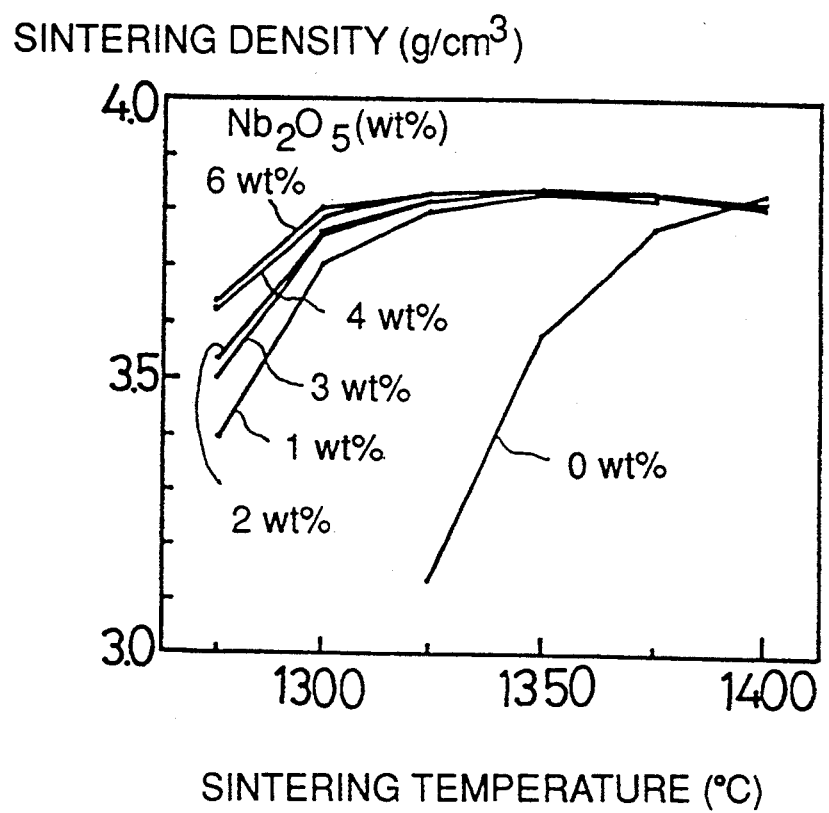
FIG. 36 is a graph showing a relation between the sintering temperature and the sintering density in the ceramic composition shown in FIG. 33.
Figure 60:
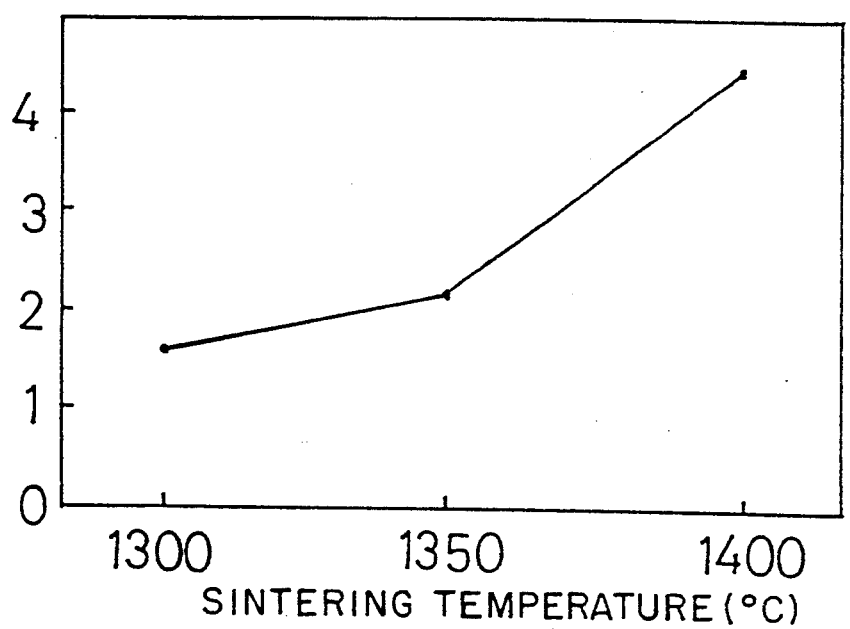
FIG. 60 is a graph showing a relation between the sintering temperature and the average grain size of sintering product in the (0.94MgTiO$_3$·0.06CaTiO$_3$+12 wt % Al$_2$O$_3$) ceramic composition produced at a sintering temperature of 1350° C.
Figure 63:
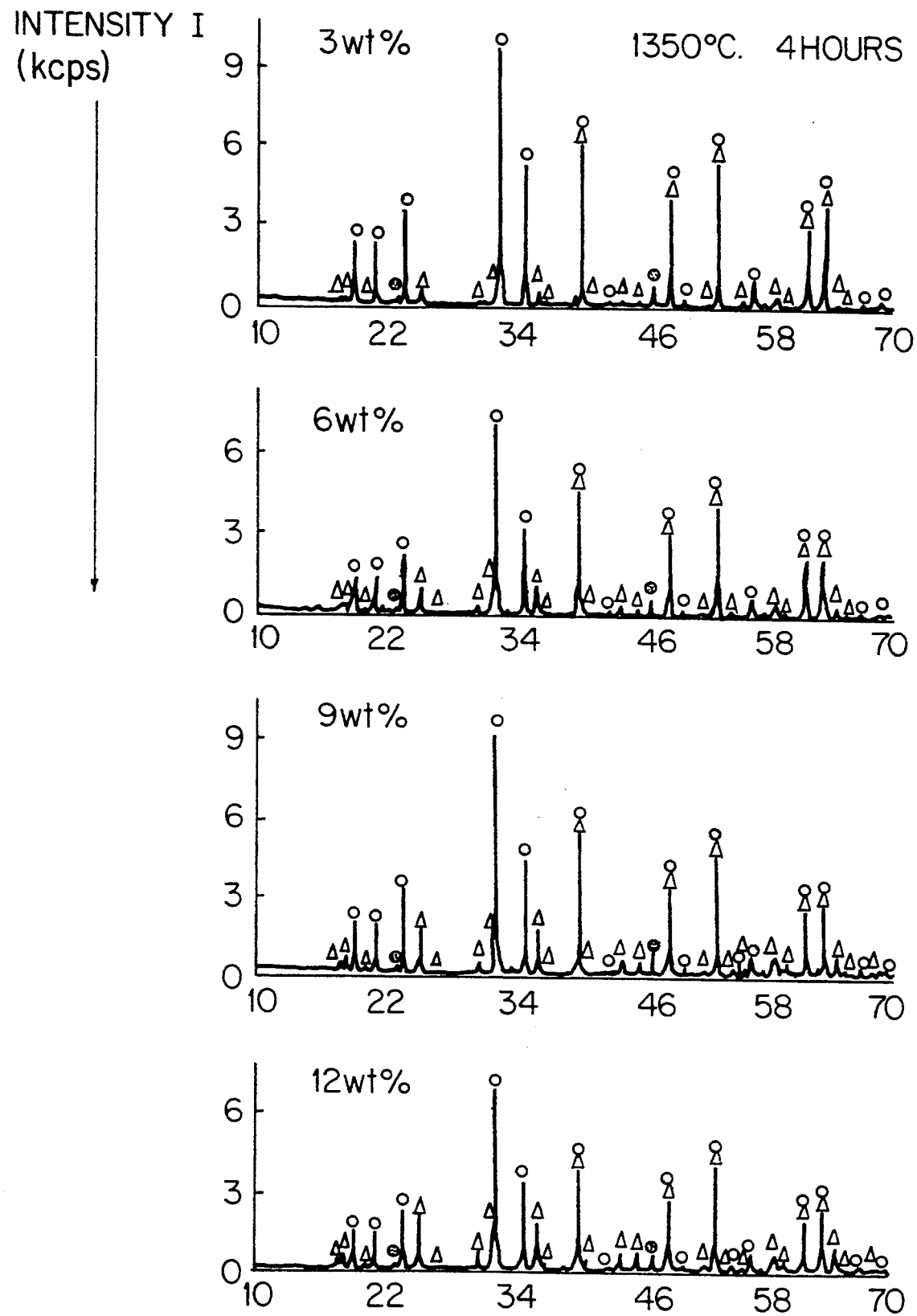
FIG. 63 is a graph showing the result of X-ray diffraction of a (0.94MgTiO$_3$·0.06CaTiO$_3$+3, 6, 9 or 12 wt % Al$_2$O$_3$) ceramic composition.
Figure 64:
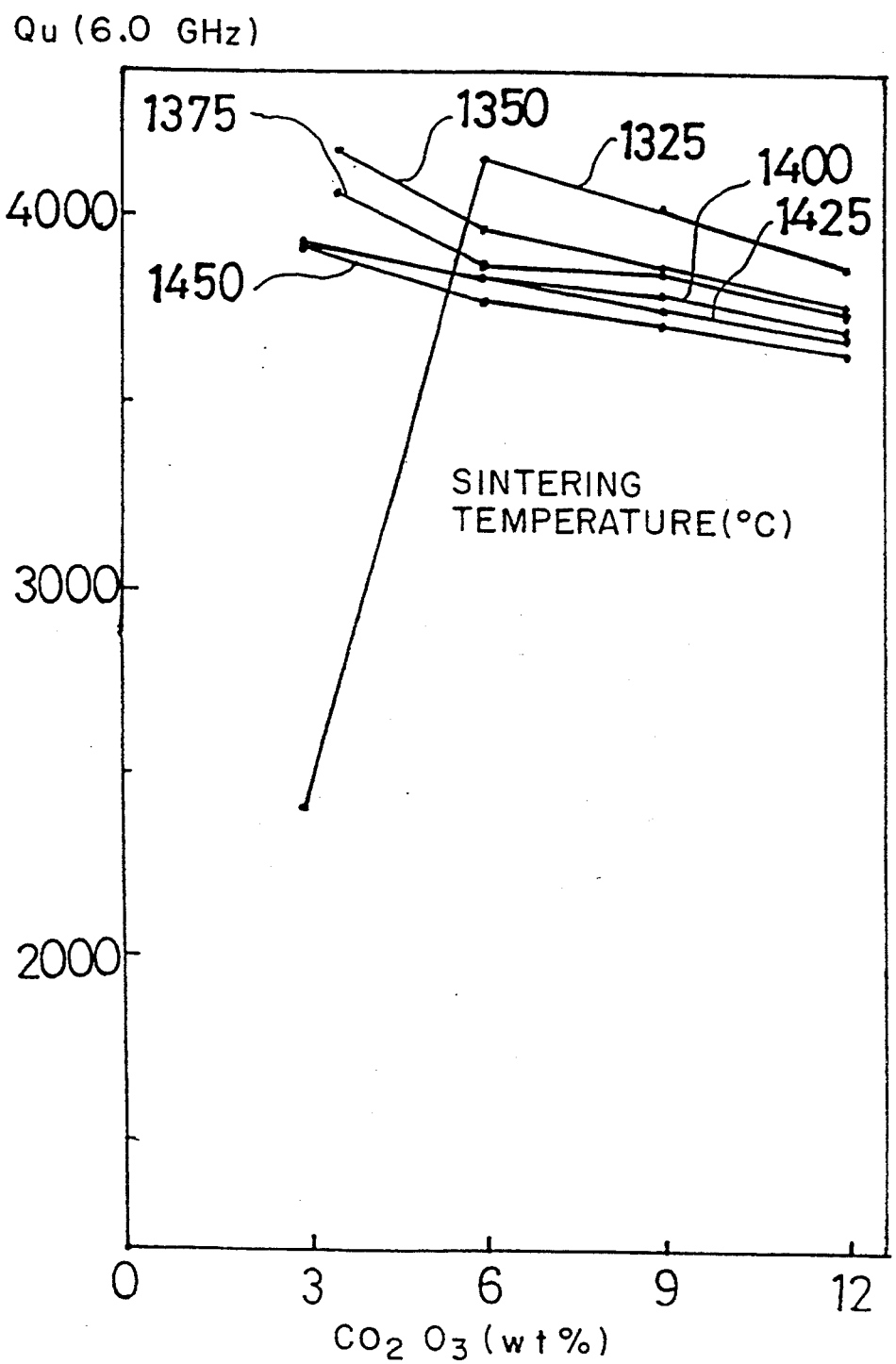
FIG. 64 is a graph showing a relation between the amount of Al$_2$O$_3$ and Qu in a (0.94MgTiO$_3$·0.06CaTiO$_3$+3–12 wt % Co$_2$O$_3$) ceramic composition produced by sintering at each of sintering temperatures.
Figure 65:
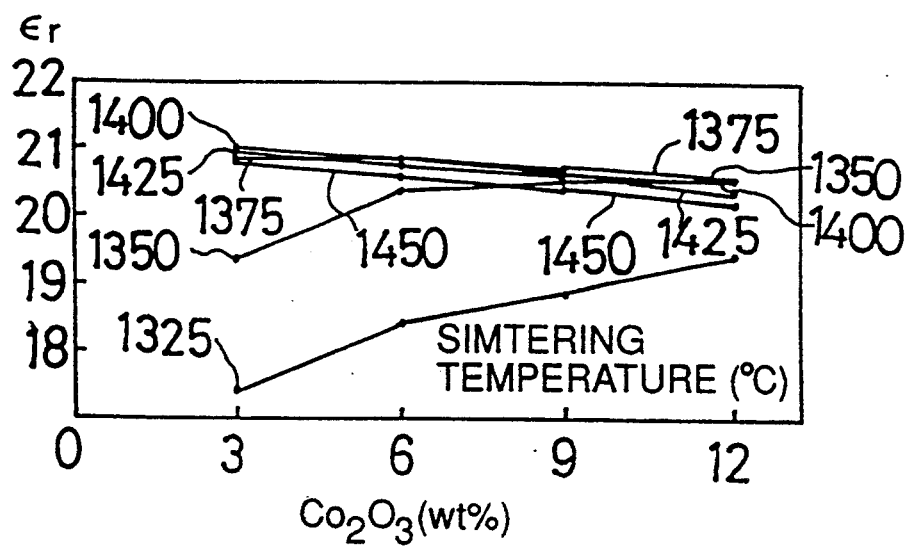
FIG. 65 is a graph showing a relation between the amount of 3–12 wt % Co$_2$O$_3$ and $\epsilon_r$ in the ceramic composition shown in FIG. 64.
Figure 66:
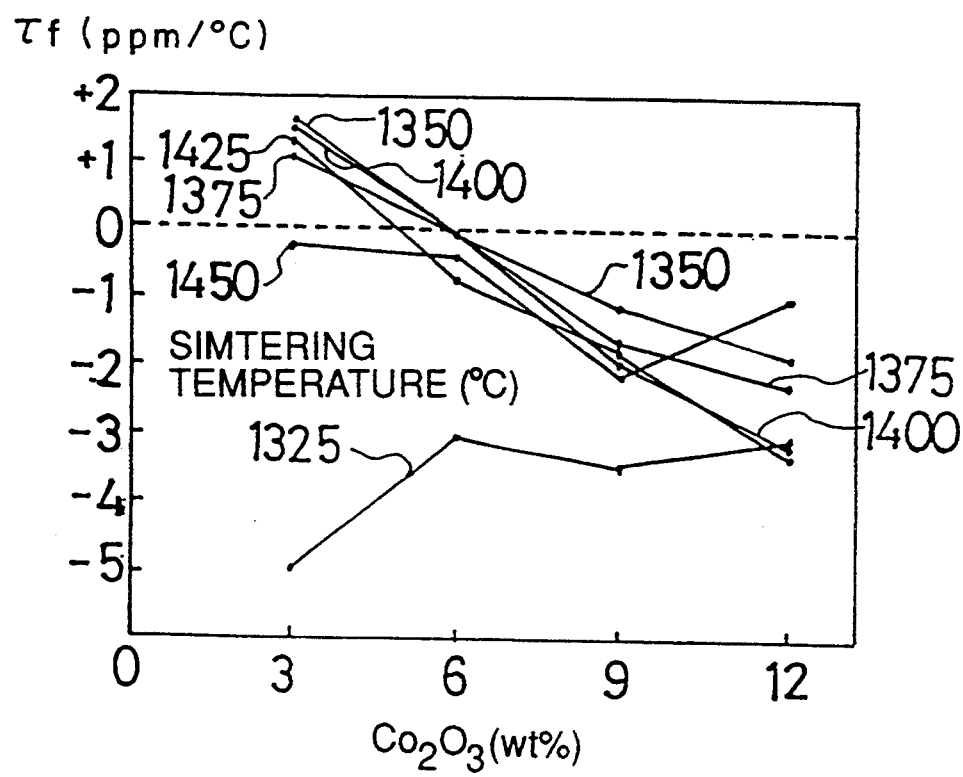
FIG. 66 is a graph showing a relation between the amount of 3–12 wt % Co$_2$O$_3$ and $\tau f$ in the ceramic composition shown in FIG. 64.
Figure 67:
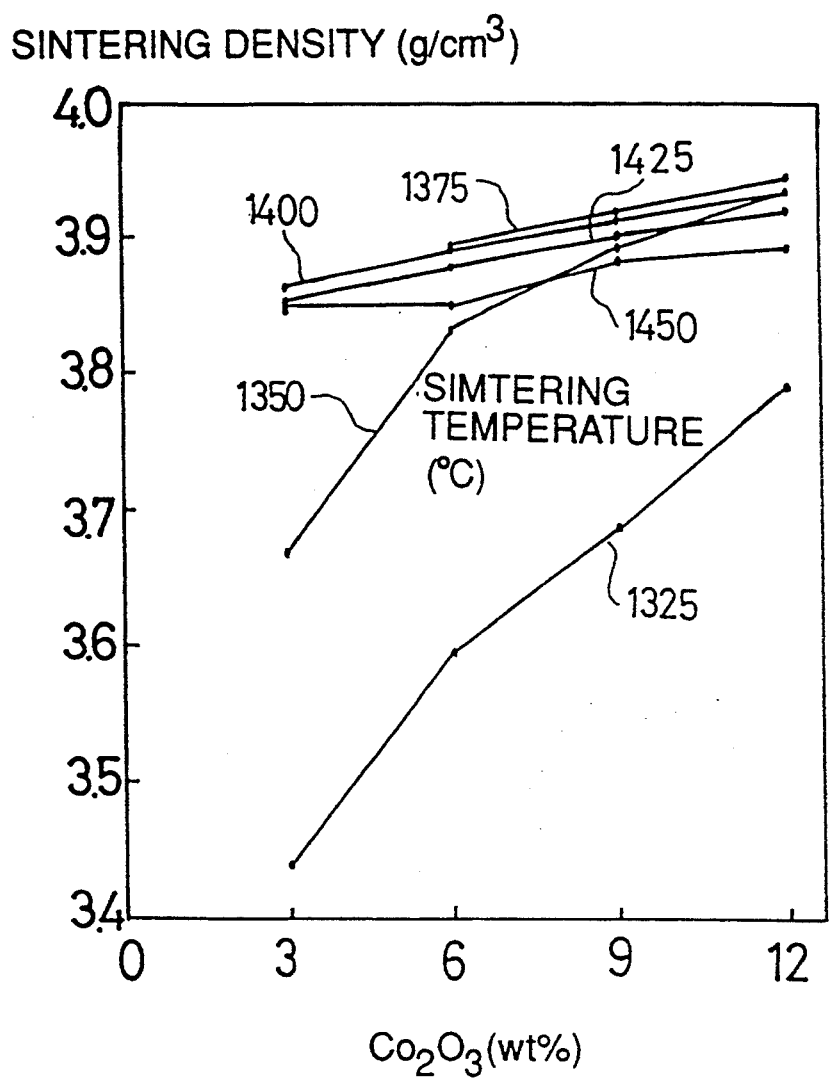
FIG. 67 is a graph showing a relation between the amount of 3–12 wt % Co$_2$O$_3$ and the sintering density in the ceramic composition shown in FIG. 64.
Figure 68:
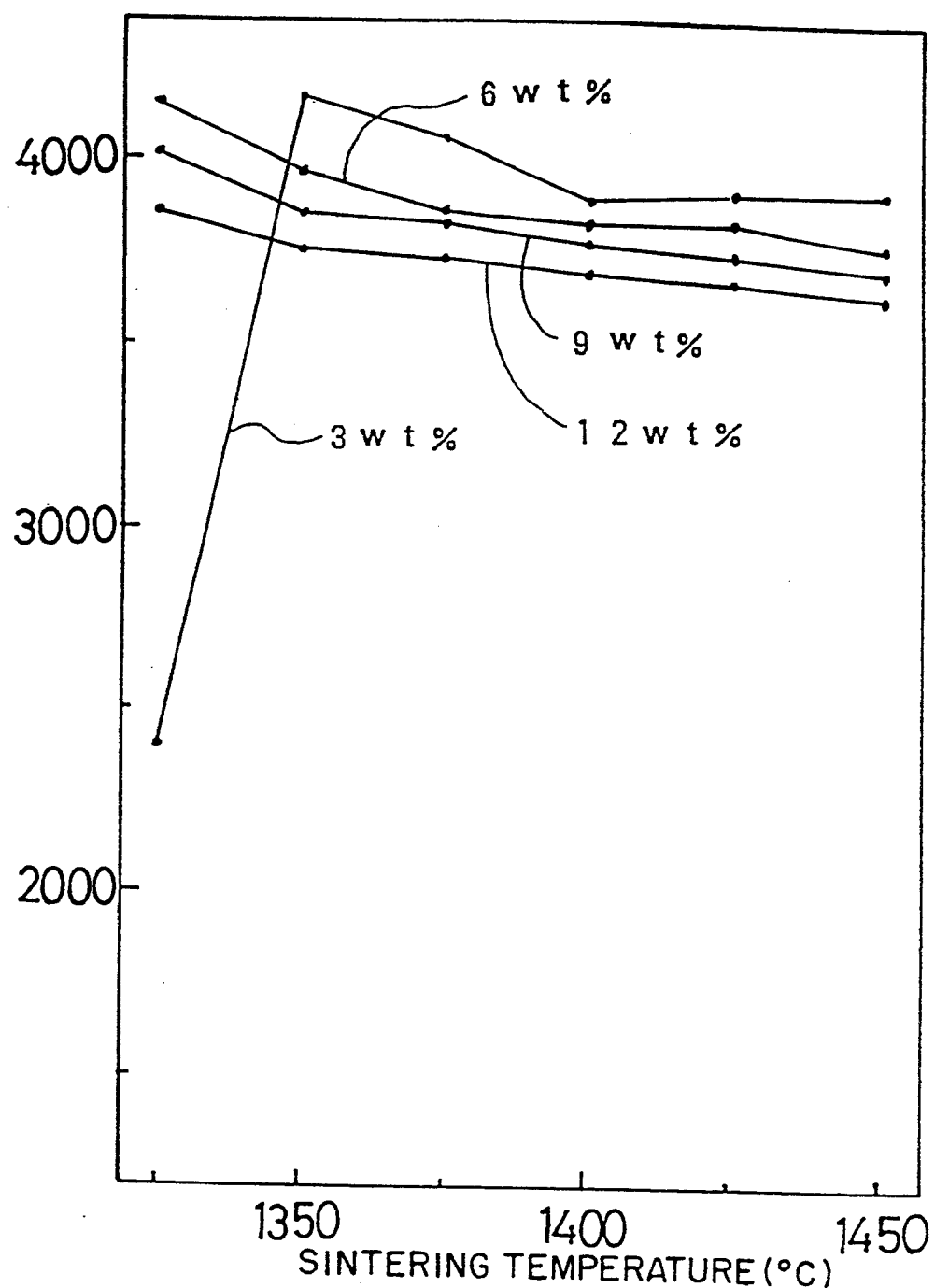
FIG. 68 is a graph showing a relation between the sintering temperature and Qu in the (0.94MgTiO$_3$·0.06CaTiO$_3$+3–12 wt % Co$_2$O$_3$) ceramic composition.
Figure 69:
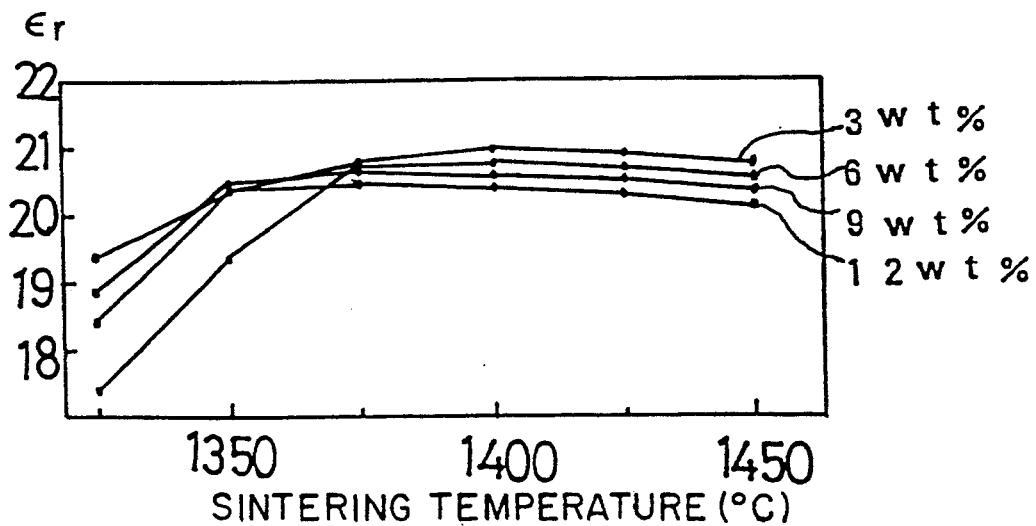
FIG. 69 is a graph showing a relation between the sintering temperature and $\epsilon_r$ in the ceramic composition shown in FIG. 68.
Figure 70:
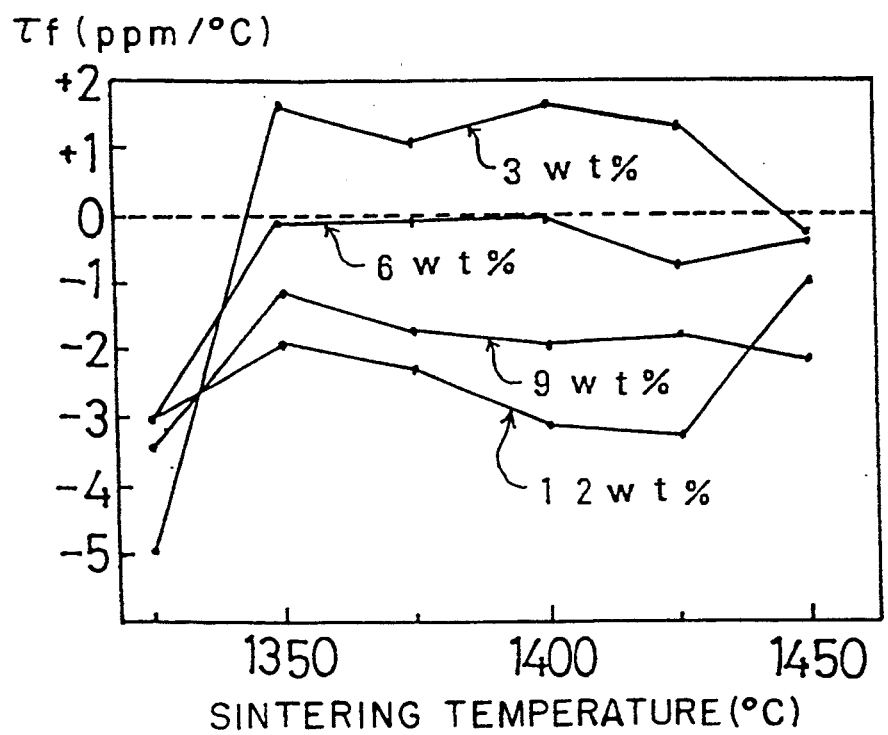
FIG. 70 is a graph showing a relation between the sintering temperature and $\tau f$ in the ceramic composition shown in FIG. 68.
Figure 71:
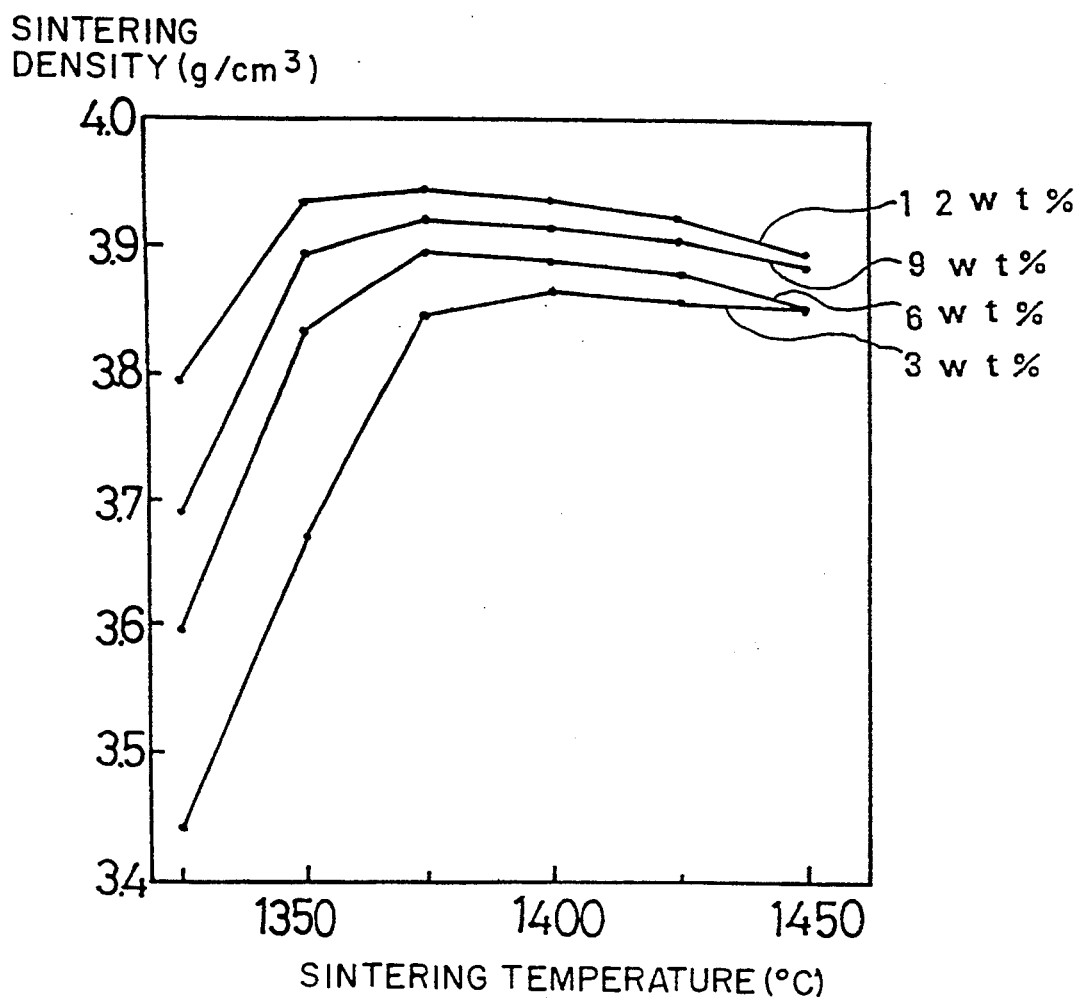
FIG. 71 is a graph showing a relation between the sintering temperature and the sintering density in the ceramic composition shown in FIG. 68.
Figure 72:
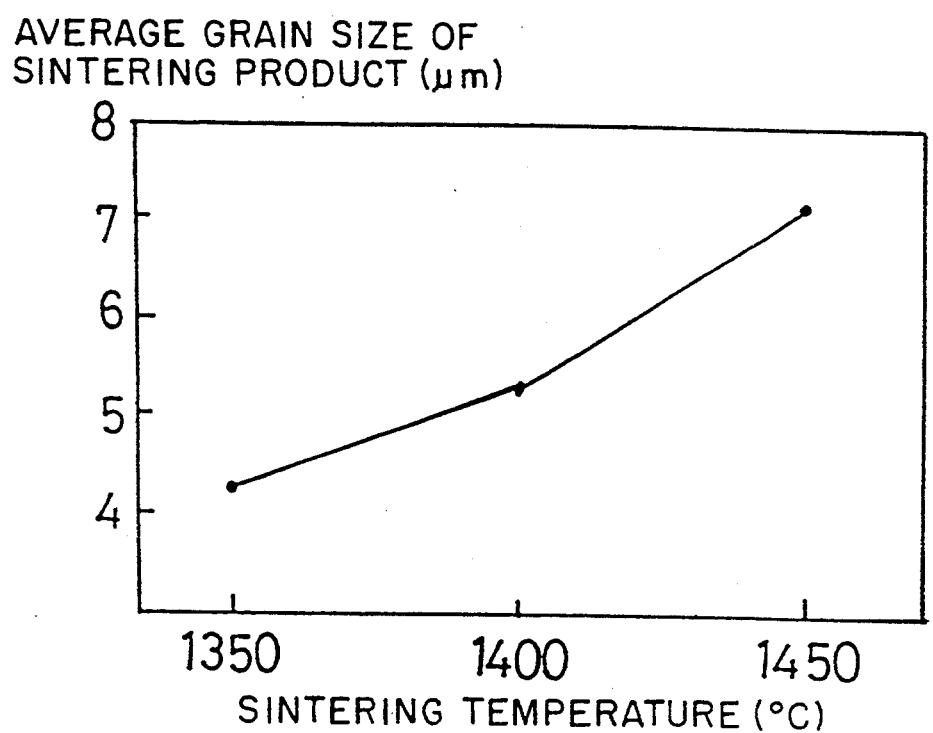
FIG. 72 is a graph showing a relation between the sintering temperature and the average grain size in the ceramic composition shown in FIG. 68.

Further, the analysis method based on the absence or presence of X-ray diffraction peaks shown in FIG. 50 shows that the structure of products according to the present invention contains $MgTiO_3$ (○) and $CaTiO_3$ (●) and $Mg_6MnO_6$ (△) and $Mn_3O_4$ (▽) as other peaks and that MgO, CaO and $TiO_2$ are not contained. Namely, the relative peak intensity of $MgTiO_3$ is reduced along with the increase of the addition amount of $MnO_2$, while $Mg_6MnO_8$, $Mn_3O_4$, etc., are increased. It 51-58. The resonance frequency used for the measurement of Qu is 5.7 to 6.3 GHz. Further, FIG. 29 shows a relation between the addition amount of $Al_2O_3$ and the average grain size of the sintering product and FIG. 60 shows a relation between the sintering temperature and the average grain size of the sintering product. Further, as an example, FIG. 63 shows results of X-ray diffraction of $0.94MgTiO_3 \cdot 0.06CaTiO_3 \cdot 3.12$ wt % $Al_2O_3$ (sintered at 1350° C. for 4 hours).

From the foregoing results, the value Qu tends to decrease if $(1-x)$ is large in $xMgTiO_3 \cdot (1-x)CaTiO_3$ but $\tau f$ and $\epsilon_r$ tend to increase toward the positive side. Further, the sintering density tends to increase along with elevation of the sintering temperature.

As the addition of $Al_2O_3$, increases, Qu tends to increase, and $\epsilon_r$, $\tau f$ and the sintering density tend to decrease. Then, at a sintering temperature of 1275° C., Qu, $\epsilon_r$ and the sintering density tend to decrease and their scattering is large, whereas highly stable performances are shown at 1300° to 1375° C. Further, in a case where the addition amount of $Al_2O_3$ is 3 to 9% by weight and the sintering temperature is 1300° to 1375° C., well balanced performance and physical property are shown, as Qu is 3360 to 3730, $\epsilon_r$ is 18.4 to 20.6, $\tau f$ is $-2.2$ to $+2.6$ ppm/°C. and the sintering density is 3.568 to 3.816 g/cm$^3$ as described above.

In view of the above, appropriate addition of $Al_2O_3$ can improve the performance of Qu while maintaining $\epsilon_r$ and further it is suitable to the control of $\tau f$. Particularly, regarding $\tau f$, since the variation coefficient relative to the addition of $Al_2O_3$ and the sintering temperature is low, a small value around 0 ppm/°C. can be controlled easily.

Figure 59:
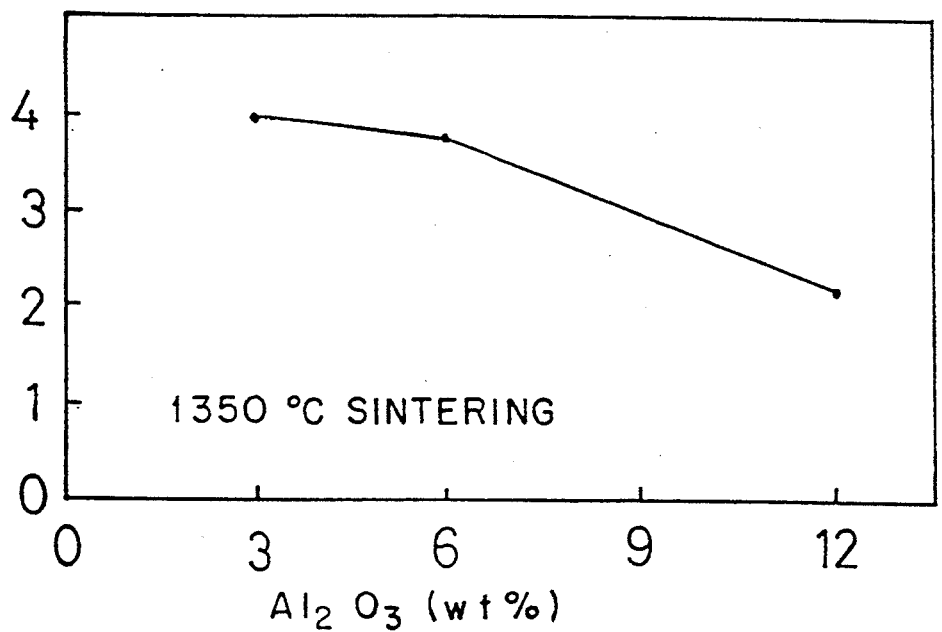
FIG. 59 is a graph showing a relation between the amount of Al$_2$O$_3$ and the average grain size of sintering product in the (0.94MgTiO$_3$·0.06CaTiO$_3$+3–12 wt % Al$_2$O$_3$) ceramic composition produced at a sintering temperature of 1350° C.
Figure 61:
FIG. 61 is the electron microscopic photograph (1000 magnification ratio) which explains the structure of crystals of the (0.94MgTiO$_3$·0.06CaTiO$_3$+6 wt % Al$_2$O$_3$) ceramic composition.
Figure 62:
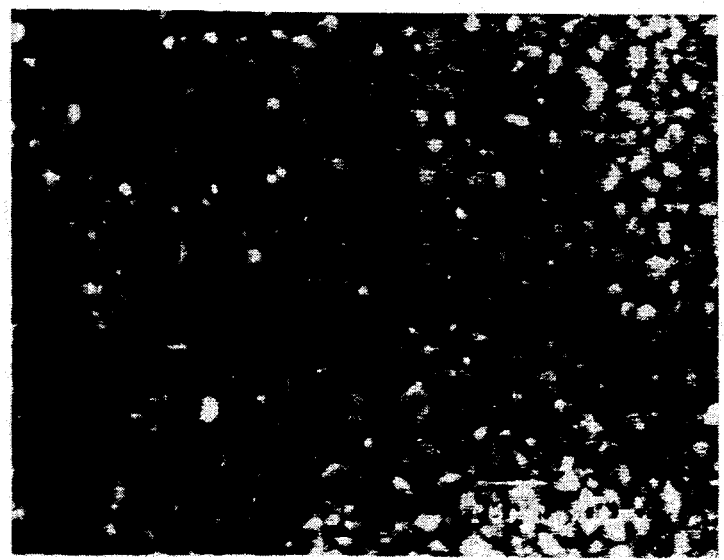
FIG. 62 is the electron microscopic photograph (1000 magnification ratio) which explains the structure of crystals of the (0.94MgTiO$_3$·0.06CaTiO$_3$+12 wt % Al$_2$O$_3$) ceramic composition.

Further, as shown in FIG. 60, the grain size of crystal grains increases along with the elevation of the sintering temperature (1300° C.:1.61 μm, 1350° C.:2.19 μm, and 1400° C.:4.46 μm, each measured by an Intercept method), whereas the grain size decreased along with the increase of the addition amount of $Al_2O_3$ as shown in FIG. 59 (3 wt %: 3.97, 6 wt %:3.76, 12 wt %:2.19). Further, FIG. 61 is a view explaining the structure of crystals by electron microscopic photograph (1000 magnification ratio) for a composition containing 6 wt % $Al_2O_3$ added (sintered at 1350° C. for 4 hours) and FIG. 62 shows a view explaining the structure of crystals by electron microscopic photograph (1000 magnification ratio) for a composition containing 12 wt % $Al_2O_3$ added (sintered at 1350° C. for 4 hours). According to the figures, each of them shows substantially uniform grain size distribution. Further, rapture cross-section tissues inter-grain destruction for each of 3–12 wt % $Al_2O_3$ addition systems.

Further, the analysis method based on the presence or absence of X-ray diffraction peak in FIG. 63 shows that the structure of products according to the present invention contains $MgTiO_3$ (○) and $CaTiO_3$ (●) and $MgTi_2O_5$ (△) as other peaks and that reaction products with $Al_2O_3$ are not contained.

EXAMPLE 6

Figure 73:
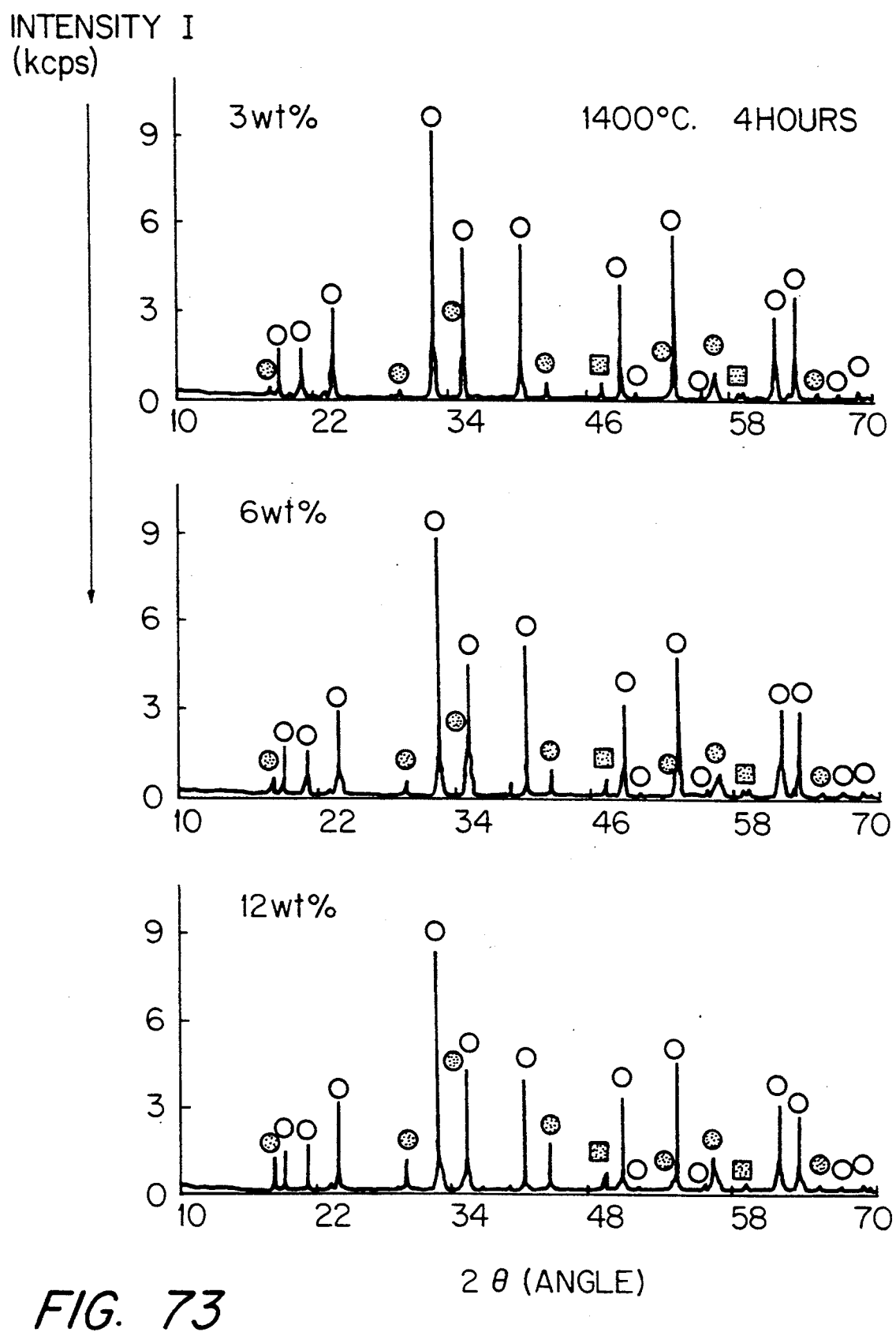
FIG. 73 is a graph showing the result of X-ray diffraction of a (0.94MgTiO$_3$·0.06CaTiO$_3$+3, 6 or 12 wt % Co$_2$O$_3$) ceramic composition.

Using $Co_2O_3$ powder (99.1% purity) instead of the ZnO powder used in Example 1, a predetermined amount of the starting material (about 500 g in total) was weighted and mixed so as to provide a composition in which x and y vary in the formula: x $MgTiO_3 \cdot (1-x)CaTiO_3 + y$ wt % $Co_2O_3$ in which y means % by weight of $Co_2O_3$ based on 100 parts by weight of $xMgTiO_3 \cdot (1-x)CaTiO_3$ as shown in Tables 7 and 12–13 and FIGS. 64–71. Subsequently, molding products of the same shape were produced, sintered in the same manner, and then polished to prepare dielectric specimens of the same shape as in Example 1 (Nos. 1–12 in Table 7, in Nos. 1–24 in Table 12 and Nos. 25 and 26 in Table 13). Further, characteristics were measured by the same method. The results are shown in Tables 7 and 12–13 and FIGS. 64–71. Further, as an example, results of X-ray diffraction of $0.94MgTiO_3 \cdot 0.06CaTiO_3 \cdot 3$ wt %, 6 wt % or 12 wt % $Co_2O_3$ ceramic composition (sintered at 1300° C. for 4 hours) are shown in FIG. 73.

From the foregoing results, the value Qu tends to decrease, whereas $\tau f$ and $\epsilon_r$ tend to increase toward the

TABLE 12

| | [0.94 MgTiO$_3$.0.06 CaTiO$_3$ + 3~12 wt % Co$_2$O$_3$] ceramic composition | | | | | | |
|---|---|---|---|---|---|---|---|
| No. | Amount of Co$_2$O$_3$ (wt %) | Calcining temp. (°C.) | Sinter. temp. (°C.) | Qu (6 GHz) | Rel. dielect. const. $\epsilon$ r | $\tau$ f (ppm/ °C.) | Sint. density (g/cm$^3$) |
| 1 | 3 | 1100 | 1450 | 3920 | 20.77 | −0.26 | 3.849 |
| 2 | 6 | 1100 | 1450 | 3780 | 20.58 | −0.40 | 3.851 |
| 3 | 9 | 1100 | 1450 | 3710 | 20.37 | −2.14 | 3.884 |
| 4 | 12 | 1100 | 1450 | 3640 | 20.17 | −0.99 | 3.893 |
| 5 | 3 | 1100 | 1425 | 3920 | 20.91 | 1.36 | 3.854 |
| 6 | 6 | 1100 | 1425 | 3840 | 20.72 | −0.74 | 3.878 |
| 7 | 9 | 1100 | 1425 | 3750 | 20.54 | −1.79 | 3.903 |
| 8 | 12 | 1100 | 1425 | 3680 | 20.32 | −3.29 | 3.921 |
| 9 | 3 | 1100 | 1400 | 3900 | 21.00 | 1.64 | 3.864 |
| 10 | 6 | 1100 | 1400 | 3840 | 20.78 | −0.05 | 3.889 |
| 11 | 9 | 1100 | 1400 | 3790 | 20.60 | −1.92 | 3.914 |
| 12 | 12 | 1100 | 1400 | 3700 | 20.43 | −3.13 | 3.935 |
| 13 | 3 | 1100 | 1375 | 4070 | 20.80 | 1.11 | 3.843 |
| 14 | 6 | 1100 | 1375 | 3870 | 20.82 | −0.10 | 3.894 |
| 15 | 9 | 1100 | 1375 | 3840 | 20.68 | −1.66 | 3.921 |
| 16 | 12 | 1100 | 1375 | 3740 | 20.49 | −2.26 | 3.943 |
| 17 | 3 | 1100 | 1350 | 4180 | 19.36 | 1.65 | 3.669 |
| 18 | 6 | 1100 | 1350 | 3970 | 20.35 | −0.03 | 3.832 |
| 19 | 9 | 1100 | 1350 | 3860 | 20.48 | −1.12 | 3.893 |
| 20 | 12 | 1100 | 1350 | 3760 | 20.46 | −1.87 | 3.934 |
| 21 | 3 | 1100 | 1325 | 2400 | 17.38 | −4.95 | 3.440 |
| 22 | 6 | 1100 | 1325 | 4160 | 18.38 | −3.02 | 3.596 |
| 23 | 9 | 1100 | 1325 | 4020 | 18.82 | −3.42 | 3.688 |
| 24 | 12 | 1100 | 1325 | 3860 | 19.34 | −3.02 | 3.792 |

TABLE 13

| | | [xMgTiO$_3$·(1 − x)CaTiO$_3$ + 6 wt % Co$_2$O$_3$] ceramic composition | | | | | |
|---|---|---|---|---|---|---|---|
| No. | 1 − x | Amount of Co$_2$O$_3$ (wt %) | Calcining temp. (°C.) | Sinter. temp. (°C.) | Qu (6 GHz) | Rel. dielect. const. ε r | τ f (ppm/ °C.) | Sint. density (g/cm$^3$) |
| 25 | 0.05 | 6 | 1100 | 1375 | 4100 | 20.10 | −11.2 | 3.890 |
| 14 | 0.06 | 6 | 1100 | 1375 | 3870 | 20.82 | −0.10 | 3.894 |
| 26 | 0.07 | 6 | 1100 | 1375 | 3650 | 21.63 | 10.8 | 3.892 | positive side if (1−x) is large in xMgTiO$_3$·(1−x)CaTiO$_3$. Further, the sintering density tends to increase along with the elevation of the sintering temperature.

Further, although ε$_r$ shows no substantial change Qu and τf tend to decrease and the sintering density tends to increase by the addition of Co$_2$O$_3$. Particularly, is (1−x) is 0.06 and the addition amount of Co$_2$O$_3$. Particularly, if (1−x) is 0.06 and the addition amount of Co$_2$O$_3$ is 6% by weight, τf is −0.10 ppm/°C., ε$_r$ is 20.82, Qu is 3870 and the sintering density is 3.894 at a sintering temperature, for example, of 1375° C., showing particularly excellent performance balance. Further, at a sintering temperature of 1350° to 1450° C., each of Qu, ε$_r$ and τf scarcely scatters (for example, in case of Co$_2$O$_3$ 6 wt %, 3780 to 3970, 20.35 to 20.82, −0.03 to −0.74 ppm/°C., respectively) and products of desired quality can be obtained stably. Further, even if addition amount of Co$_2$O$_3$ changed, each of Qu, ε$_r$ and τf scarcely scatters (for instance at a sintering temperature of 1400° C., 3700 to 3900, 20.43 to 21.00, −0.05 to −3.13 ppm/°C., successively). Accordingly, even if the addition amount of Co$_2$O$_3$ and the sintering temperature are changed, products of extremely stable quality can be obtained. Particularly, fine control for τf can be conducted extremely easily.

Further, the analysis method based on the absence or presence of X-ray diffraction peaks in FIG. 73 shows that the structure of products according to the present invention contains MgTiO$_3$ (○) and CaTiO$_3$ (■) and MgTi$_2$O$_4$ (●) as other peaks and that reaction products with Co$_2$O$_3$ are not contained. Further, the relative peak intensity of MgTiO$_3$ is reduced along with the increase of the addition amount of Co$_2$O$_3$ while the intensity of MgTi$_2$O$_4$ is increased. It is considered that Qu decreases due to the decrease in the amount of MgTiO$_3$.

Further, results of electron microscopic photograph (not illustrated) show that the grain size increases along with the elevation of the sintering temperature (1350° C.:4.30 μm, 1400° C.:5.32 μm, 1450° C.:7.20 μm, each measured by an Intercept method) as showned in Table 72 . The rapture cross-section tissue shows inter-grain destruction in each of the cases.

The present invention is not restricted to specific embodiments described above but can be modified into various other embodiments depending on the purpose and the application use within the scope of the invention. That is, the calcining conditions such as calcining temperature and sintering conditions such as sintering temperature can be selected variously. Further, also for the starting material for CaO, peroxides, hydroxides and nitrates and so on can also be used in addition to CaCO$_3$ described above. Also for other oxides, other compounds that can form oxides by heating may also be used.

What is claimed is:

1. A microwave dielectric ceramic composition consisting essentially of, as the main ingredient, a composition represented by xMgTiO$_3$·(1−x)CaTiO$_3$ wherein (0.925≦x≦0.950), to which 3 to 9 parts by weight of ZnO is added per 100 parts by weight of xMgTiO$_3$·(1−x)CaTiO$_3$.

2. A microwave dielectric ceramic composition as defined in claim 1, wherein the addition amount of ZnO is 5 to 7 parts by weight.

3. A microwave dielectric ceramic composition as defined in claim 1 or 2, which has a Qu value in the range of 3800 to 4400 at 6 GHz, a temperature coefficient of the resonance frequency in the range of −10 to +10 ppm/°C. and relative dielectric constant in the range of 20 to 22.

4. A microwave dielectric ceramic composition consisting essentially of, as the main ingredient, a composition represented by xMgTiO$_3$·(1−x)CaTiO$_3$ wherein (0.923≦x≦0.940), to which 2 to 4 parts by weight of Ta$_2$O$_5$ is added per 100 parts by weight of xMgTiO$_3$·(1−x)CaTiO$_3$.

5. A microwave dielectric ceramic composition as defined in claim 4, wherein x is within a range of 0.927 to 0.935.

6. A microwave dielectric ceramic composition as defined in claim 4 or 5, which has a Qu value in the range of 3800 to 4400 at 6 GHz, a temperature coefficient of the resonance frequency in the range of −10 to +8 ppm/°C. and relative dielectric constant in the range of 19 to 22.

7. A microwave dielectric ceramic composition consisting essentially of, as the main ingredient, a composition represented by xMgTiO$_3$·(1−x)CaTiO$_3$ wherein (0.925≦x≦0.940), to which 1 to 6 parts by weight of Nb$_2$O$_5$ is added per 100 parts by weight of xMTiO$_3$·(1−x)CaTiO$_3$.

8. A microwave dielectric ceramic composition as defined in claim 7, wherein the addition amount of Nb$_2$O$_5$ is 1 to 4 parts by weight.

9. A microwave dielectric ceramic composition as defined in claim 7 or 8, which has a Qu value in the range of 3900 to 4600 at 6 GHz, a temperature coefficient of the resonance frequency in the range of −10 to +8 ppm/°C. and relative dielectric constant in the rage of 20 to 22.

10. A microwave dielectric ceramic composition consisting essentially of, as the main ingredient, a composition represented by xMgTiO$_3$·(1−x)CaTiO$_3$ wherein (0.93≦x≦0.95, to which 0.1 to 6 parts by weight of MnO$_2$ is added per 100 parts by weight of xMgTiO$_3$·(1−x)CaTiO$_3$.

11. A microwave dielectric ceramic composition as defined in claim 10, wherein the addition amount of MnO$_2$ is 3 to 6 parts by weight.

12. A microwave dielectric ceramic composition as defined in claim 10 or 11, which has a Qu value in the range of 3000 to 4100 at 6 GHz, a temperature coefficient of the resonance frequency in the range of −5 to +5 ppm/°C. and relative dielectric constant in the range of 19 to 21.

13. A microwave dielectric ceramic composition consisting essentially of, as the main ingredient, a composition represented by $xMgTiO_3 \cdot (1-x)CaTiO_3$ wherein $(0.93 \leq x \leq 0.95)$, to which 3 to 12 parts by weight of $Al_2O_3$ is added per 100 parts by weight of $xMTiO_3 \cdot (1-x)CaTiO_3$.

14. A microwave dielectric ceramic composition as defined in claim 13, wherein the addition amount of $Al_2O_3$ is 3 to 9 parts by weight.

15. A microwave dielectric ceramic composition as defined in claim 13 or 14, which has a Qu value in the range of 3300 to 3800 at 6 GHz, a temperature coefficient of the resonance frequency in the range of −5 to +3 ppm/°C. and relative dielectric constant in the range of 18 to 21.

16. A microwave dielectric ceramic composition consisting essentially of, as the main ingredient, a composition represented by $xMgTiO_3 \cdot (1-x)CaTiO_3$ wherein $(0.93 \leq x \leq 0.95)$, to which 3 to 12 parts by weight of $Co_2O_3$ is added per 100 parts by weight of $xMgTiO_3 \cdot (1-x)CaTiO_3$.

17. A microwave dielectric ceramic composition as defined in claim 16, wherein the addition amount of $Co_2O_3$ is 3 to 9 parts by weight.

18. A microwave dielectric ceramic composition as defined in claim 16 or 17, which has a Qu value in the range of 3700 to 4200 at 6 GHz, a temperature coefficient of the resonance frequency in the range of −5 to +2 ppm/°C. and relative dielectric constant in the range of 18 to 22.

* * * * *

UNITED STATES PATENT AND TRADEMARK OFFICE
CERTIFICATE OF CORRECTION

PATENT NO. : 5,340,784
DATED : August 23, 1994
INVENTOR(S) : Tokiomi Katoh and Hirofumi Ozeki It is certified that error appears in the above-identified patent and that said Letters Patent is hereby corrected as shown below:

Claim 7, column 26, line 46, "xMTi-", should read --xMgTi--.

Claim 9, column 26, line 55, "rage, should read --range--.

Claim 13, column 27, line 10, "xMTiO3", should read --xMgTiO3--.

Signed and Sealed this

Twenty-first Day of February, 1995

Attest:

BRUCE LEHMAN

Attesting Officer — Commissioner of Patents and Trademarks